(12) United States Patent
McMahan, Jr.

(10) Patent No.: US 12,217,325 B2
(45) Date of Patent: Feb. 4, 2025

(54) COLOR MANAGED EMBEDDING SYSTEM FOR EMBEDDING SIGNALS IN COLOR ARTWORK

(71) Applicant: Digimarc Corporation, Beaverton, OR (US)

(72) Inventor: Jerry Allen McMahan, Jr., Oakwood, OH (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 18/496,785

(22) Filed: Oct. 27, 2023

(65) Prior Publication Data

US 2024/0257291 A1 Aug. 1, 2024

Related U.S. Application Data

(63) Continuation of application No. 17/537,022, filed on Nov. 29, 2021, now Pat. No. 11,836,824, which is a continuation of application No. 17/067,717, filed on Oct. 11, 2020, now Pat. No. 11,188,996, which is a continuation-in-part of application No. 16/703,601, filed on Dec. 4, 2019, now Pat. No. 11,070,701.

(Continued)

(51) Int. Cl.
*G06T 1/00* (2006.01)
*G01J 3/46* (2006.01)
*G06T 7/90* (2017.01)
*G06T 11/00* (2006.01)

(52) U.S. Cl.
CPC ............ *G06T 1/0021* (2013.01); *G01J 3/462* (2013.01); *G01J 3/463* (2013.01); *G06T 7/90* (2017.01); *G06T 11/001* (2013.01)

(58) Field of Classification Search
CPC ....... G06T 1/0021; G06T 7/90; G06T 11/001; G06T 1/0028; G01J 3/462; G01J 3/463; G01J 3/50; H04N 1/32309
See application file for complete search history.

(56) References Cited

U.S. PATENT DOCUMENTS 5,862,260 A 1/1999 Rhoads
6,122,403 A 9/2000 Rhoads
(Continued)

FOREIGN PATENT DOCUMENTS

WO 2021072346 4/2021

OTHER PUBLICATIONS

Jan. 13, 2021 International Search Report and Written Opinion of the International Searching Authority in PCT/US2020/055176, filed Oct. 11, 2020. 14 pgs. Published as WO 2021/072346.

(Continued)

*Primary Examiner* — Christopher Wait
(74) *Attorney, Agent, or Firm* — Digimarc Corporation

(57) ABSTRACT

The present disclosure relates generally to signal encoding for printed objects such as product packaging, labels and hangtags. One implementation obtains a color image representing CMY color channels, and alters the color image to include an encoded signal by altering values representing CIELAB a* and b*, all the while keeping L* on or within a predetermined tolerance of a contour representing a constant value. Other implementations are provided.

13 Claims, 25 Drawing Sheets
(20 of 25 Drawing Sheet(s) Filed in Color)

Related U.S. Application Data

(60) Provisional application No. 63/059,774, filed on Jul. 31, 2020, provisional application No. 63/029,297, filed on May 22, 2020, provisional application No. 63/001,035, filed on Mar. 27, 2020, provisional application No. 62/933,042, filed on Nov. 8, 2019, provisional application No. 62/914,302, filed on Oct. 11, 2019.

(56) References Cited

U.S. PATENT DOCUMENTS

| | | |
|---|---|---|
| 6,345,104 B1 | 2/2002 | Rhoads |
| 6,408,082 B1 | 6/2002 | Rhoads |
| 6,449,377 B1 | 9/2002 | Rhoads |
| 6,590,996 B1 | 7/2003 | Reed |
| 6,614,914 B1 | 9/2003 | Rhoads |
| 6,625,297 B1 | 9/2003 | Bradley |
| 6,674,876 B1 | 1/2004 | Hannigan |
| 6,718,046 B2 | 4/2004 | Reed |
| 6,763,123 B2 | 7/2004 | Reed |
| 6,891,959 B2 | 5/2005 | Reed |
| 6,912,295 B2 | 6/2005 | Reed |
| 6,947,571 B1 | 9/2005 | Rhoads |
| 6,988,202 B1 | 1/2006 | Rhoads |
| 7,072,490 B2 | 7/2006 | Stach |
| 7,352,878 B2 | 4/2008 | Reed |
| 7,391,880 B2 | 6/2008 | Reed |
| 7,412,072 B2 | 8/2008 | Sharma |
| 7,747,656 B2 | 6/2010 | Kudo |
| 7,986,807 B2 | 7/2011 | Stach |
| 8,027,509 B2 | 9/2011 | Reed |
| 8,199,969 B2 | 6/2012 | Reed |
| 8,213,674 B2 | 7/2012 | Hannigan |
| 8,660,298 B2 | 2/2014 | Reed |
| 9,117,268 B2 | 8/2015 | Reed |
| 9,182,778 B2 | 11/2015 | Sharma |
| 9,245,308 B2 | 1/2016 | Reed |
| 9,380,186 B2 | 6/2016 | Reed |
| 9,401,001 B2 | 7/2016 | Reed |
| 9,449,357 B1 | 9/2016 | Lyons |
| 9,565,335 B2 | 2/2017 | Reed |
| 9,635,378 B2 | 4/2017 | Holub |
| 9,690,967 B1 | 6/2017 | Brundage |
| 9,710,871 B2 | 7/2017 | Lyons |
| 9,747,656 B2 | 8/2017 | Stach |
| 9,864,919 B2 | 1/2018 | Reed |
| 9,922,220 B2 | 3/2018 | Evans |
| 9,940,685 B2 | 4/2018 | Reed |
| 10,032,241 B2 | 7/2018 | Reed |
| 10,217,182 B1 | 2/2019 | Holub |
| 10,282,801 B2 | 5/2019 | Reed |
| 10,382,645 B2 | 8/2019 | Bai |
| 10,453,163 B2 | 10/2019 | Reed |
| 11,070,701 B2 | 7/2021 | McMahan, Jr. |
| 11,188,996 B2 | 11/2021 | McMahan, Jr. |
| 11,233,918 B1 | 1/2022 | Brundage |
| 2003/0095286 A1 | 5/2003 | Toda |
| 2005/0111694 A1* | 5/2005 | Loce .................. H04N 1/56 235/469 |
| 2006/0165311 A1 | 7/2006 | Watson |
| 2010/0150434 A1 | 6/2010 | Reed |
| 2011/0007935 A1 | 1/2011 | Reed |
| 2012/0078989 A1 | 3/2012 | Sharma |
| 2013/0329006 A1 | 12/2013 | Boles |
| 2015/0030201 A1 | 1/2015 | Holub |
| 2015/0187039 A1 | 7/2015 | Reed |
| 2018/0130164 A1 | 5/2018 | Lyons |
| 2018/0352111 A1 | 12/2018 | Bai |
| 2019/0327382 A1 | 10/2019 | Bai |

OTHER PUBLICATIONS

Apr. 12, 2022 International Preliminary Report on Patentability Chapter I in PCT/US2020/055176, filed Oct. 11, 2020. 8 pgs.

Continuation in part child U.S. Appl. No. 17/067,717, filed Oct. 11, 2020. 119 pgs.

Dfimbeg-Malcic et al., "Kubelka-Munk Theory in Describing Optical Properties of Paper (I)," Technical Gazette 18, 1(2011), 117-124.

Feb. 13, 2023 applicant Response including amended claims in European patent application No. 20801066.0, which is the regional phase of PCT application No. PCT/US2020/055176. 12 pgs.

Hersch, et al. "Improving the Yule-Nielsen modified spectral Neugebauer model by dot surface coverages depending on the ink superposition conditions," Electronic Imaging Symposium, Conf. Imaging X: Processing, Hardcopy and Applications, Jan. 2005, SPIE vol. 5667, 434-445.

Hunterlab. (2008). The Kubelka-Munk theory and K/S, insight on color. Application Note, vol. 18, 7. (3 pages).

J.A.C. Yule, W.J. Nielsen, "The penetration of light into paper and its effect on halftone reproductions," Proc. TAGA, vol. 3, 65-76 (1951).

Kubelka, P. and Monk, "An Article on Optics of Paint Layers," F., Z tech. Physik, 12, 493 (1931), English Translation by Stephen H. Westin, revised Mar. 12, 2004. (16 pages).

Kubota, et al., Design and Implementation of 3D Auditory Scene Visualizer Towards Auditory Awareness With Face Tracking, 10th IEEE Multimedia Symp., pp. 468-476, 2008.

PCT application No. PCT/US2020/055176, filed Oct. 11, 2020. 119 pgs. (published as WO 2021072346).

Sep. 9, 2022 Office Action from assignee's U.S. Appl. No. 17/582,911. 20 pages.

U.S. Appl. No. 16/703,601, filed Dec. 4, 2019, including Notice of Allowance dated Oct. 19, 2020 . 67 pages.

US Provisional U.S. Appl. No. 62/933,042, filed Nov. 8, 2019. (66 pages).

US Provisional U.S. Appl. No. 62/914,302 , filed Oct. 11, 2019. (64 pages).

Wyble et al., "A critical review of spectral models applied to binary color printing," Color Research & Application, 25(1):4-19, 2000.

\* cited by examiner

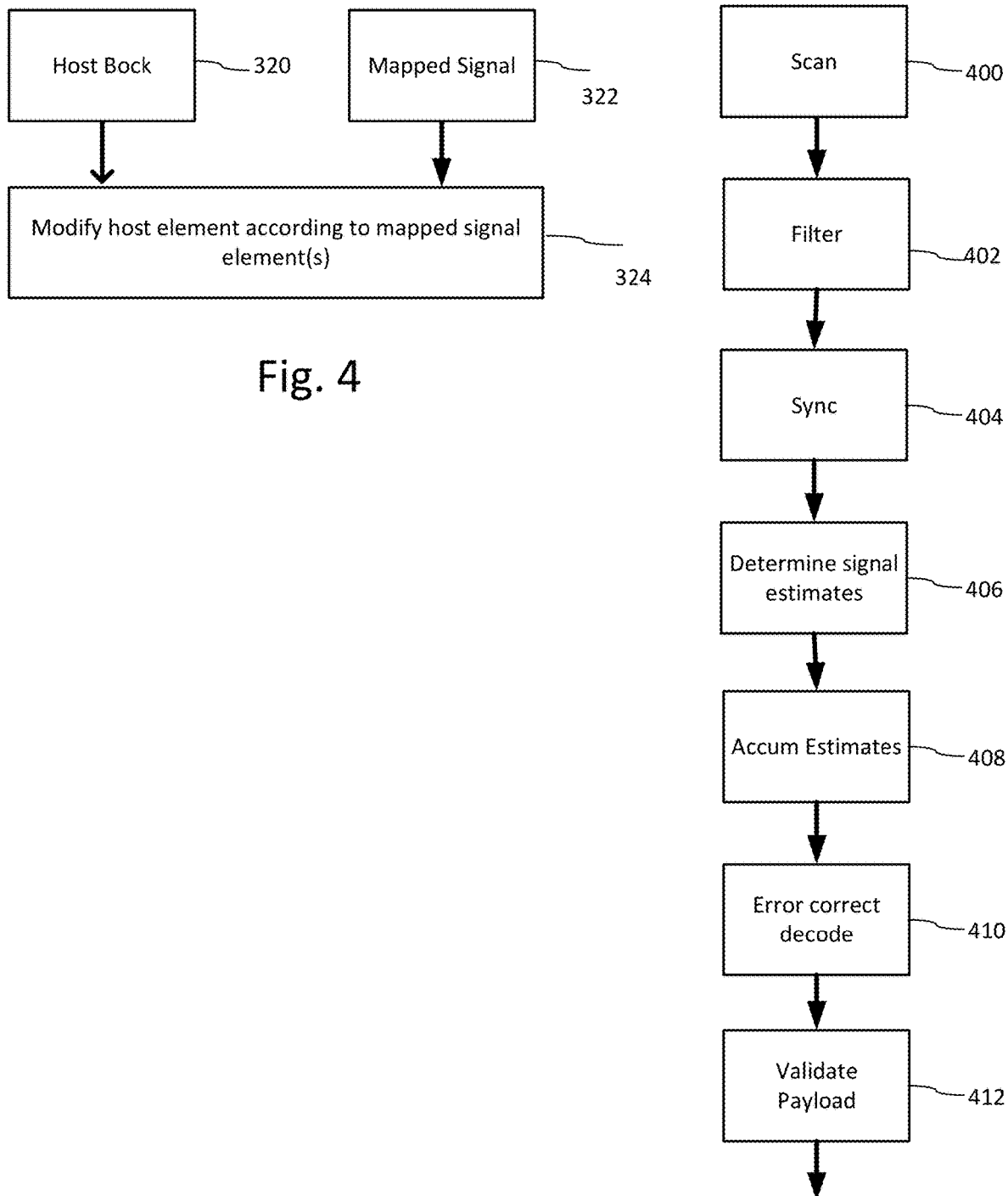

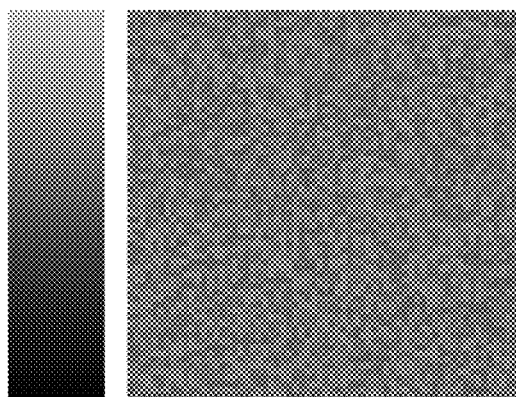
+/- 10 L*
Fig. 6A
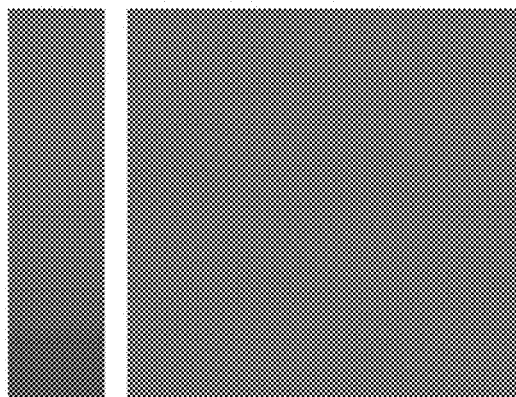
+/- 10 a*
Fig. 6B
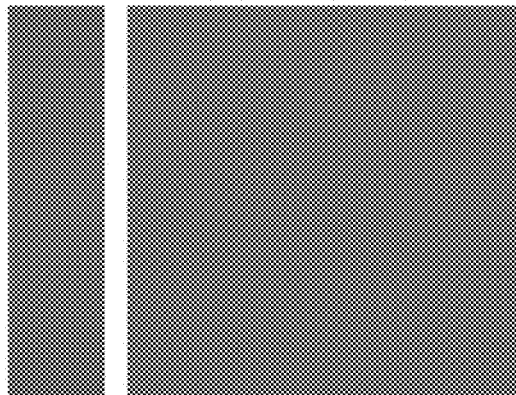
+/- 10 b*
Fig. 6C
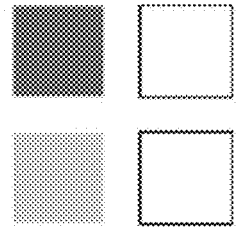
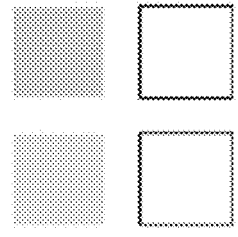
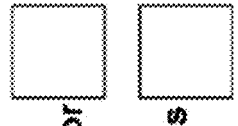
Colors seen as white
Original Color
Scanner Sees
Fig. 8
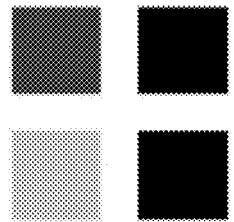
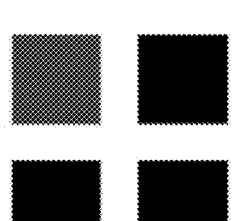
Colors seen as black
Original Color
Scanner Sees Original → Cyan set to meet target reflectance
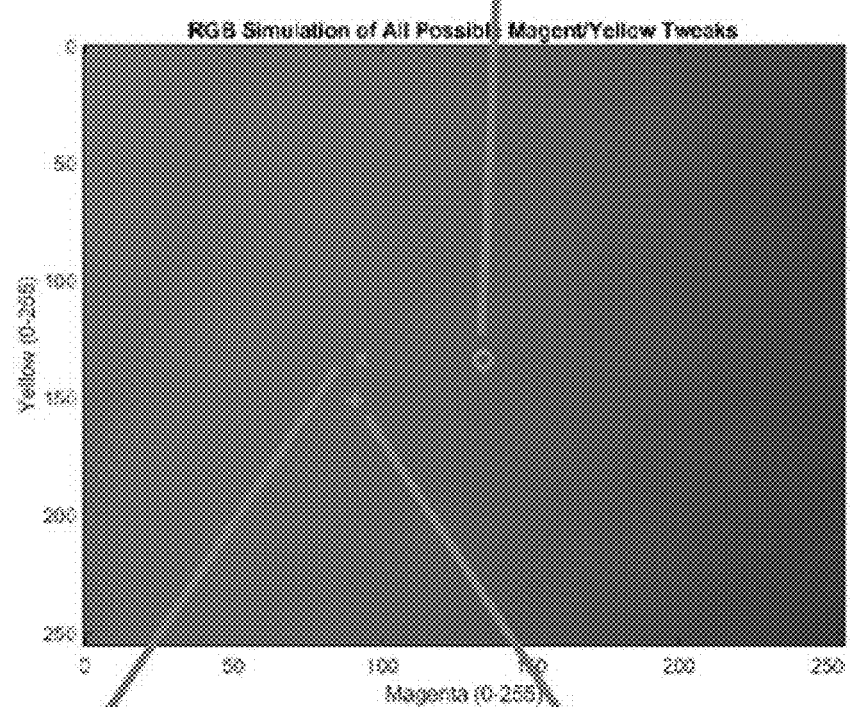
Magenta set to minimize L* change 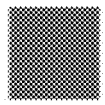
Yellow set to minimize b* change 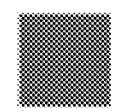
Fig. 13

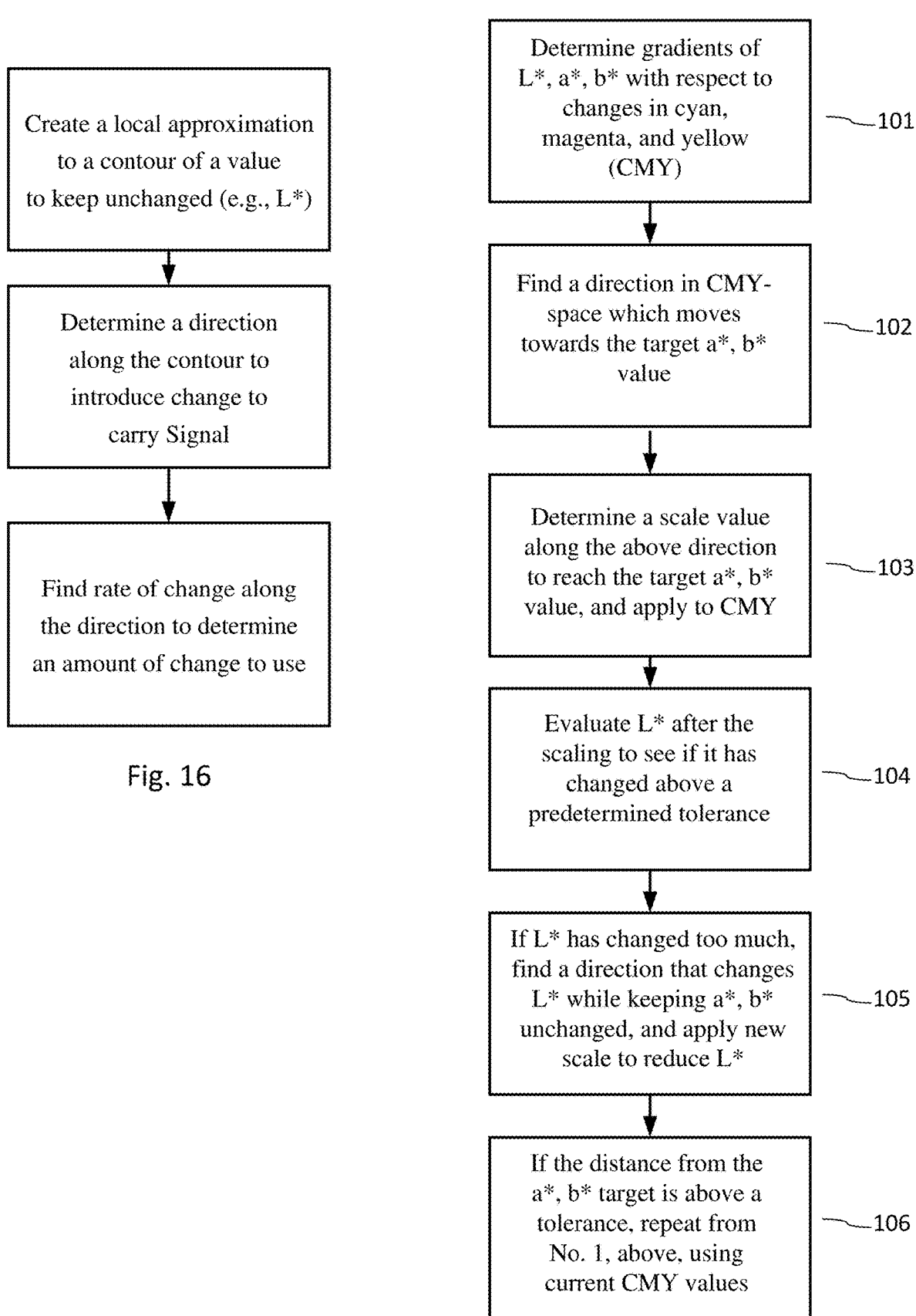

COLOR MANAGED EMBEDDING SYSTEM FOR EMBEDDING SIGNALS IN COLOR ARTWORK

RELATED APPLICATION DATA

This application is a continuation of U.S. patent application Ser. No. 17/537,022, filed Nov. 29, 2021 (published as US 20220207642A1, issued as U.S. patent Ser. No. 11/836,824), which is a continuation of U.S. patent application Ser. No. 17/067,717, filed Oct. 11, 2020 (U.S. Pat. No. 11,188,996) which claims the benefit of U.S. Provisional Application Nos. 63/059,774, filed Jul. 30, 2020, 63/029,297, filed May 22, 2020, 63/001,035, filed Mar. 27, 2020, 62/933,042, filed Nov. 8, 2019, and 62/914,302, filed Oct. 11, 2019. U.S. patent application Ser. No. 17/067,717 is a continuation-in-part of U.S. patent application Ser. No. 16/703,601, filed Dec. 4, 2019 (U.S. Pat. No. 11,070,701), which claims the benefit of assignee's U.S. Provisional Patent Application Nos. 62/914,302, filed Oct. 11, 2019, and 62/933,042, filed Nov. 8, 2019. Each of the above patent documents is hereby incorporated herein by reference in its entirety, including all drawings and any appendices.

TECHNICAL FIELD

The present disclosure relates generally to advanced image signal processing, color science, signal encoding and digital watermarking, particularly for printed or molded objects including, e.g., product packaging, recyclable objects (e.g., bottles, plastics items), labels and hangtags.

BACKGROUND AND SUMMARY

This document describes technology to encode information signals in host carriers, such as color artwork and images. One form of information encoding is "steganography." Another form of information encoding includes digital watermarking. For purposes of this disclosure, the terms "digital watermark," "watermark," "data encoding" and "data hiding" are used interchangeably. We sometimes use the terms "encoding," "encode," "embedding," "embed," and "data hiding" to mean modulating or transforming data representing imagery or video to include information therein. For example, data encoding embeds an information signal (e.g., a plural bit payload or a modified version of such, e.g., a 2-D error corrected, spread spectrum signal) in a host signal. This can be accomplished, e.g., by modulating a host signal (e.g., image, video or audio) in some fashion to carry the information signal. One way to modulate a host signal is to overprint a first color with additional colors. Another way to modulate a host signal is to tweak (or adjust) an ink value relative to its original value.

Some of the present assignee's work in signal encoding, data hiding, and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning signal encoding, steganography, data hiding and digital watermarking.

The described technology provides apparatus, systems, methods and non-transitory computer readable medium to encode color artwork with an information signal. The in some embodiments, encoding prioritizes a low resulting luminance change after encoding. This can be achieved by offsetting the changed luminance while preserving a target robustness. Robustness can be modeled by a target reflectance value representing the color artwork combined with an information signal at or around 660 nm. A few particular combinations include the following. Others will be evident from the detailed description and drawings.

One combination includes an image processing method comprising: obtaining a reflectance value representing an image pixel or group of image pixels at or around 660 nm, the image pixel representing artwork including cyan, magenta, yellow and black channels; altering the reflectance value according to an information carrying signal, said altering yielding a target reflectance value at or around 660 nm; changing in a first direction the cyan value of the image or group of image pixels pixel to achieve the target reflectance value, said changing yielding changed pixel colors; evaluating the luminance (L*) of the changed pixel colors relative to the luminance of the image pixel or group of image pixels; changing in a second direction opposite of the first direction the magenta value of the changed pixel color to minimize a change in luminance (*L) while maintaining the target reflectance value within 0.02-5%.

Another combination includes an image processing method comprising: obtaining a pixel corresponding to color values including cyan, magenta, yellow and black values, the cyan, magenta, yellow and black values corresponding to L*a*b* values; changing the cyan value to achieve a target reflectance value at or around 660 nm, the target reflectance value corresponding to a reflectance representing pixel reflectance and information signal reflectance at or around 660 nm, the changing the cyan value yielding a changed cyan value, in which the changed cyan value, magenta value, yellow value and black values correspond to first changed L*a*b* values; changing the magenta value in a direction opposite to the change in cyan value to reduce a luminance difference between the L*a*b* values and the first changed L*a*b* values, said changing the magenta value yields a changed magenta value, in which the changed cyan value, the changed magenta value, the yellow value and the black value correspond to second changed L*a*b* values.

In some embodiments the above image processing method also includes changing the yellow value and the changed magenta value to reduce a b* difference between the L*a*b* values and the second changed L*a*b* values, said changing the yellow value and the changed magenta value yielding a changed yellow value and a second changed magenta value.

Still another combination includes an image processing method comprising: obtaining target reflectance values representing reflectance of i) artwork and ii) an information signal at or around 660 nm, the artwork comprising at least first cyan values, magenta values and yellow values; obtaining second cyan values from a blend model using the target reflectance values, the magenta values and the yellow values, said obtaining yielding second cyan values; changing the magenta values and the yellow values to offset luminance (L*) attributable to the second cyan values, the changing yielding second magenta values and second yellow values; and providing the second cyan values, the second magenta values and the second yellow values to represent the artwork, in which the information signal is detectable from image data representing the second cyan values under red-light illumination at or around 660 nm.

Yet another combination includes a method of encoding a signal in a color image comprising: obtaining CIELAB L*, a*, b* values representing a color image including CMY channels; generating a local approximation of a L* contour; determining a direction along the L* contour to introduce a change to carry a signal in the color image; determining an amount of change using a rate of change in the determined direction; applying the determined amount to achieve new L*, a*, b* values, the new L*, a*, b* values carrying the signal.

Still another combination includes method of encoding a signal in a color image comprising original Cyan (C), Magenta (M), Yellow (Y) by making signal changes in CIELAB a* and b* while maintaining L* within a predetermined tolerance. The method includes the acts of: at a color image location being changed, determining gradients of L*, a*, b* with respect to changes in the CMY; using determined L* gradient information to find a direction in CMY-space which moves towards a target a*, b* value while keeping L* unchanged within a predetermined tolerance; using determined a*, b* gradient information to find a scale value for a*, b* in a determined L* gradient direction to reach the target a*, b* value; applying the found scale value to CMY, and using the scaled CMY as replacement values for the original CMY values, the scaled CMY carrying the encoded signal.

Another combination includes a method of encoding a signal in a color image comprising original Cyan (C), Magenta (M), Yellow (Y) by making signal changes in CIELAB a* and b* while maintaining L* within a predetermined tolerance. The method includes the acts of: obtaining information represent a contour representing a constant L* for different values of CMY; at a starting location on the contour represented by an original a*, b*, determining L* gradient information to find a direction in CMY-space which moves towards a target a*, b*, the target a*, b* residing on the contour; determining a scalar representing the distance between the original a*, b* and the target a*, b*; and applying the determined scalar to the original CMY, the resulting scaled CMY carrying the encoded signal.

Yet another combination includes a method of encoding a signal in a color image comprising original Cyan (C), Magenta (M), Yellow (Y) ink values by making signal changes in CIELAB a* and b* while maintaining L* within a predetermined tolerance. This version includes the acts of: for an image pixel or group of image pixels, obtaining a target a*, b* value representing the original CMY ink values modulated to include an encoded signal; estimating gradients of L*, a*, and b* with respect to the original CMY ink values; determining a plane in CMY-space that orthogonal to the L* gradient, and then determining a direction vector v within this plane that points toward the target a*, b*; determining a scalar h_target to scale v to reach the target a*, b* by estimating the change in a*, b*; determining a minimum scalar h_max to cause any of the original CMY ink values be either 0% or 100% values; determining a scalar h, by the requirements: if h_target<h_max, h=h_target or if h_target>=h_max, h=h_max; determining new ink values as original CMY ink values+h*v; using the new ink values to represent the original CMY ink values plus an encoded signal at the image pixel or group of image pixels.

Additional features, combinations and technology will be readily apparent from the following description with reference to the accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 is a diagram illustrating embedding of an auxiliary signal into host image signal.

FIG. 5 is a flow diagram illustrating a method for decoding a payload signal from a host image signal.

FIGS. 6A-6C illustrate a difference in visual sensitive between L*, a* and b*.

FIG. 8 is a diagram illustrating colors seen by a red-LED scanner, e.g., at or around 660 nm.

FIG. 13 is a diagram showing placement of color values for yellow/magenta tweaks for a given cyan value.

FIGS. 16-18 are flow diagrams for various signal encoding embodiments

DETAILED DESCRIPTION

Introduction

The following detailed description is divided into three (3) general sections. It should be understood from the outset, however, that we expressly contemplate combining subject matter from one such section with one or more of the other sections. Thus, the sections and section headings are provided for the reader's convenience and are not intended to impose restrictions or limitations. The sections include: I. Signal Encoder and Decoder, II. Color Managed Embedding; and III. Operating Environments. (A note for the reader, even though I'm a sole inventor, I sometimes use the plural "we" or "we've" as narration shortcuts.)

I. Signal Encoder and Decoder

Encoder/Decoder

Figure 1:
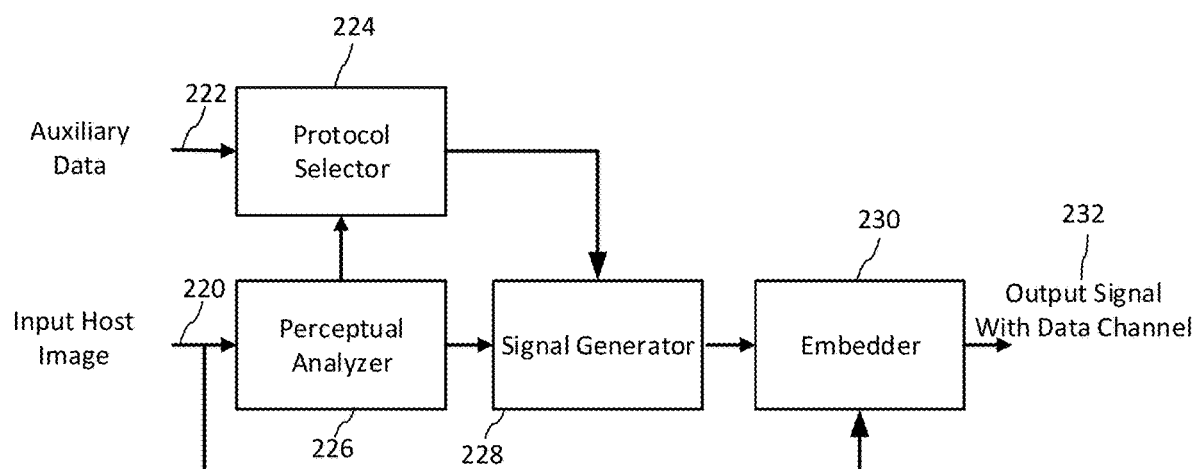
FIG. 1 is a block diagram of a signal encoder for encoding a digital payload signal into an image signal.
Figure 2:
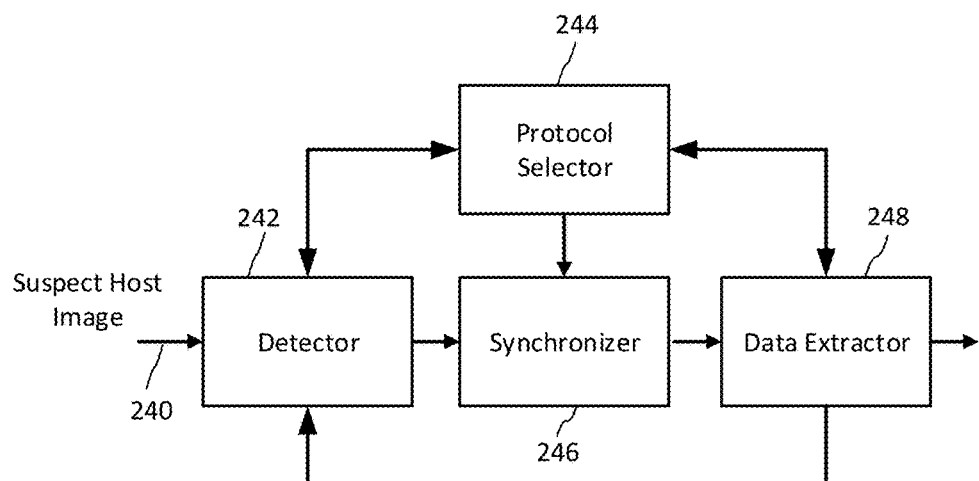
FIG. 2 is a block diagram of a compatible signal decoder for extracting the digital payload signal from an image signal.

FIG. 1 is a block diagram of a signal encoder for encoding a digital payload signal into an image signal. FIG. 2 is a block diagram of a compatible signal decoder for extracting the digital payload signal from an image signal.

While the signal encoder and decoder may be used for communicating a data channel for many applications, one objective for use in physical objects is robust signal communication through images formed on and captured from these objects. Signal encoders and decoders, like those in the Digimarc Barcode Platform from Digimarc Corporation, communicate auxiliary data in a data carrier within image content. Encoding and decoding is applied digitally, yet the signal survives digital to analog transformation and analog to digital transformation. For example, the encoder generates a modulated digital image that is converted to a rendered form, such as a printed image. The modulated digital image includes the encoded signal prior to rendering. Prior to decoding, a receiving device has or communicates with an imager to capture the modulated signal, convert it to an electric signal, which is digitized and then processed by the FIG. 2 signal decoder.

Inputs to the signal encoder include a host image 220 and auxiliary data payload 222. The objectives of the encoder include encoding a robust signal with desired payload capacity per unit of host signal (e.g., a unit may include the spatial area of a two-dimensional tile within the host signal), while maintaining perceptual quality. In some cases, there may be very little variability or presence of a host signal. In this case, there is little host interference on the one hand, yet little host content in which to mask the presence of the data channel within an image. Some examples include a package design that is devoid of much image variability (e.g., a single, uniform color). See, e.g., Ser. No. 14/725,399, issued as U.S. Pat. No. 9,635,378, incorporated herein by reference in its entirety.

The auxiliary data payload 222 includes the variable data information to be conveyed in the data channel, possibly along with other protocol data used to facilitate the communication. The protocol of the auxiliary data encoding scheme comprises the format of the auxiliary data payload, error correction coding schemes, payload modulation methods (such as the carrier signal, spreading sequence, encoded payload scrambling or encryption key), signal structure (including mapping of modulated signal to embedding locations within a tile), error detection in payload (CRC, checksum, etc.), perceptual masking method, host signal insertion function (e.g., how auxiliary data signal is embedded in or otherwise combined with host image signal in a package or label design), and/or synchronization method and signals.

The protocol defines the manner in which the signal is structured and encoded for robustness, perceptual quality and/or data capacity. For a particular application, there may be a single protocol, or more than one protocol, depending on application requirements. Examples of multiple protocols include cases where there are different versions of the channel, different channel types (e.g., several digital watermark layers within a host). Different versions may employ different robustness encoding techniques or different data capacity. Protocol selector module 224 determines the protocol to be used by the encoder for generating a data signal. It may be programmed to employ a particular protocol depending on the input variables, such as user control, application specific parameters, or derivation based on analysis of the host signal.

Perceptual analyzer module 226 analyzes the input host signal to determine parameters for controlling signal generation and embedding, as appropriate. It is not necessary in certain applications, while in others it may be used to select a protocol and/or modify signal generation and embedding operations. For example, when encoding in host color images that will be printed or displayed, the perceptual analyzer 256 is used to ascertain color content and masking capability of the host image. The output of this analysis, along with the rendering method (display or printing device) and rendered output form (e.g., ink and substrate) is used to control auxiliary signal encoding in particular color channels (e.g., one or more channels of process inks, Cyan, Magenta, Yellow, or Black (CMYK) or spot colors), perceptual models, and signal protocols to be used with those channels. Please see, e.g., our work on visibility and color models used in perceptual analysis in our U.S. application Ser. No. 14/616,686 (published as US 2015-0156369 A1; issued as U.S. Pat. No. 9,380,186), Ser. No. 14/588,636 (published as US 2015-0187039 A1; issued as U.S. Pat. No. 9,401,001) and Ser. No. 13/975,919 (issued as U.S. Pat. No. 9,449,357), Patent Application Publication No. US 2010-0150434 A1, and U.S. Pat. No. 7,352,878, which are hereby incorporated by reference in their entirety.

The perceptual analyzer module 226 also computes a perceptual model, as appropriate, to be used in controlling the modulation of a data signal onto a data channel within image content as described below.

The signal generator module 228 operates on the auxiliary data and generates a data signal according to the protocol. It may also employ information derived from the host signal, such as that provided by perceptual analyzer module 226, to generate the signal. For example, the selection of data code signal and pattern, the modulation function, and the amount of signal to apply at a given embedding location may be adapted depending on the perceptual analysis, and in particular on the perceptual model and perceptual mask that it generates. Please see below and the incorporated patent documents for additional aspects of this process.

Embedder module 230 takes the data signal and modulates it into an image by combining it with the host image. The operation of combining may be an entirely digital signal processing operation, such as where the data signal modulates the host signal digitally, may be a mixed digital and analog process or may be purely an analog process (e.g., where rendered output images, with some signals being modulated data and others being host image content, such as the various layers of a package design file).

There are a variety of different functions for combining the data and host in digital operations. One approach is to adjust the host signal value as a function of the corresponding data signal value at an embedding location, which is limited or controlled according to the perceptual model and a robustness model for that embedding location. The adjustment may be altering the host image by adding a scaled data signal or multiplying by a scale factor dictated by the data signal value corresponding to the embedding location, with weights or thresholds set on the amount of the adjustment according to the perceptual model, robustness model, and/or available dynamic range. The adjustment may also be altering by setting the modulated host signal to a particular level (e.g., quantization level) or moving it within a range or bin of allowable values that satisfy a perceptual quality or robustness constraint for the encoded data.

As detailed further below, the signal generator 228 produces a data signal with data elements that are mapped to embedding locations in an image tile. These data elements are modulated onto the host image at the embedding locations. A tile may include a pattern of embedding locations. The tile derives its name from the way in which it is repeated in contiguous blocks of a host signal, but it need not be arranged this way. In image-based encoders, we may use tiles in the form of a two dimensional array (e.g., 128×128, 256×256, 512×512) of embedding locations. The embedding locations correspond to host signal samples at which an encoded signal element is embedded in an embedding domain, such as a spatial domain (e.g., pixels at a spatial resolution), frequency domain (frequency components at a frequency resolution), or some other feature space. We sometimes refer to an embedding location as a bit cell, referring to a unit of data (e.g., an encoded bit or chip element) encoded within a host signal at the location of the cell. Again, please see the documents incorporated herein for more information on variations for particular type of media.

The operation of combining may include one or more iterations of adjustments to optimize the modulated host for perceptual quality or robustness constraints. One approach, for example, is to modulate the host image so that it satisfies a perceptual quality metric as determined by perceptual model (e.g., visibility model) for embedding locations across the signal. Another approach is to modulate the host image so that it satisfies a robustness metric across the signal. Yet another is to modulate the host image according to both the robustness metric and perceptual quality metric derived for each embedding location. The incorporated documents provide examples of these techniques. Below, we highlight a few examples. See, e.g., U.S. Pat. No. 9,449,357; and see also, U.S. Pat. Nos. 9,401,001 and 9,565,335, which are each hereby incorporated by reference in its entirety.

For color images, the perceptual analyzer generates a perceptual model that evaluates visibility of an adjustment to the host by the embedder and sets levels of controls to govern the adjustment (e.g., levels of adjustment per color direction, and per masking region). This may include evaluating the visibility of adjustments of the color at an embedding location (e.g., units of noticeable perceptual difference in color direction in terms of CIE Lab values), Contrast Sensitivity Function (CSF), spatial masking model (e.g., using techniques described by Watson in US Published Patent Application No. US 2006-0165311 A1, which is incorporated by reference herein in its entirety), etc. One way to approach the constraints per embedding location is to combine the data with the host at embedding locations and then analyze the difference between the encoded host with the original. The perceptual model then specifies whether an adjustment is noticeable based on the difference between a visibility threshold function computed for an embedding location and the change due to embedding at that location. The embedder then can change or limit the amount of adjustment per embedding location to satisfy the visibility threshold function. Of course, there are various ways to compute adjustments that satisfy a visibility threshold, with different sequence of operations. See, e.g., our U.S. patent application Ser. Nos. 14/616,686, 14/588,636 and 13/975,919, Patent Application Publication No. US 2010-0150434 A1, and U.S. Pat. No. 7,352,878, already incorporated herein.

The Embedder also computes a robustness model. The computing of a robustness model may include computing a detection metric for an embedding location or region of locations. The approach is to model how well the decoder will be able to recover the data signal at the location or region. This may include applying one or more decode operations and measurements of the decoded signal to determine how strong or reliable the extracted signal. Reliability and strength may be measured by comparing the extracted signal with the known data signal. Below, we detail several decode operations that are candidates for detection metrics within the embedder. One example is an extraction filter which exploits a differential relationship to recover the data signal in the presence of noise and host signal interference. At this stage of encoding, the host interference is derivable by applying an extraction filter to the modulated host. The extraction filter models data signal extraction from the modulated host and assesses whether the differential relationship needed to extract the data signal reliably is maintained. If not, the modulation of the host is adjusted so that it is.

Detection metrics may be evaluated such as by measuring signal strength as a measure of correlation between the modulated host and variable or fixed data components in regions of the host or measuring strength as a measure of correlation between output of an extraction filter and variable or fixed data components. Depending on the strength measure at a location or region, the embedder changes the amount and location of host signal alteration to improve the correlation measure. These changes may be particularly tailored so as to establish relationships of the data signal within a particular tile, region in a tile or bit cell pattern of the modulated host. To do so, the embedder adjusts bit cells that violate the relationship so that the relationship needed to encode a bit (or M-ary symbol) value is satisfied and the thresholds for perceptibility are satisfied. Where robustness constraints are dominant, the embedder will exceed the perceptibility threshold where necessary to satisfy a desired robustness threshold.

The robustness model may also model distortion expected to be incurred by the modulated host, apply the distortion to the modulated host, and repeat the above process of measuring detection metrics and adjusting the amount of alterations so that the data signal will withstand the distortion. See, e.g., Ser. Nos. 14/616,686, 14/588,636 and 13/975,919 for image related processing.

This modulated host is then output as an output image signal 232, with a data channel encoded in it. The operation of combining also may occur in the analog realm where the data signal is transformed to a rendered form, such as a layer of ink or coating applied by a commercial press to substrate. Another example is a data signal that is overprinted as a layer of material, engraved in, or etched onto a substrate, where it may be mixed with other signals applied to the substrate by similar or other marking methods. In these cases, the embedder employs a predictive model of distortion and host signal interference and adjusts the data signal strength so that it will be recovered more reliably. The predictive modeling can be executed by a classifier that classifies types of noise sources or classes of host image and adapts signal strength and configuration of the data pattern to be more reliable to the classes of noise sources and host image signals that the encoded data signal is likely to be encounter or be combined with.

The output 232 from the Embedder signal typically incurs various forms of distortion through its distribution or use. For printed objects, this distortion occurs through rendering an image with the encoded signal in the printing process, and subsequent scanning back to a digital image via a camera or like image sensor.

Turning to FIG. 2, the signal decoder receives an encoded host signal 240 and operates on it with one or more processing stages to detect a data signal, synchronize it, and extract data.

The decoder is paired with an input device in which a sensor captures an analog form of the signal and an analog to digital converter converts it to a digital form for digital signal processing. Though aspects of the decoder may be implemented as analog components, e.g., such as preprocessing filters that seek to isolate or amplify the data channel relative to noise, much of the decoder is implemented as digital signal processing modules that implement the signal processing operations within a scanner. As noted, these modules can be implemented as software instructions executed within an image scanner or camera, an FPGA, or ASIC, etc.

The detector 242 is a signal processing module that detects presence of the data channel. The incoming signal is referred to as a suspect host because it may not have a data channel or may be so distorted as to render the data channel undetectable. The detector is in communication with a protocol selector 244 to get the protocols it uses to detect the data channel. It may be configured to detect multiple protocols, either by detecting a protocol in the suspect signal and/or inferring the protocol based on attributes of the host signal or other sensed context information. A portion of the data signal may have the purpose of indicating the protocol of another portion of the data signal. As such, the detector is shown as providing a protocol indicator signal back to the protocol selector 244.

The synchronizer module 246 synchronizes the incoming signal to enable data extraction. Synchronizing includes, for example, determining the distortion to the host signal and compensating for it. This process provides the location and arrangement of encoded data elements within the host signal.

The data extractor module 248 gets this location and arrangement and the corresponding protocol and demodulates a data signal from the host. The location and arrangement provide the locations of encoded data elements. The extractor obtains estimates of the encoded data elements and performs a series of signal decoding operations.

As detailed in examples below and in the incorporated documents, the detector, synchronizer and data extractor may share common operations, and in some cases may be combined. For example, the detector and synchronizer may be combined, as initial detection of a portion of the data signal used for synchronization indicates presence of a candidate data signal, and determination of the synchronization of that candidate data signal provides synchronization parameters that enable the data extractor to apply extraction filters at the correct orientation, scale and start location of a tile. Similarly, data extraction filters used within data extractor may also be used to detect portions of the data signal within the detector or synchronizer modules. The decoder architecture may be designed with a data flow in which common operations are re-used iteratively, or may be organized in separate stages in pipelined digital logic circuits so that the host data flows efficiently through the pipeline of digital signal operations with minimal need to move partially processed versions of the host data to and from a shared memory unit, such as a RAM memory.

Signal Generator

Figure 3:
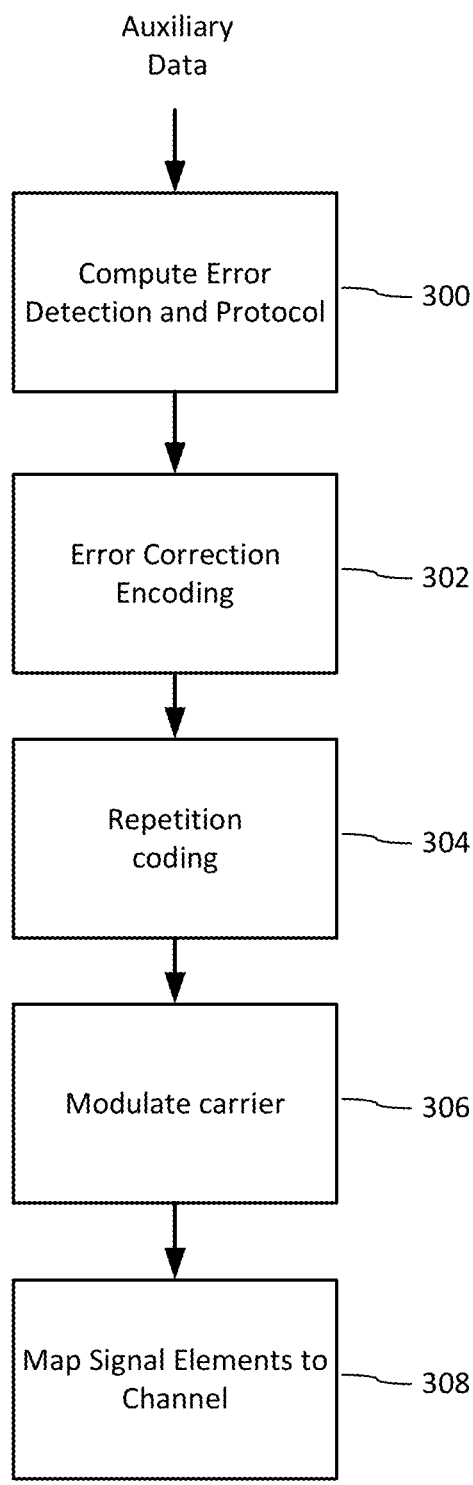
FIG. 3 is a flow diagram illustrating operations of a signal generator.

FIG. 3 is a flow diagram illustrating operations of a signal generator. Each of the blocks in the diagram depict processing modules that transform the input auxiliary data into a digital payload data signal structure. The input auxiliary data may include, e.g., a Global Trade Item Number (GTIN) developed by GS1. For example, the GTIN may be structured in the GTIN-12 format for UPC codes. Of course, the input auxiliary data may represent other plural bit codes as well. For a given protocol, each block provides one or more processing stage options selected according to the protocol. In processing module 300, the auxiliary data payload is processed to compute error detection bits, e.g., such as a Cyclic Redundancy Check (CRC), Parity, check sum or like error detection message symbols. Additional fixed and variable messages used in identifying the protocol and facilitating detection, such as synchronization signals may be added at this stage or subsequent stages.

Error correction encoding module 302 transforms the message symbols of the digital payload signal into an array of encoded message elements (e.g., binary or M-ary elements) using an error correction method. Examples include block codes, BCH, Reed Solomon, convolutional codes, turbo codes, etc.

Repetition encoding module 304 repeats and concatenates the string of symbols from the prior stage to improve robustness. For example, certain message symbols may be repeated at the same or different rates by mapping them to multiple locations within a unit area of the data channel (e.g., one unit area being a tile of bit cells, as described further below).

Repetition encoding may be removed and replaced entirely with error correction coding. For example, rather than applying convolutional encoding (1/3 rate) followed by repetition (repeat three times), these two can be replaced by convolution encoding to produce a coded payload with approximately the same length.

Next, carrier modulation module 306 takes message elements of the previous stage and modulates them onto corresponding carrier signals. For example, a carrier might be an array of pseudorandom signal elements, with equal number of positive and negative elements (e.g., 16, 32, 64 elements), or other waveform, such as sine wave or orthogonal array. In the case of positive and negative elements, the payload signal is a form of binary antipodal signal. It also may be formed into a ternary (of 3 levels, −1, 0, 1) or M-ary signal (of M levels). These carrier signals may be mapped to spatial domain locations or spatial frequency domain locations. Another example of carrier signals are sine waves, which are modulated using a modulation scheme like phase shifting, phase quantization, and/or on/off keying. In one embodiment, carrier modulation module XORs each bit of a scrambled signature with a string of 16 binary elements (a "spreading key"), yielding 16 "chips" having "0" and "1" values. If error correction encoding yields a signature of 1024 bits (which can then be randomized), then the carrier modulation module 306 produces 16,384 output chips.

Mapping module 308 maps signal elements of each modulated carrier signal to locations within the channel. In the case where a digital host signal is provided, the locations correspond to embedding locations within the host signal. The embedding locations may be in one or more coordinate system domains in which the host signal is represented within a memory of the signal encoder. The locations may correspond to regions in a spatial domain, temporal domain, frequency domain, or some other transform domain. Stated another way, the locations may correspond to a vector of host signal features, which are modulated to encode a data signal within the features.

Mapping module 308 also maps a synchronization signal to embedding locations within the host signal, for embodiments employing an explicit synchronization signal. An explicit synchronization signal is described further below.

To accurately recover the payload, the decoder extracts estimates of the coded bits at the embedding locations within each tile. This requires the decoder to synchronize the image under analysis to determine the embedding locations. For images, where the embedding locations are arranged in two dimensional blocks within a tile, the synchronizer determines rotation, scale and translation (origin) of each tile. This may also involve approximating the geometric distortion of the tile by an affine transformation that maps the embedded signal back to its original embedding locations.

To facilitate synchronization, the auxiliary signal may include an explicit or implicit synchronization signal. An explicit synchronization signal is an auxiliary signal separate from the encoded payload that is embedded with the encoded payload, e.g., within the same tile). An implicit synchronization signal is a signal formed with the encoded payload, giving it structure that facilitates geometric/temporal synchronization. Examples of explicit and implicit synchronization signals are provided in our previously cited U.S. Pat. Nos. 6,614,914, and 5,862,260, which are each hereby incorporated herein by reference in their entirety.

In particular, one example of an explicit synchronization signal is a signal comprised of a set of sine waves, with pseudo-random phase, which appear as peaks in the Fourier domain of the suspect signal. See, e.g., 6,614,914, and 5,862,260, describing use of a synchronization signal in conjunction with a robust data signal. Also see U.S. Pat. No. 7,986,807, which is hereby incorporated by reference in its entirety.

Our US Patent Application Publication No. US 2012-0078989 A1, which is hereby incorporated by reference in its entirety, provides additional methods for detecting an embedded signal with this type of structure and recovering rotation, scale and translation from these methods.

Examples of implicit synchronization signals, and their use, are provided in U.S. Pat. Nos. 6,614,914 and 5,862,260, as well as U.S. Pat. Nos. 6,625,297 and 7,072,490, and U.S. patent application Ser. No. 14/724,729 (issued as U.S. Pat. No. 9,747,656), which are hereby incorporated by reference in their entirety.

Signal Embedding In Host

FIG. 4 is a diagram illustrating embedding of an auxiliary signal into host signal. As shown, the inputs are a host signal block (e.g., blocks of a host digital image) (320) and an encoded auxiliary signal (322), which is to be inserted into the signal block. The encoded auxiliary signal may include an explicit synchronization component, or the encoded payload may be formulated to provide an implicit synchronization signal. Processing block 324 is a routine of software instructions or equivalent digital logic configured to insert the mapped signal(s) into the host by adjusting the corresponding host signal sample(s) at an embedding location according to the value of the mapped signal element. For example, the mapped signal is added/subtracted from corresponding a sample value, with scale factor and threshold from the perceptual model or like mask controlling the adjustment amplitude. In implementations with an explicit synchronization signal, the encoded payload and synchronization signals may be combined and then added or added separately with separate mask coefficients to control the signal amplitude independently.

Following the construction of the payload, error correction coding is applied to the binary sequence. This implementation applies a convolutional coder at rate 1/4, which produces an encoded payload signal of 4096 bits. Each of these bits is modulated onto a binary antipodal, pseudorandom carrier sequence (−1, 1) of length 16, e.g., multiply or XOR the payload bit with the binary equivalent of chip elements in its carrier to yield 4096 modulated carriers, for a signal comprising 65,536 elements. These elements map to the 65,536 embedding locations in each of the 256 by 256 tiles.

An alternative embodiment, for robust encoding on packaging employs tiles of 128 by 128 embedding locations. Through convolutional coding of an input payload at rate 1/3 and subsequent repetition coding, an encoded payload of 1024 bits is generated. Each of these bits is modulated onto a similar carrier sequence of length 16, and the resulting 16,384 signal elements are mapped to the 16,384 embedding locations within the 128 by 128 tile.

There are several alternatives for mapping functions to map the encoded payload to embedding locations. In one, these elements have a pseudorandom mapping to the embedding locations. In another, they are mapped to bit cell patterns of differentially encoded bit cells as described in U.S. patent application Ser. No. 14/724,729 (issued as U.S. Pat. No. 7,747,656). In the latter, the tile size may be increased to accommodate the differential encoding of each encoded bit in a pattern of differential encoded bit cells, where the bit cells corresponding to embedding locations at a target resolution (e.g., 300 DPI).

Our U.S. patent application Ser. No. 14/725,399 (issued as U.S. Pat. No. 9,635,378), describes methods for inserting auxiliary signals in areas of package and label designs that have little host image variability. These methods are particularly useful for labels, including price change labels and fresh food labels. These signal encoding methods may be ported to the printing sub-system in scales used within fresh food, deli and meat departments to encode GTINs and control flags for variable weight items in the image of a label, which is then printed by the printer sub-system (typically a thermal printer) on the label and affixed to an item.

For an explicit synchronization signal, the mapping function maps a discrete digital image of the synchronization signal to the host image block. For example, where the synchronization signal comprises a set of Fourier magnitude peaks or sinusoids with pseudorandom phase, the synchronization signal is generated in the spatial domain in a block size coextensive with the 256 by 256 tile (or other tile size, e.g., 128 by 128) at target embedding resolution.

Various detailed examples of encoding protocols and processing stages of these protocols are provided in our prior work, such as our U.S. Pat. Nos. 6,614,914, 5,862,260, and 6,674,876, which are hereby incorporated by reference, and US Patent Publication No. US 2010-0150434 A1 and U.S. patent application Ser. No. 14/725,399, issued as U.S. Pat. No. 9,635,378, previously incorporated. More background on signaling protocols, and schemes for managing compatibility among protocols, are provided in U.S. Pat. No. 7,412,072, which is hereby incorporated by reference.

One signaling approach, which is detailed in U.S. Pat. Nos. 6,614,914, and 5,862,260, is to map elements to pseudo-random locations within a channel defined by a domain of a host signal. See, e.g., FIG. 9 of 6,614,914. In particular, elements of a watermark signal are assigned to pseudo-random embedding locations within an arrangement of sub-blocks within a block (referred to as a "tile"). The elements of this watermark signal correspond to error correction coded bits. These bits are modulated onto a pseudo-random carrier to produce watermark signal elements (block 306 of FIG. 3), which in turn, are assigned to the pseudo-random embedding locations within the sub-blocks (block 308 of FIG. 3). An embedder module modulates this signal onto a host signal by increasing or decreasing host signal values at these locations for each error correction coded bit according to the values of the corresponding elements of the modulated carrier signal for that bit.

FIG. 5 is a flow diagram illustrating a method for decoding a payload signal from a host image signal. Implementations of a watermark decoder and watermark processors available from Digimarc Corporation include:

Digimarc Mobile Software Development Kit; and
Digimarc Embedded Systems SDK.

The Embedded Systems SDK is the one typically integrated into scanner hardware.

Corresponding encoder embodiments available from Digimarc Corporation include:
Digimarc Barcode SDKs
Digimarc Barcode Plugin Returning to FIG. 5, the frames are captured at a resolution preferably near the resolution at which the auxiliary signal has been encoded within the original image (e.g., 300 DPI, 100 DPI, etc.). An image up-sampling or down-sampling operation may be performed to convert the image frames supplied by the imager to a target resolution for further decoding.

The resulting image blocks supplied to the decoder from these frames may potentially include an image with the payload. At least some number of tiles of encoded signal may be captured within the field of view, if an object with encoded data is being scanned. Otherwise, no encoded tiles will be present. The objective, therefore, is to determine as efficiently as possible whether encoded tiles are present.

In the initial processing of the decoding method, it is advantageous to select frames and blocks within frames that have image content that are most likely to contain the encoded payload. From the image passed to the decoder, the decoder selects image blocks for further analysis. The block size of these blocks is set large enough to span substantially all of a complete tile of encoded payload signal, and preferably a cluster of neighboring tiles. However, because the distance from the camera may vary, the spatial scale of the encoded signal is likely to vary from its scale at the time of encoding. This spatial scale distortion is further addressed in the synchronization process.

For more on block selection, please see US Published Patent Application No. US 2015-0030201 A1, which are each hereby incorporated by reference in its entirety.

Please also see U.S. Pat. No. 9,922,220, which is hereby incorporated by reference, for more on block selection where processing time is more limited.

The first stage of the decoding process filters the image to prepare it for detection and synchronization of the encoded signal (402). The decoding process sub-divides the image into blocks and selects blocks for further decoding operations. For color images, a first filtering stage converts the input color image signal (e.g., RGB values) to a color channel or channels where the auxiliary signal has been encoded. See, e.g., U.S. Pat. No. 9,117,268, which is hereby incorporated herein by reference in its entirety, for more on color channel encoding and decoding. For an image captured under red illumination by a monochrome scanner, the decoding process operates on this "red" channel sensed by the scanner. Some scanners may pulse LEDs of different color to obtain plural color or spectral samples per pixel as described in our Patent Application Publication No. US 2013-0329006 A1, which is hereby incorporated by reference.

A second filtering operation isolates the auxiliary signal from the host image. Pre-filtering is adapted for the auxiliary signal encoding format, including the type of synchronization employed. For example, where an explicit synchronization signal is used, pre-filtering is adapted to isolate the explicit synchronization signal for the synchronization process.

In some embodiments, the synchronization signal is a collection of peaks in the Fourier domain. Prior to conversion to the Fourier domain, the image blocks are pre-filtered. See, e.g., LaPlacian pre-filter in U.S. Pat. No. 6,614,914. A window function is applied to the blocks and then a transform to the Fourier domain, applying an FFT. Another filtering operation is performed in the Fourier domain. See, e.g., pre-filtering options in U.S. Pat. Nos. 6,988,202, 6,614,914, and 9,182,778, which are hereby incorporated by reference in their entirety.

For more on filters, also see U.S. Pat. No. 7,076,082, which is hereby incorporated by reference in its entirety. This patent describes a multi-axis filter, e.g., an oct-axis filter. Oct axis compares a discrete image sample with eight neighbors to provide a compare value (e.g., +1 for positive difference, −1 or negative difference), and sums the compare values. Different arrangements of neighbors and weights may be applied to shape the filter according to different functions. Another filter variant is a cross shaped filter, in which a sample of interest is compared with an average of horizontal neighbors and vertical neighbors, which are then similarly summed.

Next, synchronization process (404) is executed on a filtered block to recover the rotation, spatial scale, and translation of the encoded signal tiles. This process may employ a log polar method as detailed in U.S. Pat. No. 6,614,914 or least squares approach of U.S. Pat. No. 9,182,778, to recover rotation and scale of a synchronization signal comprised of peaks in the Fourier domain. To recover translation, the phase correlation method of 6,614,914 is used, or phase estimation and phase deviation methods of U.S. Pat. No. 9,182,778 are used.

Alternative methods perform synchronization on an implicit synchronization signal, e.g., as detailed in Ser. No. 14/724,729 (issued as U.S. Pat. No. 9,747,656).

Next, the decoder steps through the embedding locations in a tile, extracting bit estimates from each location (406). This process applies, for each location, the rotation, scale and translation parameters, to extract a bit estimate from each embedding location (406). In particle, as it visits each embedding location in a tile, it transforms it to a location in the received image based on the affine transform parameters derived in the synchronization, and then samples around each location. It does this process for the embedding location and its neighbors to feed inputs to an extraction filter (e.g., oct-axis or cross shaped). A bit estimate is extracted at each embedding location using filtering operations, e.g., oct axis or cross shaped filter (see above), to compare a sample at embedding locations with neighbors. The output (e.g., 1, −1) of each compare operation is summed to provide an estimate for an embedding location. Each bit estimate at an embedding location corresponds to an element of a modulated carrier signal.

The signal decoder estimates a value of each error correction encoded bit by accumulating the bit estimates from the embedding locations of the carrier signal for that bit (408). For instance, in the encoder embodiment above, error correction encoded bits are modulated over a corresponding carrier signal with 16 elements (e.g., multiplied by or XOR with a binary anti-podal signal). A bit value is demodulated from the estimates extracted from the corresponding embedding locations of these elements. This demodulation operation multiplies the estimate by the carrier signal sign and adds the result. This demodulation provides a soft estimate for each error correction encoded bit.

These soft estimates are input to an error correction decoder to produce the payload signal (410). For a convolutional encoded payload, a Viterbi decoder is used to produce the payload signal, including the checksum or CRC. For other forms of error correction, a compatible decoder is applied to reconstruct the payload. Examples include block codes, BCH, Reed Solomon, Turbo codes.

Next, the payload is validated by computing the check sum and comparing with the decoded checksum bits (412). The check sum matches the one in the encoder, of course. For the example above, the decoder computes a CRC for a portion of the payload and compares it with the CRC portion in the payload.

At this stage, the payload is stored in shared memory of the decoder process. The recognition unit in which the decoder process resides returns it to the controller via its interface. This may be accomplished by various communication schemes, such as IPC, shared memory within a process, DMA, etc.

II. Color Managed Embedding

This section describes Color Managed Embedding ("CME") technology, which can be used for embedding an information signal into color artwork. For discussion purposes, the color artwork is intended to be printed using process color inks cyan (C), magenta (M), yellow (Y) and/or black (K). Or magenta (M), yellow (Y) and black (K). The color artwork can be represented in a digital file such as used by Adobe's Photoshop or Illustrator, with the digital file typically including ink channels or layers representing such process color inks. For large print runs, three (3), four (4) or more color printing plates are produced to represent the artwork process color channels. Of course, this CME technology may be used with other inks including spot colors and extended color gamut inks (e.g., CMYK+OGV (orange, green, violet)) if such are presented in color artwork.

In a first implementation, a CME system generates a so-called "chroma" signal in an CIELAB space, by changing or transforming artwork to carry an encoded signal using the "L*" (luminance) and "a*" channel while prioritizing the minimization of Luminance (L*) changes. (In this patent document, we use the terms "luminance," "Luminance (L*)," and "L*" generally to represent luminance in a CIELAB color space. Of course, a CME system could be used in another color space too.) A chroma signal can be embedded in color artwork by modifying values of pixels in an art element so that the changes in the art element are represented primarily in chrominance (color). Chrominance embedding can be applied in the CMY, MYK, or CMYK channels. Signal tweaks (or changes to color values to carry an information signal) are primarily in chrominance, to which the human visual system is less sensitive. Indeed, the human eye is more sensitive to changes or spatial variation in L* compared to a* (red/green) and b* (blue/yellow). To illustrate this sensitivity, changes are shown to a gray patch of +/−10 units in each of the L* (FIG. 6A), a* (FIG. 6B) and b*(FIG. 6C) channels. The introduced contrast in FIG. 6A is more visible to an HVS relative to the changes in FIGS. 6B and 6C.

Figure 7:
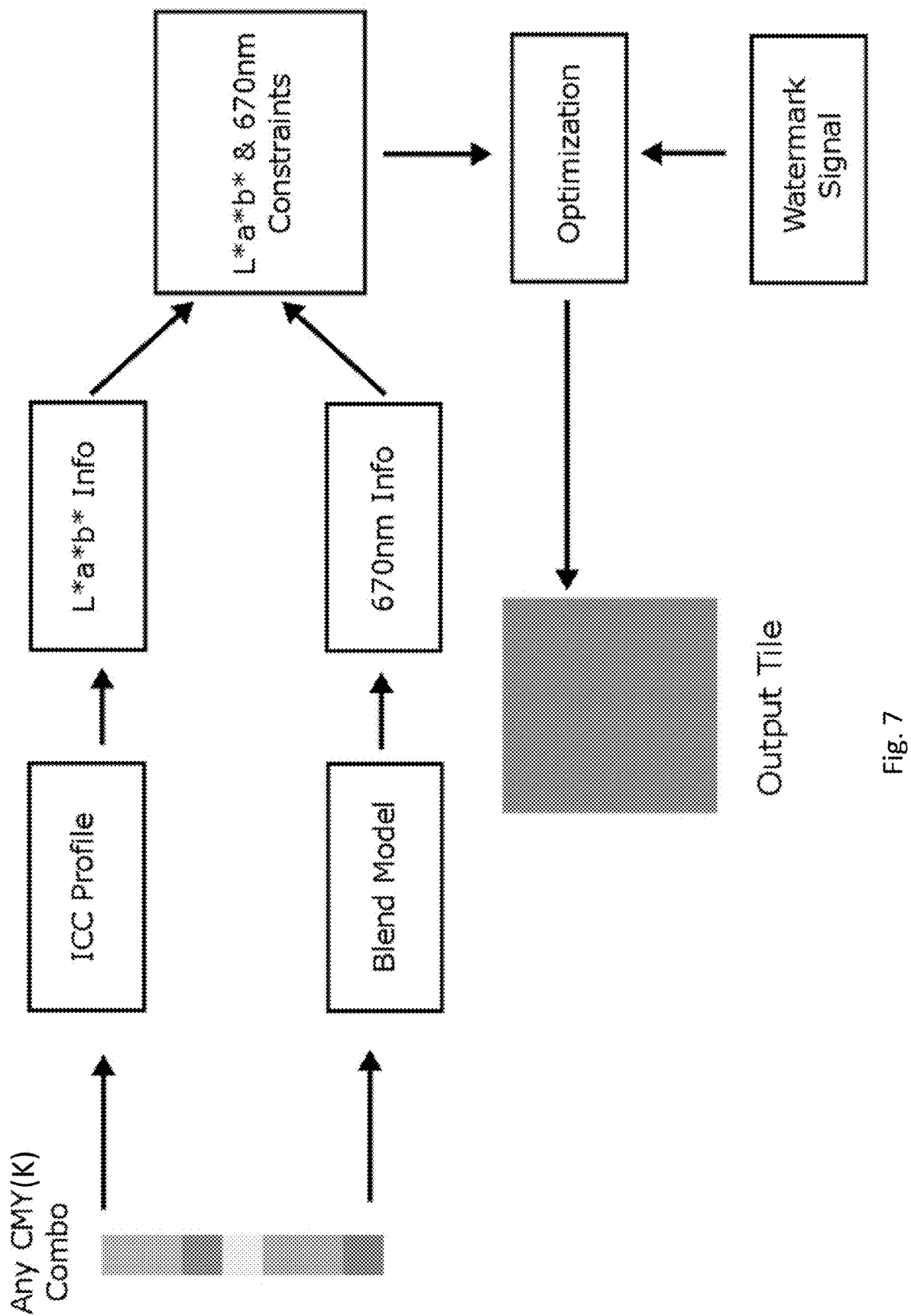
FIG. 7 is a flow diagram for generating an encoded output tile.

One implementation of a CME system is described with reference to FIG. 7. CMY(K) artwork is obtained. The CMY(K) artwork may correspond to a digital design, e.g., as encapsulated by a PhotoShop or Illustrator file. FIG. 7 shows two processing routes for the CMY(K) artwork. The top route obtains an ICC profile associated with each of the colors within the CMY(K) artwork. An ICC profile generally includes a set of data that characterizes a color space according to standards issued by the International Color Consortium (ICC). These profiles describe the color attributes of, e.g., a particular color space and a profile connection space (PCS) such as CIELAB (L*a*b*). L*a*b* information is obtained or derived from the ICC Profile.

The lower route employs a so-called "blend model" to obtain spectral reflectance information for the CMY(K) artwork. Example blend models are described in assignee's U.S. Pat. No. 10,382,645, which is hereby incorporated herein by reference in its entirety. Other examples are provided below in this patent document. The blend model generates reflectance information for colors, including areas of overprinted or layered colors. For example, a blend model may produce reflectance values per pixel (or other image area) across the visible spectrum for a single color or two or more layered colors at a pixel or other image spatial area. The blend model may also consider reflectance of an anticipated information signal tweak for a particular color at that pixel(s).

If the CMY(K) artwork is to be printed for retail product packaging, a target retail scanner will typically include a red-LED sensor. So, reflectance information at or around 660 nm can be generated by the blend model. We use the terms "at or around 660 nm" in this patent document to include a spectral range of 620 nm-710 nm. FIG. 7 emphasizes reflectance information within this spectral range at 670 nm (e.g., corresponding to a red-led scanner with a peak illumination at 670 nm). Another example would be a red-LED scanner with a peak illumination at 690 nm, at 660 nm, at 622 nm or at some other peak within 620 nm-710 nm. We use the terms "at or around 450 nm" in this patent document to include a spectral range of 410 nm-490 nm. One example would be a blue-LED reader with a peak illumination at 470 nm, at 450 nm, at 430 nm or at some other peak within 410 nm-450 nm.

L*a*b* constraints are determined. For example, a threshold of +/−0.02-5 units of L* at or around 660 nm can be established as a maximum allowed change in L*. Similar constraints can be set for both a* and b*. These constraints establish visibility boundaries for resulting embedded artwork. Armed with the constraints, the target reflectance (e.g., 670 nm) values, and the information signal (e.g., "watermark signal" in FIG. 7), a CME system modifies CMY(K) artwork to carry the information signal. For example, a cyan or black channel is modified (e.g., changing certain pixel values) to carry the target reflectance values. The target reflectance values represent the original artwork and the information signal (e.g., a 2D spatial domain pattern representing the signal, an output of signal generator 228 (FIG. 1), modulated carrier output from 306 or mapped elements 308 (FIG. 3), and/or a mapped signal 322 (FIG. 4)) at or around 660 nm. If cyan is modified to carry the signal, a change in luminance within the artwork is expected. So, an offsetting change in magenta (or magenta and yellow) can be made to maintain the constraints established for the embedded artwork. An output of the CME system is encoded artwork. FIG. 7 simplifies this output by showing a portion of an encoded artwork file, e.g., an output tile.

Figure 9:
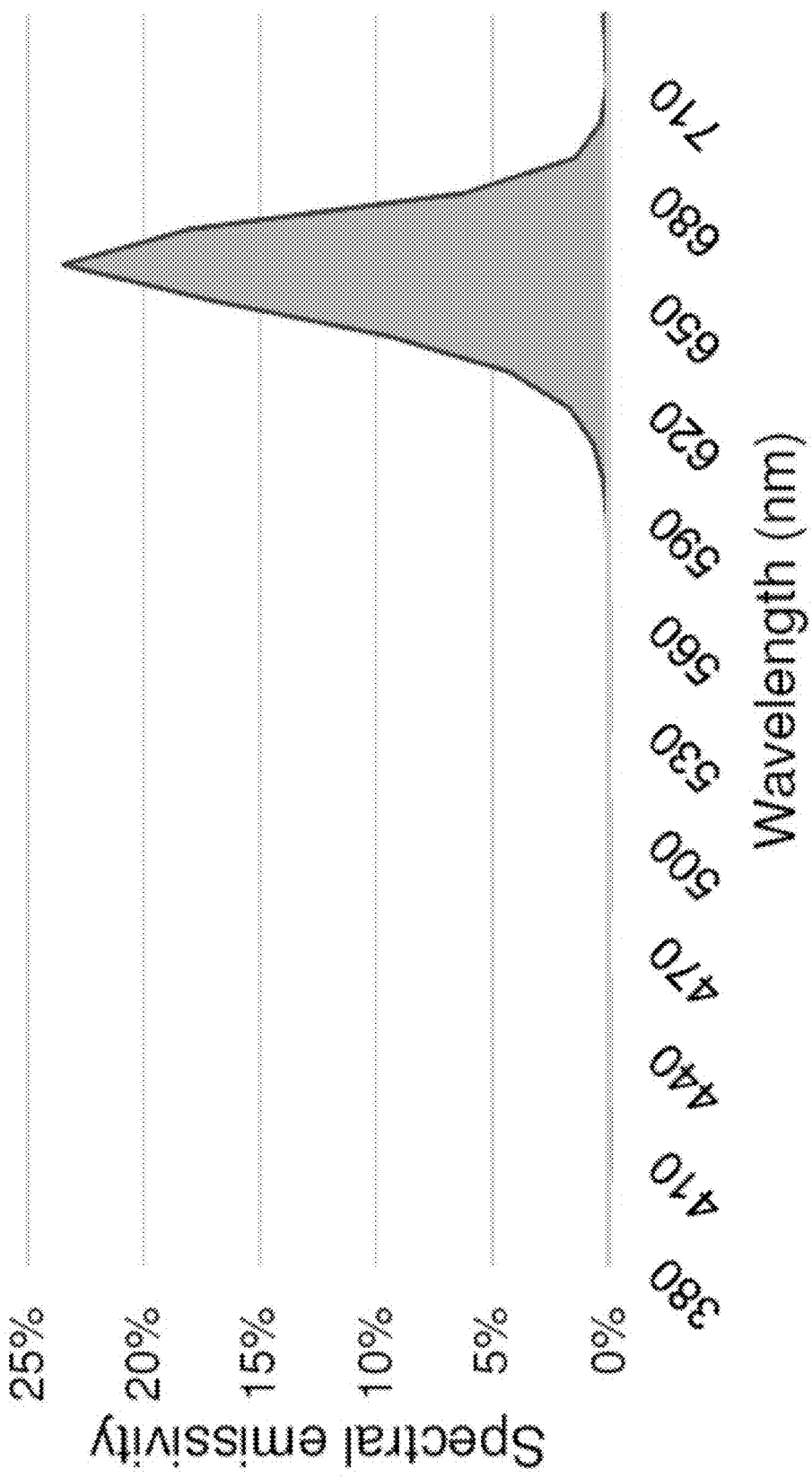
FIG. 9 is plot showing a spectral sensitivity for a red-LED scanner.

One aspect of CME is to modify artwork with an information signal that can be detected by a scanner while minimizing the perceptibility to a human visual system (HVS). Spectral sensitivity associated with a red-LED scanner is shown in FIG. 9. Another aspect of CME is to use color information at encoding time to optimize embedding results in terms of signal robustness or detectability. In one embodiment, embedding considers properties of CMYK and a targeting image capture device. For example, in a retail packaging environment, encoded signal robustness is related to contrast as seen by a red-LED scanner. Consider an encoded signal that is carried by 1000's of adjustments (or tweaks) to artwork. In order to analyze these adjustments, these tweaks are carried in a color channel that is "seen" by a red-LED scanner. With reference to FIG. 8, and when dealing with process color inks, high contrast signal modifications can be carried by black and/or cyan ink. Black and cyan are highly visible to a red-LED scanner while magenta and yellow inks are not. This suggests that reflectance at or around 660 nm can be set to a target value by adjusting black and/or cyan. Yet, adjusting black or cyan to achieve a machine-detectable contrast tweak results in visible changes to the artwork. The visibility of these changes can be reduced by manipulating magenta and/or yellow to minimize or offset the most significant changes in CIELAB space. Since magenta and yellow are nearly indiscernible or not seen by a red LED scanner at or around 660 nm (see FIG. 8), this offsetting can be carried out with negligible impact to signal robustness.

Due to physical constraints on reflectance curves that are obtained by combining CMYK inks, it is difficult to keep an encoded signal uniform in both visibility and robustness. So, if an embodiment requires a choice, we would currently prefer to prioritize uniformity in signal robustness over visibility to ensure a signal will read as expected. (Please see below, however, for embodiments in which visibility is maintained.) In other embodiments, we keep the signal as generally uniform in terms of robustness, initially, without considering visibility constraints. The visibility constraints are then, optionally, applied, which allows some of the robustness uniformity to be sacrificed, so a final embedding result isn't necessarily uniform in either visibility or robustness. There are implementation advantages to structuring it this way, mostly having to do with robustness being more precisely achieved than visibility. Robustness is also more objective—a minimum amount of robustness can be achieved on a target device for embedding, while the maximum acceptable visibility may depend on more subjective criteria. This motivates a parameterization of a form: "set the encoded signal as close as possible to robustness X, then minimize the visibility. Wherever the resulting visibility exceeds Y, reduce the robustness to meet this Y constraint," instead of "vary the signal strength so the visibility is uniform according to a model".

For illustration purposes, the following systems, methods and algorithms use reflectance at or around 660 nm (e.g., at 670 nm) as a target reflectance for a detector. In practice, however, a target detector reflectance for a red-LED scanner can be selected from a reflectance range of 620 nm-710 nm depending on the target scanner. Or, if using a full color scanner, the target reflectance could be in a different spectral region altogether. In still further embodiments, reflectance values from different wavelengths can be combined in using weights to prioritize different spectra.

We have found that when considering colors there is a relationship between the amplitude of 620 nm-710 nm reflectance changes and predicted encoded signal strength. So, controlling robustness is related to controlling embedding changes in reflectance at or around 660 nm. For additional details on predicting encoded signal strength see, e.g., assignee's U.S. Pat. Nos. 9,690,967 and 10,217,182, which are each hereby incorporated herein by reference in its entirety. For example, the various message strength and/or orientation strength metrics can be used.

In one embodiment, a CME system takes an approach of targeting a specific robustness by controlling reflectance as seen by a corresponding capture device (e.g., at or around 660 nm, or other wavelength depending on target image capture system). Consider a capture device that corresponds to an illumination peak at 670 nm. Reflectance changes at 670 nm are determined by changing a single ink, either cyan or black, or by changing both cyan and black. Our preferred CME embedding algorithm prioritizes the minimization of luminance (L*) changes due to information signal insertion while maintaining a target reflectance value. Luminance (L*) changes due to modifying cyan (C) and/or black (K) to carry a signal can be offset by corresponding changes in magenta (M). Yellow (Y) can be changed to reduce b* changes, also without significantly changing reflectance. If the minimal changes obtained are not enough, the signal can be removed or reduced per area or per a globally applied scaling factor. Since a* generally cannot be reduced without also increasing luminance changes in a CMYK color space, tolerances can be set to remove or reduce an encoded signal when the a* changes are too large so as to effect visibility.

A CME embedding algorithm for color (e.g., CMY(K)) artwork includes:

1. Set a target reflectance value representing color artwork encoded with an information signal. Then introduce reflectance changes at 670 nm (or other wavelength, e.g., at or around 660 nm) via tweaks or adjustments to cyan and/or black channels within the color artwork to achieve the target reflectance value. For example, adjustments of +/−4-22% (and even more preferably, +/−5-12%) reflectance values at artwork locations are introduced. Tweaks or adjustments can be made according to an output of signal generator 228 that produces, e.g., a data signal with data elements that can be mapped to embedding locations in a 2-D image or artwork tile.
2. Change magenta to offset luminance changes due to tweaking cyan and/or black.
3. Change yellow (while also adjusting magenta to stay on a contour of minimal L* change) to reduce b* changes.
4. Optionally, minimize or remove tweaks where L* changes or a* changes are too high relative to established constraints.

The above Act No. 3 is also optional. For example, if Act 2 is carried out, but not 3, most of the encoded signal visibility is removed since minimizing L* and b* is typically the most important to visibility of L*,a*,b*. This has advantages of adjusting fewer inks, which can potentially reduce sensitivity to registration errors on print.

Figure 10:
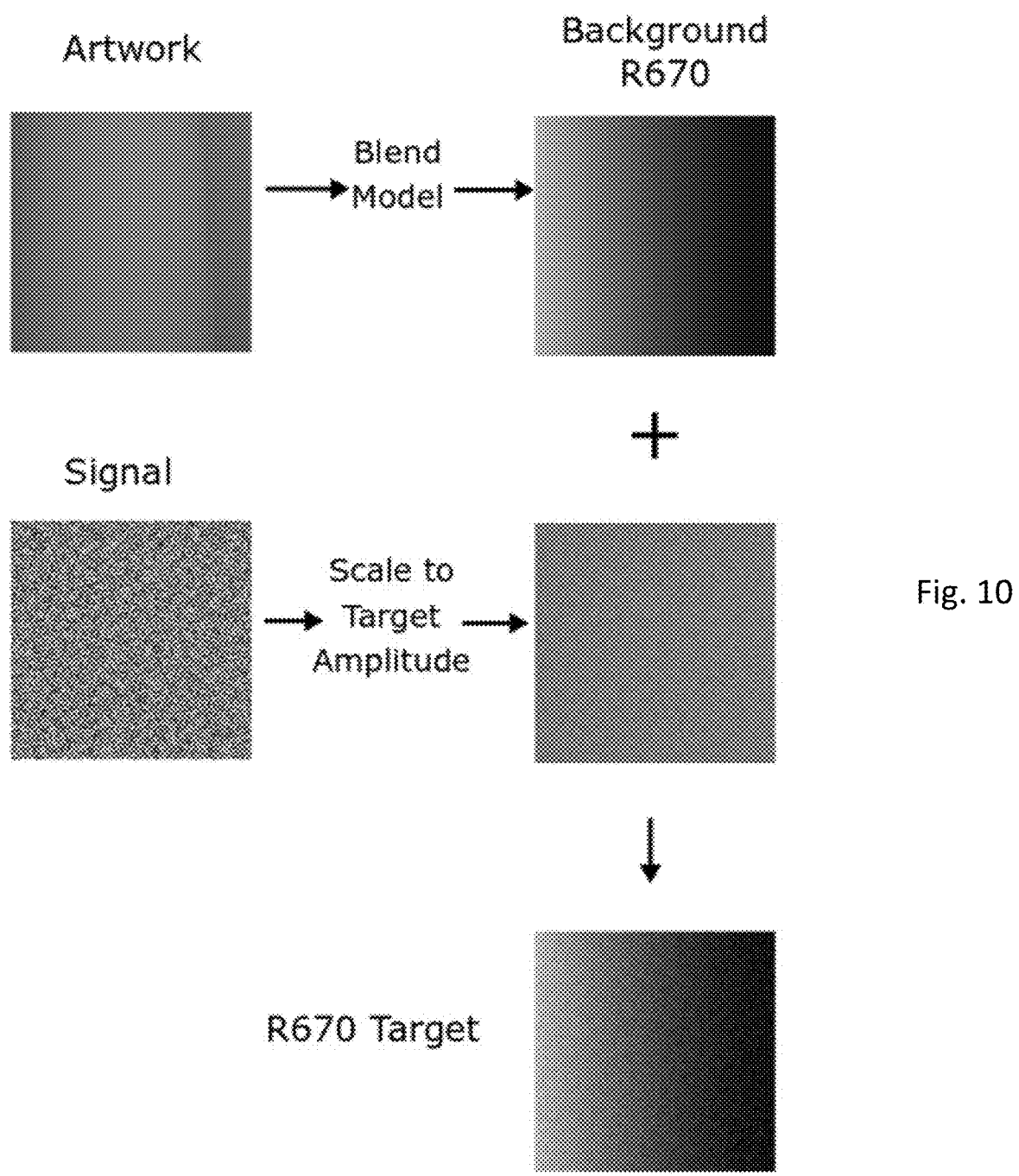
FIG. 10 is flow diagram illustrating generation of a set of target reflectance values at or around 660 nm (670 nm).

Setting a reflectance target is further described with respect to FIG. 10. Digital artwork is obtained or created. For example, the artwork may correspond to a Photoshop or Illustrator file, design, layer(s) and/or channel(s). A blend model operates on the artwork to obtain reflectance values for the artwork at or around 660 nm. FIG. 10 uses 670 nm as the target wavelength, but other wavelength targets (e.g., at or around 660 nm could alternatively be used). As discussed above, reflectance values at 670 nm is a good approximation of what a red-LED scanner will see when capturing the image. A signal to be carried by the artwork is obtained or generated. For example, the encoded signal may be represented by a 2-D spatial domain pattern or image block. The pattern or block may include values (−1, 0, 1) or (1, −1), grayscale values ranging from 0-256 or normalized values between 0 and 1 or between 0 and 100. In one implementation, the signal is generated as an output of block 306 or 308 in FIG. 3 and includes both payload and synchronization components. Such an output is sometimes referred to as a so-called "pure signal," e.g., without consideration of host artwork content. The signal can be optionally scaled (e.g., amplitude modulated), masked and/or modified, and then combined with the reflectance values representing the artwork (e.g., at 670 nm). This process yields a set of 670 nm reflectance values representing "target reflectance values" for the artwork as encoded with (or adjusted to carry) the information signal.

Figure 11:
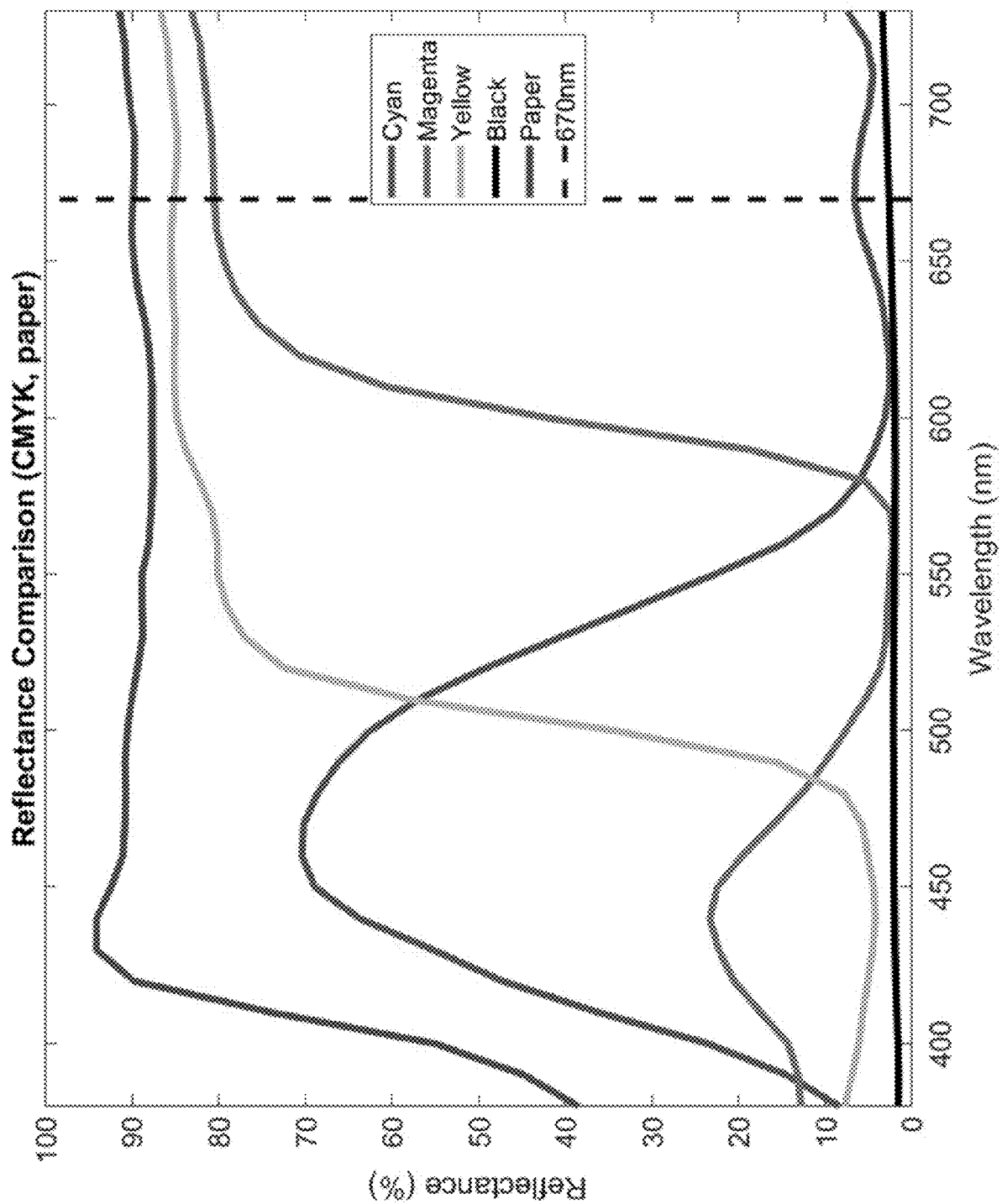
FIG. 11 is a graph showing a reflectance comparison between CMYK and paper, particularly at or around 660 nm (670 nm).

Once the target reflectance values at 670 nm are determined, a following step is to change a contrast ink within the original artwork to meet this target. For example, cyan, black and/or cyan & black are changed. As shown in FIG. 11, process color inks with low reflectance at 670 nm include cyan and black. Magenta and yellow are both close to the reflectance of paper at 670 nm, meaning that a red-LED scanner will see these colors similarly as it sees paper, e.g., white, but will see cyan and black as black. Once cyan and/or black are modified to carry the signal, magenta and yellow can be modified to compensate for the resulting changes in Luminance.

For simplicity of discussion, an information signal carried with cyan only is now described. But using black or both cyan and black (or a spot color with low reflectance near 670 nm) for setting robustness involves an analogous process. A blend model can be used to find a cyan value for a given target reflectance value. A blend model is discussed in assignee's U.S. Pat. No. 10,382,645, which is hereby incorporated herein by reference in its entirety. Another blend model implementation is discussed below with reference to items 1, 2 and 3, which rearranges terms to solve for cyan. That is, find a cyan value given a target reflectance value, magenta value, yellow value, and black value. The following blend model can be represented as software instructions, e.g., as coded in MATLAB, C, C++, Objective-C, C#, Ruby, and/or Python, with resulting instructions then used to configure one or more processors to carry out the functionality. In alternative embodiments, the blend model is recreated in hardware such as an ASIC, or in a combination of firmware/hardware. In still further implementations, a graphics processor unit (GPU) can be used to carry out the processing. In even further implementations, a system hosting the software instructions is remotely accessed via a communications network, so that processing power (e.g., such as is provided with a cloud service) is not a constraint on the interrogating device.

1 Blend Model $$R(\lambda, c, m, y, k) = \big(R^{1/n}_{KM_0}(\lambda)(1-c)F_0(m, y, k) + R^{1/n}_{KM_1}(\lambda)(1-c)F_1(m, y, k) +$$
$$R^{1/n}_{KM_2}(\lambda)(1-c)F_2(m, y, k) + R^{1/n}_{KM_3}(\lambda)(1-c)F_3(m, y, k) +$$
$$R^{1/n}_{KM_4}(\lambda)(1-c)F_4(m, y, k) + R^{1/n}_{KM_5}(\lambda)(1-c)F_5(m, y, k) +$$
$$R^{1/n}_{KM_6}(\lambda)(1-c)F_6(m, y, k) + R^{1/n}_{KM_7}(\lambda)(1-c)F_7(m, y, k) +$$
$$R^{1/n}_{KM_8}(\lambda)cF_8(m, y, k) + R^{1/n}_{KM_9}(\lambda)cF_9(m, y, k) +$$
$$R^{1/n}_{KM_{10}}(\lambda)cF_{10}(m, y, k) + R^{1/n}_{KM_{11}}(\lambda)cF_{11}(m, y, k) +$$
$$R^{1/n}_{KM_{12}}(\lambda)cF_{12}(m, y, k) + R^{1/n}_{KM_{13}}(\lambda)cF_{13}(m, y, k) +$$
$$R^{1/n}_{KM_{14}}(\lambda)cF_{14}(m, y, k) + R^{1/n}_{KM_{15}}(\lambda)cF_{15}(m, y, k)\big)^n$$

or written more compactly $$R(\lambda, c, m, y, k) = \left((1-c)\sum_{i=0}^{7} R^{1/n}_{KM_i}(\lambda)F_i(m, y, k) + c\sum_{i=8}^{15} R^{1/n}_{KM_i}(\lambda)F_i(m, y, k)\right)^n$$

Variables
R is the output reflectance (from 0 to 1)
$\lambda$ is the wavelength
c, m, y, k are the fractions of cyan, magenta, yellow, and black from 0 to 1
n is the Yule-Nielsen exponent (we use 2 in the blend model)
$R_{KM_i}$ are the reflectances of the primaries (we calculate with Kubelka-Munk in the blend model)
$F_i$ is a multi-linear function of m, y, k or (1–m), (1–y), (1–k) which depend on the primary associated with i. Definitions are listed at the end of this document.

2 Find Cyan Matching Target R

Fixing $\lambda$ to 670 nm, you can set a desired 670 nm modulation and solve directly for the modulation in cyan while keeping all other inks fixed with this:

$$c = \frac{R^{1/n}_{target}(\lambda) - \sum_{i=0}^{7} R^{1/n}_{KM_i}(\lambda)F_i(m, y, k)}{\sum_{i=8}^{15} R^{1/n}_{KM_i}(\lambda)F_i(m, y, k) - \sum_{i=0}^{7} R^{1/n}_{KM_i}(\lambda)F_i(m, y, k)}$$

If the target is not physically reachable, you'll get unrealistic values of c (i.e., greater than 1 or less than 0) which are straight-forward to filter out. It is also straight forward to directly compute the reachable set of 670 nm reflectances ahead of time to aid in setting the 670 nm targets.

Once cyan is set, you can adjust magenta and yellow to meet tolerances on L*a*b* or other visibility requirements. These inks have little visibility at 670 nm so this can be done without significantly impacting the robustness.

Note: You could rearrange this to solve for k instead. In general, any ink that is dark to the scanner can be used to set robustness and any ink which has low visibility to the scanner can be used to adjust human visibility independent of the robustness.

3 Appendix: $F_i$(m,y,k) Definitions

The $F_i$(m,y,k) functions defined above are products of mor(1–m), yor(1–y), and kor(1–k) depending on whether the primary associated with i has 0% or 100% of the given ink. The association with i is arbitrary. The convention used in this document maps the least significant bit of i to black, the second least significant bit of i to yellow and the third least significant bit of i to magenta (cyan is associated with the most significant bit of i, but that mapping is explicit in the equation and not a part of $F_i$ as defined here).

| i | Binary i | Primary Inks | $F_i$(m, y, k) |
|---|---|---|---|
| 0 | 0000 | 0% cyan, 0% magenta, 0% yellow, 0% black | $(1-m)(1-y)$ $(1-k)$ |
| 1 | 0001 | 0% cyan, 0% magenta, 0% yellow, 100% black | $(1-m)(1-y)k$ |
| 2 | 0010 | 0% cyan, 0% magenta, 100% yellow, 0% black | $(1-m)y(1-k)$ |
| 3 | 0011 | 0% cyan, 0% magenta, 100% yellow, 100% black | $(1-m)yk$ |
| 4 | 0100 | 0% cyan, 100% magenta, 0% yellow, 0% black | $m(1-y)(1-k)$ |
| 5 | 0101 | 0% cyan, 100% magenta, 0% yellow, 100% black | $m(1-y)k$ |
| 6 | 0110 | 0% cyan, 100% magenta, 100% yellow, 0% black | $my(1-k)$ |
| 7 | 0111 | 0% cyan, 100% magenta, 100% yellow, 100% black | $myk$ |

-continued

| i | Binary i | Primary Inks | $F_i(m, y, k)$ |
|---|---|---|---|
| 8 | 1000 | 100% cyan, 0% magenta, 0% yellow, 0% black | $(1 - m)(1 - y)(1 - k)$ |
| 9 | 1001 | 100% cyan, 0% magenta, 0% yellow, 100% black | $(1 - m)(1 - y)k$ |
| 10 | 1010 | 100% cyan, 0% magenta, 100% yellow, 0% black | $(1 - m)y(1 - k)$ |
| 11 | 1011 | 100% cyan, 0% magenta, 100% yellow, 100% black | $(1 - m)yk$ |
| 12 | 1100 | 100% cyan, 100% magenta, 0% yellow, 0% black | $m(1 - y)(1 - k)$ |
| 13 | 1101 | 100% cyan, 100% magenta, 0% yellow, 100% black | $m(1 - y)k$ |
| 14 | 1110 | 100% cyan, 100% magenta, 100% yellow, 0% black | $my(1 - k)$ |
| 15 | 1111 | 100% cyan, 100% magenta, 100% yellow, 100% black | $myk$ |

Note:
As defined, $F_i = F_{i+8}$. This would let the denominator of the equation solving for cyan be simplified.

Note: As defined, $F_i = F_{i+8}$. This would let the denominator of the equation solving for cyan be simplified.

Let's take a closer look at some of these expressions, which rewrites the blend model equation in terms of cyan (c) and the other terms.

$$R_{target}^{1/n} = c\sum_{i=0}^{7} a_i + (1-c)\sum_{i=8}^{15} a_i$$

The "$a_i$" terms depend on the magenta, yellow, and black values at a pixel being solved for and the various Kubelka-Munk primary reflectance values (the R terms). The original Kubelka-Munk paper was published as Kubelka, P. and Monk, F., Z tech. Physik, 12, 493 (1931), and is summarized in hunterlab (2008), The Kubelka-Munk theory and K/S, insight on color. Application Note, Vol 18, 7. (http://www-.hunterlab.com/appnotes/an07_06.pdf), which are both hereby incorporated herein by reference in their entirety. An English translation is found in Kubelka, P. and Monk, "An Article on Optics of Paint Layers," F., Z tech. Physik, 12, 493 (1931), English Translation by Stephen H. Westin, revised Mar. 12, 2004. (16 pages), which is hereby incorporated herein by reference. See also Dfimbeg-Malcic et al., "KUBELKA-MUNK THEORY IN DESCRIBING OPTICAL PROPERTIES OF PAPER (I)," Technical Gazette 18, 1(2011), 117-124, which is hereby incorporated herein by reference in its entirety For the purposes of solving for cyan, these can all be considered as constants. Rearranging the equation above to solve for cyan yields:

$$c = \frac{R_{target}^{1/n} - \sum_{i=8}^{15} a_i}{\sum_{i=0}^{7} a_i - \sum_{i=8}^{15} a_i}$$

The term:

$$\sum_{i=8}^{15} a_i$$

is a Yule-Nielsen scaled reflectance (i.e., reflectance raised to the 1/n power) for this pixel (i.e., for this combination of magenta, yellow, and black) when cyan is 0%. See, e.g., J. A. C. Yule, W. J. Nielsen, "The penetration of light into paper and its effect on halftone reproductions," Proc. TAGA, Vol. 3, 65-76 (1951), which is hereby incorporated herein by reference in its entirety; see also Hersch, et. al. "Improving the Yule-Nielsen modified spectral Neugebauer model by dot surface coverages depending on the ink superposition conditions," Electronic Imaging Symposium, Conf. Imaging X: Processing, Hardcopy and Applications, January 2005, SPIE Vol. 5667, 434-445, which is incorporated herein by reference; and see Wyble et al., "A critical review of spectral models applied to binary color printing," Color Research & Application, 25(1):4-19, 2000, which is hereby incorporated herein by reference in its entirety.

The term:

$$\sum_{i=0}^{7} a_i$$

is the analogous value for this pixel when cyan is 100%. These two points are the boundaries of the possible scaled reflectance values and the blend model includes, e.g., a linear interpolation between these two points parameterized by the amount of cyan. That is what is expressed by this equation:

$$R_{target}^{1/n} = c\sum_{i=0}^{7} a_i + (1-c)\sum_{i=8}^{15} a_i$$

The equation solving for cyan can be interpreted as:
Numerator: Subtract the scaled reflectance when cyan is 0% from the target scaled reflectance to obtain a desired distance along the line connecting the scaled reflectance at 100% and 0% cyan.
Denominator: Subtract the scaled reflectance when cyan is 0% from the scaled reflectance when cyan is 100%.
Solving for cyan: Dividing numerator by denominator yields cyan as the proportion of the change in scaled target reflectance from 0% cyan to the maximum range of scaled reflectance change from 0% and 100% cyan.

So, if the forward blend model is rewritten as "blend(c, m,y,k)", solving for cyan to match a target reflectance can be described with the following equation (which would take at most two forward evaluations of the blend model):

$$c = \frac{R_{target}^{1/n} - \text{blend}(\text{cyan} = 0.0, m, y, k)^{1/n}}{\text{blend}(\text{cyan} = 1.0, m, y, k)^{1/n} - \text{blend}(\text{cyan} = 0.0, m, y, k)^{1/n}}$$

This interpretation generalizes and may be helpful for understanding other applications. For example, if solving for two inks instead of one, we would be solving for a reflectance that fits somewhere in a convex set formed by possible combinations of 0% and 100% of that ink. That can have multiple solutions, so constraints can be used to help ensure a unique solution.

Dot gain can be applied by adjusting ink percentages according to dot gain curves. To ensure dot gain is included, the following steps can be taken:

1. Apply dot gain to the input ink percentages (magenta, yellow, black) and use those in the blend model equations that solve for cyan.
2. Apply the dot gain in reverse to the resulting cyan value to obtain the output value. For example, if dot gain is applied via interpolation, the interpolation can simply be reversed.

Note that the above calculation can result in cyan percentages below 0% or above 100%. This occurs when the reflectance target is not physically realizable. In this case, the ink is simply saturated to either 0% (when below 0%) or 100% (when above 100%) to achieve the closest possible reflectance to the target.

So, through the above acts, a target reflectance value can be obtained as closely as possible in artwork by changing cyan. This will cause an increase/decrease in Luminance (L*). A following step is to reduce the change in Luminance (L*) in the adjusted artwork. Change in luminance (L*) can be minimized by adjusting magenta. Magenta changes to minimize luminance changes are in the opposite direction of a cyan adjustment. For example, if cyan is added, magenta should be removed, and if cyan is removed, magenta should be added. Similarly, changes in b* due to changes in cyan can be minimized by changing yellow, this time in the same direction as the cyan change. That is, we prefer to add yellow to minimize b* changes when cyan has been increased and decrease yellow when cyan has been decreased.

A visibility compensation algorithm includes the following:
1. Using a color search, adjust magenta in the opposite direction that cyan was changed to minimize a change in L* relative to the original artwork. For example, a binary search can be used to find a new magenta value that returns the encoded Luminance (L*) value to the original, pre-signal carrying state, all while maintaining the target reflectance value. The binary search may work, e.g., in halves. For example, if its original value is 128, a first iteration in the binary search may choose 192 (½ way between 128 and 255) and see if the resulting luminance is closer to the original. The next iteration may choose halfway between 192 and 255 (224), and then ½ way again, until a value is obtained that returns the encoded artwork to the same Luminance (L*) (or to a Luminance (L*) within a predetermined tolerance, e.g., +/−0.02-5 units). The magnitude of the magenta change above is referred to below as "magenta_magnitude".
2. The process can stop here if it's acceptable to only minimize L* changes. Or the process can continue if b* changes can be minimized as well.
3. We would like to estimate a contour of minimum L* change so we can find the minimum b* while also keeping L* changes small. To do this, we can rerun the binary search, twice. For the first search, add "k*magenta_magnitude" to yellow (if cyan was added—otherwise, subtract this amount of yellow), where k is a constant in the range of 0.4-0.8, preferably in a range of 0.5-0.07, and even more preferably k=0.6. For the second search, add m*magenta_magnitude to yellow (or subtract if cyan was subtracted), where m is a constant in the range of 0.8-1.8, preferably in the range of 1.0-1-4, and even more preferably m=1.2. (The k*magenta_magnitude is a heuristic to help with performance by keeping the number of additional searches small (e.g., the two extra) while examining a distance in yellow which can be observed to typically reach the minimum b* contour. Another approach would be to calculate the minimum L* contour for all possible combinations of yellow in the appropriate direction.)
4. Now we have three points along the minimum L* change contour, which can be used to run a binary search on yellow to find a yellow change to minimize b*. For any change in yellow, linear interpolation of the samples of the L* minimum contour can be used to find a magenta value that stays approximately on the L* minimum contour.
5. With the updated yellow value that minimized b*, we can optionally perform another search of magenta to ensure L* is minimized.
6. Check that after adjusting yellow, the minimization of L* has not been impacted. For some colors (notably when there is low magenta), the b* minimization process following these steps may result in a L* that is further from the original than obtained by adjusting magenta alone. This process can be adjusted to change only magenta if such results in a lower change in L*.

An example of altering a single pixel from color artwork is now provided. Of course, the technology is not limited by this example. For other pixels in a color artwork file, the steps would be similar except each pixel will have its own target reflectance value, perhaps the same but likely different depending on the artwork and information signal.

We'll begin with a mid-gray CMYK pixel having the following value information shown in Table 1:

TABLE 1

| Cyan | Magenta | Yellow | Black | Reflectance 670 nm | (L*, a*, b*) |
|---|---|---|---|---|---|
| 161/255 (63.1%) | 134/255 (52.5%) | 134/255 (52.5%) | 13/255 (5.1%) | 20.64% | (49.4, −1, 0) |

Reflectance values (R) are generated from the above detailed blend model. To make the example more concrete, values used are presented in Table 2 below. Table 2 includes values of 0% and 100% for Cyan (C), Magenta (M), Yellow (Y) and Black (K). The index is arranged so that its binary representation indicates which combination it corresponds to (i.e., the least-significant bit $000\underline{0}$ corresponds to Black, the most-significant bit $\underline{1}000$ corresponds to Cyan, etc.). Each of the reflectance values (R) shown in the table are the so-called Kubelka-Munk primaries (denoted with the "KMi" subscript). These are the reflectance values at 670 nm for possible combinations of 0% or 100% ink. (These values are obtained from two places: 1. If there is at most one ink at 100% in the primary (index 0, 1, 2, 4, or 8), the reflectance value represent offset press measurements with a spectrophotometer. 2. If a primary has more than one ink with 100%, the measured reflectance spectra described in item 1 are evaluated by the "Kubelka-Munk" model, which estimates the result. This means any index other than 0, 1, 2, 4, or 8 is not based purely on measurement, but uses a mathematical model. Of course, measurements or calculations could be used alternatively.)

TABLE 2

| Index (i) | C | M | Y | K | R at R670 ($R_{KMi}$) |
|---|---|---|---|---|---|
| Dec: 0 Bin: 0000 | 0% | 0% | 0% | 0% | 89.8% |

TABLE 2-continued

| Index (i) | C | M | Y | K | R at R670 ($R_{KMi}$) |
|---|---|---|---|---|---|
| Dec: 1<br>Bin: 0001 | 0% | 0% | 0% | 100% | 2.5% |
| Dec: 2<br>Bin: 0010 | 0% | 0% | 100% | 0% | 85.1% |
| Dec: 3<br>Bin: 0011 | 0% | 0% | 100% | 100% | 2.5% |
| Dec: 04<br>Bin: 0100 | 0% | 100% | 0% | 0% | 80.4% |
| Dec: 05<br>Bin: 0101 | 0% | 100% | 0% | 100% | 2.5% |
| Dec: 6<br>Bin: 0110 | 0% | 100% | 100% | 0% | 79.4% |
| Dec: 7<br>Bin: 0111 | 0% | 100% | 100% | 100% | 2.5% |
| Dec: 8<br>Bin: 1000 | 100% | 0% | 0% | 0% | 6.5% |
| Dec: 9<br>Bin: 1001 | 100% | 0% | 0% | 100% | 1.9% |
| Dec: 10<br>Bin: 1010 | 100% | 0% | 100% | 0% | 6.5% |
| Dec: 11<br>Bin: 1011 | 100% | 0% | 100% | 100% | 1.9% |
| Dec: 12<br>Bin: 1100 | 100% | 100% | 0% | 0% | 6.5% |
| Dec: 13<br>Bin: 1101 | 100% | 100% | 0% | 100% | 1.9% |
| Dec: 14<br>Bin: 1110 | 100% | 100% | 100% | 0% | 6.5% |
| Dec: 15<br>Bin: 1111 | 100% | 100% | 100% | 100% | 1.9% |

Of course, the actual numbers and how they are obtained are not necessary to understanding the steps in the following examples. (The Yule-Nielsen parameter used throughout is n=2. Dot-gain calculations using a GRACoL profile will be included in this example.)

A target robustness value is selected and a value for cyan is found that meets that target. For our pixel, we'll use a target reflectance value that subtracts 8% from the original 670 nm reflectance (20.64%). This 8% represents a "tweak" or change to carry an element of an information signal. In practice, however, the target reflectance value would be obtained by looking at combined artwork & signal reflectance at or around 660 nm for a given pixel or group of pixels. Table 1 above noted the artwork reflectance is 20.64% (which is found, e.g., by running a blend model on the inks that make up the color at the subject pixel). Subtracting 8% gives the target reflectance value shown in Table 3 as 12.64%:

TABLE 3

| Original Reflectance | Change in Reflectance due to Signal | Target Reflectance 670 nm |
|---|---|---|
| 20.64% | 8% | 12.64% |

This target reflectance can be used by the above blend model implementations to solve for cyan. Ink levels not solved for can be converted into proportions (e.g., from 0 to 1, where 0 is 0%, 1 is 100%). A dot gain can be used as well. Table 4 shows values before and after dot gain:

TABLE 4

| | Magenta (m) | Yellow (y) | Black (k) |
|---|---|---|---|
| Before Dot Gain | 0.525 | 0.525 | 0.051 |
| After Dot Gain | 0.587 | 0.560 | 0.058 |

The "After Dot Gain" values are then used in the $F_i(m,y,k)$ terms. In short these are a product of m (or 1−m), y (or 1−y), and k (or 1−k). If the index corresponds to a primary where the ink is 100%, then m, y, or k is used—otherwise, 1−m, 1−y, or 1−k is used.

Some examples include:

Index 0 corresponds to 0% magenta, 0% yellow, 0% black, so the term is (1−m)*(1−y)*(1−k).

Index 1 corresponds to 0% magenta, 0% yellow, 100% black, so the term is (1−m)* (1−y)*k Index 7 corresponds to 100% magenta, 100% yellow, 100% black, so the term is m*y*k

TABLE 5

| index (i) | $F_i(m, y, k)$ |
|---|---|
| 0 | 0.1715 |
| 1 | 0.0105 |
| 2 | 0.2178 |
| 3 | 0.0134 |
| 4 | 0.2435 |
| 5 | 0.0150 |
| 6 | 0.3093 |
| 7 | 0.0190 |
| 8 | 0.1715 |
| 9 | 0.0105 |
| 10 | 0.2178 |
| 11 | 0.0134 |
| 12 | 0.2435 |
| 13 | 0.0150 |
| 14 | 0.3093 |
| 15 | 0.0190 |

In the above Table 5, note that values 0 through 7 are the same as 8 through 15. In the blend model, these terms would vary by whether cyan is 0% or 100%, but since cyan is being solved for it is not a factor. Now we can solve for the effective cyan. Here we'll split it into the denominator and numerator:

$$\text{Numerator: } R_{target}^{1/n} - \sum_{i=0}^{7} R_{KM_i}^{1/n}(\lambda) F_i(m, y, k) = -0.5110$$

Denominator:

$$\sum_{i=8}^{15} R_{KM_i}^{1/n}(\lambda) F_i(m, y, k) - \sum_{i=0}^{7} R_{KM_i}^{1/n}(\lambda) F_i(m, y, k) = -0.6188$$

Dividing numerator by denominator yields 0.8258, which is the effective proportion (with dot gain applied). We can interpolate the dot gain curve in reverse to obtain the final value shown in Table 6.

TABLE 6

|  | Target Cyan |
| --- | --- |
| Effective (Before removing dot gain effect) | 0.8258 |
| Final (After removing dot gain effect) | 0.7926 |

The final cyan value is 79.26%, or 202/255 when mapped to 8-bit values. The initial and cyan adjusted values are shown in Table 7. Recall, here, that the target reflectance value is 12.64%. Our result is very close, 12.67%. (In practice, a R670 nm result in the range of +/−0-1.7% from the target reflectance will likely achieve a detectable signal. In this example, R670 nm in a range of 10.94%-14.34% would likely yield a detectable signal.)

TABLE 7

|  | Cyan | Magenta | Yellow | Black | R670nm | (L*, a*, b*) |
| --- | --- | --- | --- | --- | --- | --- |
| Initial | 161/255 (63.1%) | 134/255 (52.5%) | 134/255 (52.5%) | 13/255 (5.1%) | 20.64% | (49.4, −1, 0) |
| C Adjust to R670 Target | 202/255 (79.3%) | 134/255 (52.5%) | 134/255 (52.5%) | 13/255 (5.1%) | 12.67% | (44.3, −11, −8) |

Note, however, from Table 7 above that the L*a*b* values have changed after changing cyan. This will result in visible artifacts in the artwork due to encoding the signal. Magenta and/or Yellow can be adjusted to reduce L* and b* changes; hence, reducing visibility of the encoded signal.

Figure 12A:
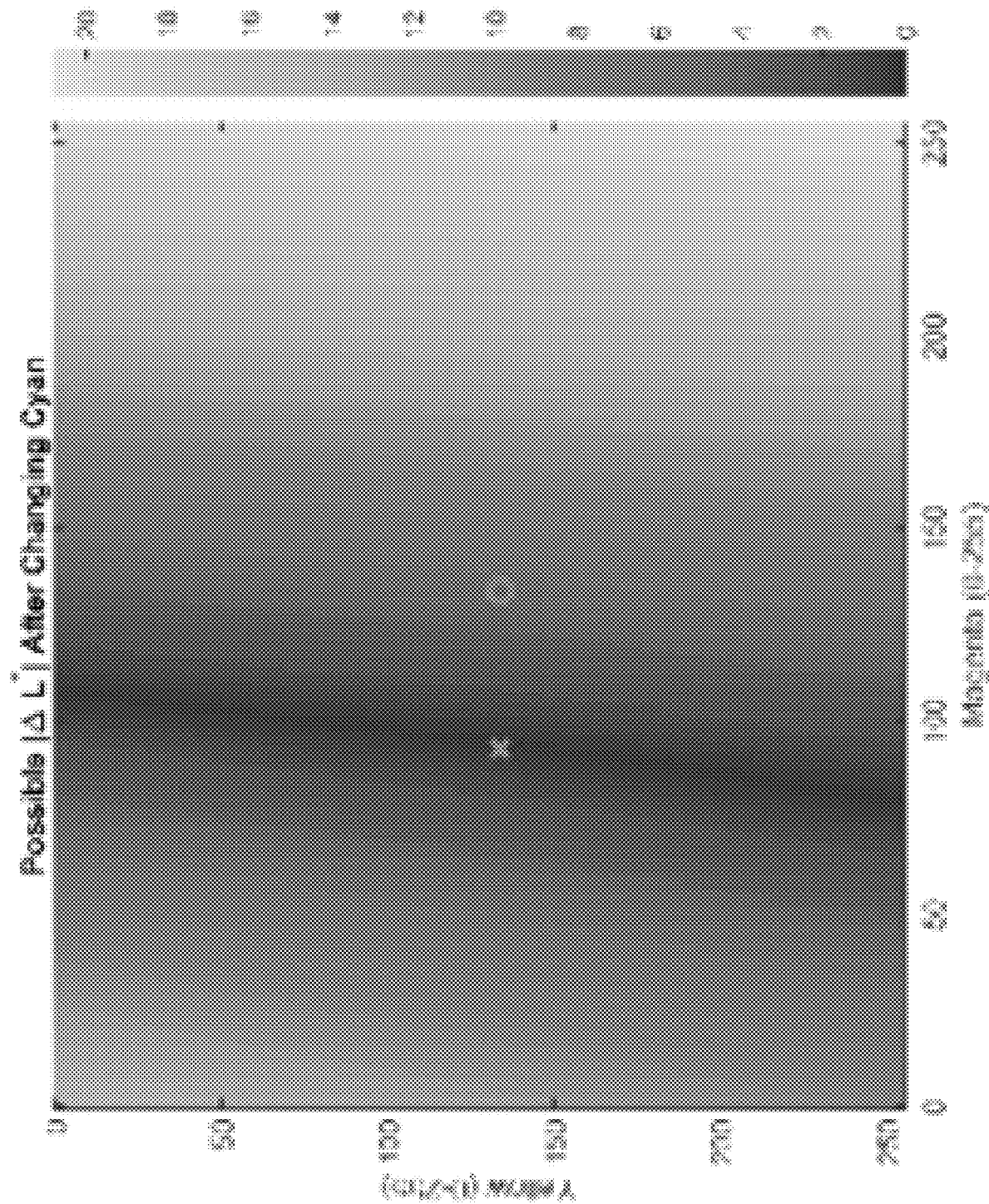
FIGS. 12A-12C show changes to L*, a*, b* in a yellow/magenta space.
Figure 12B:
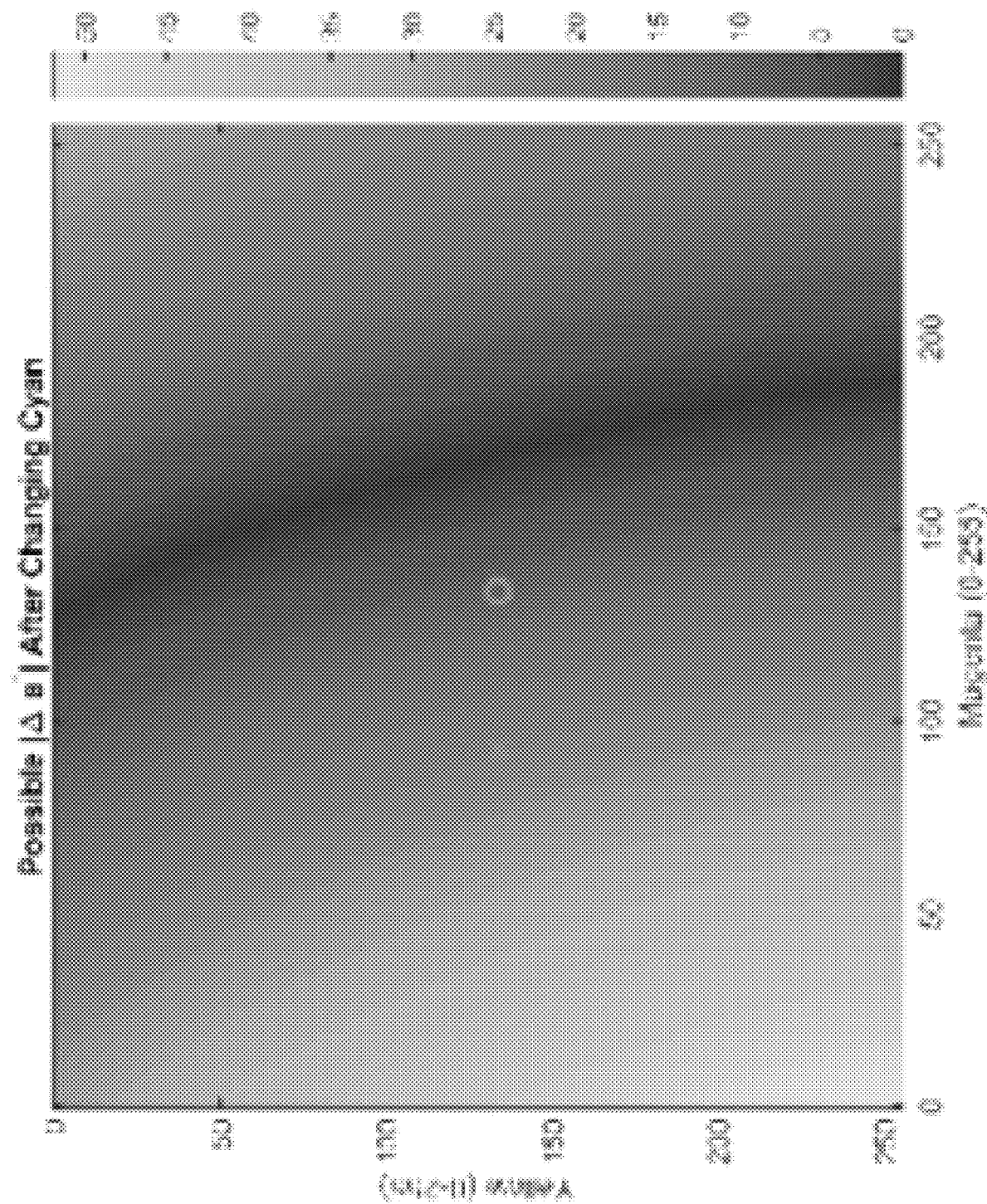
Figure 12C:
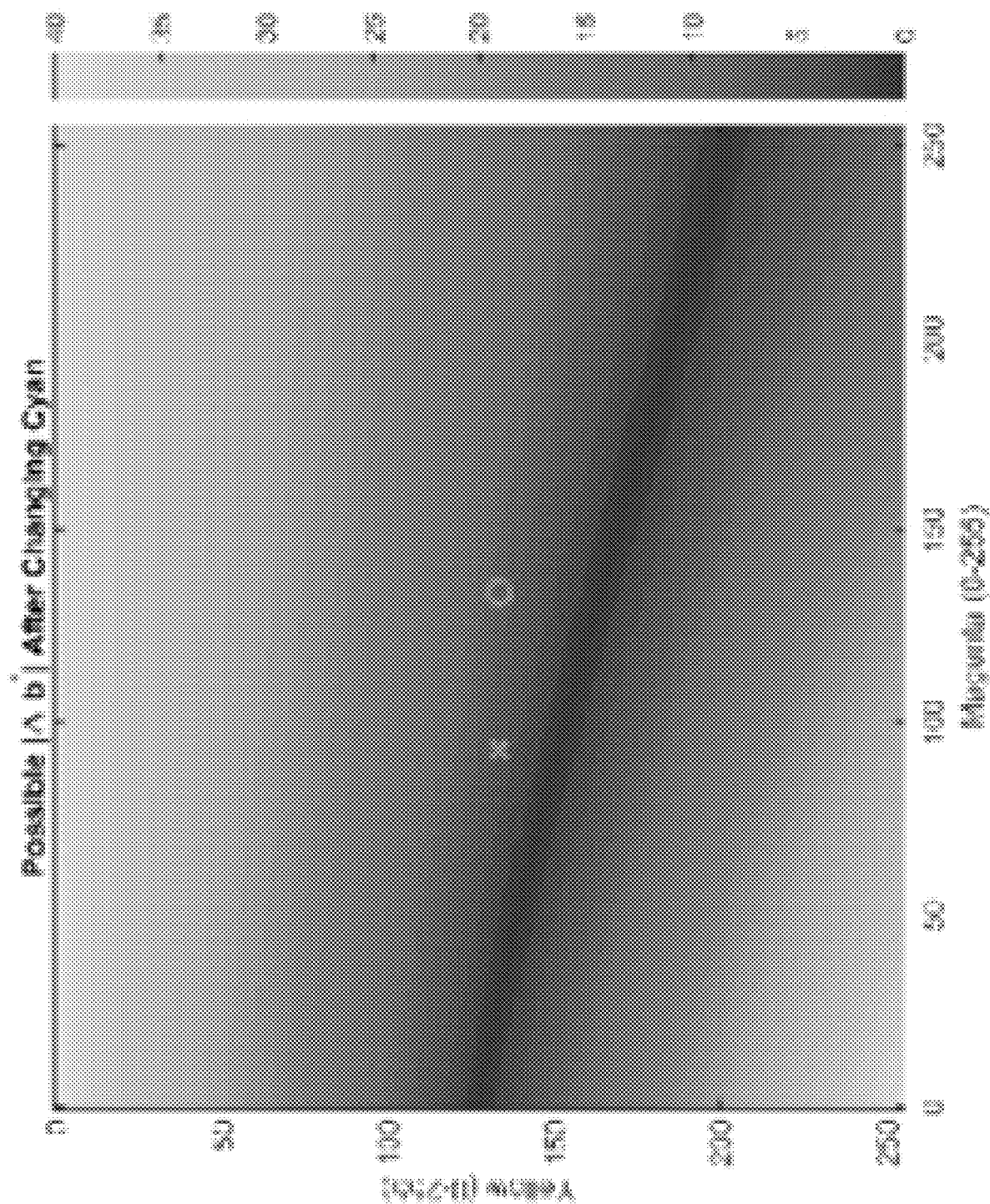

One way to visualize how changing magenta and yellow to minimize L* is to plot a magnitude of change in L* from the original image for possible combinations of magenta and yellow. FIGS. 12A-12C shows the difference in L* (FIG. 12A), a* (FIG. 12B), b* (FIG. 12C) from the original artwork after setting cyan then examining possible values (0 to 255) for magenta and yellow. The circle (which is not on the darkest cyan region of the L* change map—i.e., the contour of minimum L* change in this example) shows where you'd be if you changed cyan but kept the original magenta and yellow values from the color you're changing. The "x" on the L* contour shows how you can hit the L* contour just by adjusting magenta. These figures show that moving toward the minimum L* contour also tends to increase the a* change. Magenta changes are fairly close to orthogonal to changes in b*, however, so the L* minimum can often be found without significantly changing b*. A contour of minimum L* change includes a line along the darkest blue in FIG. 12A. You can visualize contours of the L* change by drawing lines connecting the same color. The minimum is where this is the smallest. A contour would show, generally, values of magenta and yellow resulting in little or no L* change (though they'd have differing amounts of a* and b* change, depending which particular value on the contour you chose).

Another way to interpret FIGS. 12A-12C is to understand that the contour of minimum L* (e.g., darkest blue area in FIG. 12A) does not intersect with the contour of minimum a* (e.g., darkest blue area in FIG. 12B), but it does generally intersect with the contour of minimum b* (e.g., darkest blue area in FIG. 12C). This means, generally, that it is difficult to minimize L* changes and a* changes simultaneously, but, generally, it is more readily feasible to minimize L* and b* simultaneously. Of note, FIGS. 12A-12C are specific to a color being tweaked and an amplitude of 670 nm change. So, to generalize, if using a small 670 nm amplitude change, the L* contours are very close to the original color (e.g., so the dark blue line would be closer to the circle), and for larger 670 nm amplitude changes they would be further from the circle.

If all we want to do is minimize L* we can generally do this by adjusting magenta and keeping other variables fixed. The changes are monotonic, so a binary search algorithm will work. In this case, the minimum L* change is found where magenta has gone to 93/255 or 36.47%.

A change in magenta will often be enough to offset the visibility differences due to the change in cyan. But for some colors, it is desirable to also minimize the change in b*. In terms of visibility, it can be important to keep L* changes small, we ideally do this by adjusting yellow while also adjusting magenta to approximately stay on the contour of minimum L* change. The contour of minimum L* can be approximated by sampling yellow at two new values and repeating the above procedure. Magenta changed from 134 to 93, for a step of −41. The algorithm samples yellow in the opposite direction of the magenta change at, e.g., 0.6-1.2 times (or other values noted above) the magnitude of the initial magenta change. That is, find the magenta value that minimizes L* at Cyan=202/255, Yellow=(134+round(41*0.6))/255=159/255, Black=13/255 and also at the same values but Yellow=(134+round(41*1.2))/255=183. Together with the first value, these are three samples along the minimum L* contour. This allows us to approximate the contour linearly, providing a magenta value for any yellow which is approximately on the minimum L* contour. Using this approximation and iterating over yellow (e.g., with a binary search, as it is also generally monotonic), the point which simultaneously minimizes b* and L* can be found.

FIG. 13 shows an RGB representation of possible yellow/magenta changes, highlighting the minimum points we've discussed above. Rather than creating 3 plots colored according to the magnitude of the L*, a*, and b* changes at each possible magenta/yellow combination after tweaking cyan, FIG. 13 shows a resulting absolute L*a*b* value converted to RGB. At the top, a mid-gray original, then the color value after tweaking cyan alone (maps to the circle). FIG. 13 also shows resulting colors when minimizing L* alone (by only tweaking magenta), as well as minimizing L* and b* together (by tweaking both magenta and yellow).

Table 8, below, shows embedding results.

TABLE 8

|  | Cyan | Magenta | Yellow | Black | R670 nm | (L*, a*, b*) |
| --- | --- | --- | --- | --- | --- | --- |
| Initial | 161/255 (63.1%) | 134/255 (52.5%) | 134/255 (52.5%) | 13/255 (5.1%) | 20.64% | (49.4, −1, 0) |
| Cyan Adjusted to R670 Target | 202/255 (79.3%) | 134/255 (52.5%) | 134/255 (52.5%) | 13/255 (5.1%) | 12.67% | (44.3, −11, −8) |
| Magenta adjusted to minimize L* | 202/255 (79.3%) | 93/255 (36.5%) | 134/255 (52.5%) | 13/255 (5.1%) | 12.74% | (49.4, −22, −5) |
| Magenta and yellow adjusted to minimize L* and b* | 202/255 (79.3%) | 91/255 (35.7%) | 151/255 (59.2%) | 13/255 (5.1%) | 12.73% | (49.4, −24, 0) |

We hypothesize that there may be an advantage in some cases to modulating colors not just in a*, but in some combination of a* and b*. And, let's assume that it is generally not possible to reduce L* without increasing a* changes. This makes a* the most difficult component to control and may raise a question of how to realize alternative color directions while still prioritizing minimizing the L* changes.

One way to go about this would be to replace the step which searches along the contour of minimum L* change to minimize any changes in b* with a similar step that minimizes the orthogonal component to the a*-b* plane direction of interest. This is a generalization of what is being done–b* is the orthogonal direction to a* in the a*-b* plane so minimizing b* is the same as steering the signal to put most of its energy into a*. In this case, rather than looking to minimize "b_current–b_original", you could minimize, e.g., abs((b_current–b_original)*sin(angle)+(a_current–a_original)*cos(angle)), where "angle" is chosen appropriately (135 for "angle").

We suggested a binary search above in some steps. A binary search is convenient to implement, and not too slow, but other searching techniques can be employed. Using tables which sample ink space for ranges of reflectance targets to provide initial estimates is an alternative to a binary search.

A CME process will typically step through each image pixel, or image area, to determine a change in color values to encode a signal. One implementation sorts pixels by size of target reflectance value. By doing this, a faster loop can be achieved (e.g., solve for the very small changes using a better iterative method that doesn't involve an exhaustive binary search—then use these changes as a starting point for the next largest changes, and so on).

Visibility constraints can be inputs for a CME system. For example, a maximum level can be specified for changes in L* and a* (and, additionally, b*, but b* visibility is generally not a concern). In one embodiment, the algorithms outlined above are used to adjust CMY(K) colors to achieve a target reflectance while minimizing L* and b* changes. Changes in L* and a* can then be evaluated. For pixels where the maximum allowed L* change and/or a* change is exceeded, the requested 670 nm reflectance change is reduced, and the algorithms can be rerun. In one example, maximum levels can be observed by running the algorithms with 100% of the maximum requested 670 nm reflectance change, and then processing at some lower 670 reflectance change increment, e.g., 80%, 60%, 40%, 20%, and 0% (i.e., no signal) of the 670 nm reflectance change, stopping the processing at the highest percentage which meets the maximum constraints set.

In one example above we discussed encoding on a per-pixel basis. In that case, the algorithms operate on each pixel. To make encoding more efficient, a filtering operation is carried out prior to enhancement to identify redundant pixels, e.g., those pixels having the same or similar color values or L*a*b* values. Then, the encoding algorithms are only performed once per unique combination of parameters, and then map that individual calculation to all the pixels it applies to.

As an illustrative example—imagine an image including a line of four (4) pixels. All of these four pixels are 50% cyan, 0% magenta, 0% yellow, 0% black. Now say a signal that modifies this line of pixels incudes a 670 nm reflectance change of +5%, –5%, +5%, –5%. There are only two unique values for the signal: +5% and –5%. If you run the algorithm we've described, it will run four times—one for each pixel in the artwork. If instead, you realize that your pixels are all the same color and you're only doing two unique values for your signal (+5%, –5%), you can instead run the algorithm twice—once to calculate the tweak to make 50% cyan, 0% magenta, 0% yellow, 0% black have +5% reflectance, and once to calculate the tweak make 50% cyan, 0% magenta, 0% yellow, 0% black have –5% reflectance. Then you can map these tweaks to the original image, for every pixel where it applies, according to the + or – signal values.

If instead, you have different groups of pixels (or other image areas) of 0% cyan, 25% cyan, 50% cyan, and 75% cyan, you do four different computations. So, you can look for a way to identify redundancies in your image. Thus, we only do a new computation if the ink used in the original artwork and the requested value of 670 nm reflectance modulation are unique. An algorithm for identifying redundant pixels in a CMYK (or other color system) image is now presented:

1. CMYK values are represented as 8-bit values.
2. Quantize the requested 670 nm reflectance signal to some finite set of values. For example, 511 values are used to map an encoded signal from [–1, +1] (this is almost 9-bits, but using 511 values instead of a full 512 value set lets zero ("0") be represented, ensuring areas where the signal is 0 can be left untouched).
3. Each CMYK value is 8-bits, so there are 256 possible values and the signal has 511 possible values. This group of five numbers can be mapped to a unique single Key number, $K_N$, e.g.:

$$K_N = C + 256*M + 256^2*Y + 256^3*K + 256^4*S$$

where C,M,Y,K are the CMYK values (represented from 0 to 255) and S is the signal value (represented from 0 to 510 units—with 0 mapping to –1, 510 mapping to 1, and the rest distributed uniquely)

4. Once you have the above key numbers, you can identify unique numbers within an image. The enhancement algorithm is executed once for each unique number then map tweaks to pixels with the same key number.

The above is an algorithm to identify like pixels and unique pixels. Instead of 8 bits and almost 9 bits, smaller values can be used (e.g., round to nearest 7-bits for CMYK and 7-bits for signal). You could do this to increase the redundancy, which reduces the amount of computation and speeds up enhancement time, although it trades off by adding some approximation error in the results. An example is shown in Table 9, below:

TABLE 9

|  | Pixel 1 | Pixel 2 | Pixel 3 | Pixel 4 |
| --- | --- | --- | --- | --- |
| Cyan | 50% (128) | 50% (128) | 50% (128) | 50% (128) |
| Magenta | 0% (0) | 0% (0) | 0% (0) | 0% (0) |
| Yellow | 0% (0) | 0% (0) | 0% (0) | 0% (0) |
| Black | 0% (0) | 0% (0) | 0% (0) | 0% (0) |
| Signal | +5% (268) | –5% (243) | +5% (268) | –5% (243) |
| Key Number | 1151051235456 | 1043677053056 | 1151051235456 | 1043677053056 |

To further describe the example, percentages are mapped to integers. CMYK can be linearly mapped [0%, 100%] to [0, 255]. So, 50% cyan becomes round(0.5*255)=128 and 0% for the other inks becomes 0. The signal maps [−100%, +100%] to [0, 511] so +5% becomes round((0.05−1)/2*511)=268 and similarly, −5% becomes 243. The key number is computed from C+M*256+Y*256^2+K*256^3+S*256^4, yielding the numbers shown in "Key Number" row in Table 9. The unique values here include: 128+256^4*268=1151051235456 and 128+256^4*243=1043677053056. The enhancement algorithm is only run twice with these parameters. The enhancement result for the values associated with the key 1151051235456 are mapped to Pixel 1 and Pixel 3 and the result for the enhancement values associated with key 1043677053056 are mapped to Pixel 2 and Pixel 4.

While the above embodiments have focused on CMYK colors, the present disclosure is not so limited. For example, we mentioned spot colors and ECG colors. These color systems can be similarly enhanced. For example, ECG colors will use corresponding ICC profiles, and spot colors can use blend model information. One detail that will change will be a choice of which inks carry an encoded signal. For CMYK, cyan and black are dark to the scanner, and are good candidates to carrying a signal. Similarly, 670 nm reflectance curves can be evaluated to determine which of OGV or spot colors can be seen by a 670 nm scanner and which inks can be used to compensate for L* changes.

The above enhancement algorithm of offsetting L* changes with magenta, and offsetting magenta with yellow can be generalized into 2 acts, including: 1) a robustness act (where cyan and/or black are adjusted), and 2) a visibility compensation act (where magenta and/or yellow are adjusted). The robustness act sets robustness up to the resolution of the system. With visibility compensation, magenta and yellow are adjusted to compensate for visibility, which have small impact on the robustness set with cyan and/or black. This small impact is generally negligible, but it is not completely zero. To regain some of the non-zero accuracy, the enhancement process may continue to iterate. Consider the following algorithm using only cyan and magenta for simplicity:
  1. Change cyan to set reflectance to the desired 670 nm target (e.g., including original cyan value+an encoded signal tweak).
  2. Change magenta to minimize L* changes due to the reflectance target.
  3. Check the resulting reflectance to see how much different it is from the desired target due to the magenta changes. If it is larger than allowed, use the current tweak of CMYK as a new background, and then determine a reflectance tweak to reach the desired target from that background.
  4. Repeat 1 through 3 until either the target is reached to the desired accuracy or a maximum number, z, of iterations is reached, where z is a positive integer.

For CMYK and realistic values of enhancement, this would probably only take two or three iterations. The reason is large cyan tweaks are associated with large magenta tweaks. Large magenta tweaks are associated with more error added in item 3, above. So once the first cyan+magenta tweak is added, a $2^{nd}$ iteration is carried out typically only if this was a large reflectance tweak. A resulting correction tweak from a $2^{nd}$ iteration will be a much smaller tweak, since magenta's impact is small. This will result in a much smaller cyan adjustment with an associated smaller magenta adjustment that is more likely to meet the tolerance checked in Step 3. This iteration process is particularly useful for ECG and spot color CME systems.

Modulating a*-b* Channels with Cyan/Magenta/Yellow

We now describe CME technology to apply signal encoding directly as a modulation of a*-b* channels of an image, e.g., using a color profile(s) (e.g., ICC profile(s)). This differs from an above CME approach, in which a signal is mapped directly to a modulation of an at or around 660 nm reflectance (e.g., at 670 nm) using one or more ink channels with visibility due to this result compensated for using other ink channels. The above 670 nm reflectivity approach introduces changes in a* (and possibly b*), but those changes are not typically one-to-one with the encoded signal. This means, for example, that a signal with signal tweaks balanced in the positive and negative process color directions will lead to balanced tweaks in 670 nm but may result in imbalanced signal tweaks in a* and b*, which could introduce a color shift. The approach of applying a fixed amplitude change in 670 nm results in differing visual impact across an image depending on the background color, which is compensated for by detecting when a*/b* changes exceed a tolerance, and then scaling the signal tweaks back. We note here, that while we focus on CMY in the following example, the same techniques could be applied to other 3 ink combinations such as MYK, spot color 1/spot color 2/spot color 3, CM+spot color 1, etc.

Embodiments will now be described in which color shifts are avoided by mapping signal tweaks directly into a*-b* (when the signal is in-gamut) and a resulting visibility can be more consistently maintained. A tradeoff for this is that the contrast at or around 660 nm reflectance due to encoding is, perhaps, less consistent, which could lead to a reduced robustness in some cases. However, my initial testing indicates that this may not be a problem in practice, and encoding directly into a*-b* may be an easier approach to achieve a balance of robustness and visibility.

While it may appear, at first blush, that the overall algorithms are related to some standard derivative-based method for numerically solving non-linear equations, they have been adapted and tuned for encoding signals in color imagery.

An exemplary process is discussed relative to FIG. 16 and uses gradients to create a local approximation to a contour of the quantity that is to be kept unchanged (e.g., keeping L* the same while changing a*, b*), finding an appropriate direction along this contour (to move to achieve an encoded signal, and then using gradient information to find the rate of change along this direction to estimate an amount of change to use. The use of the gradient information to find the appropriate amount of change is reminiscent of Newton's method (sometimes called the Newton-Raphson method), but what is different includes, e.g., the selection of directions to reach a target a*, b* and a correction step to reduce changes in L* when they become too large. The present algorithms also have less of a need for an initial solution that is "near" the true answer.

In one embodiment (FIG. 17) of the FIG. 16 process, an embedding algorithm that makes signal changes in CIELAB a* and b* while maintaining L* within a predetermined tolerance proceeds as follows:
  1. At an image location being changed (e.g., at a pixel or group of pixels), approximate or determine gradients of L*, a*, b* with respect to changes in cyan, magenta, and yellow (CMY). FIG. 17, 101.
  2. Use the determined L* gradient information to find a direction in CMY-space which moves towards the target a*, b* value (e.g., an a*, b* value including the encoded signal value or tweak for a pixel or group of pixels) while keeping L* unchanged. FIG. 17, 102.
3. Use the a*, b* gradient information to find how much to scale along the direction in 102 to reach the target a*, b* value. FIG. 17, 103.
4. After applying the scale change to C,M,Y, check L* to see if it has changed above a predetermined tolerance. FIG. 17, 104.
5. If L* has changed above the predetermined tolerance, use the a*, b* gradient information to find a direction that changes L* while keeping a*, b* unchanged, and use the L* gradient information to find the scale of this change to reduce L*. FIG. 17, 105.
6. If the distance from the a*, b* target is above a tolerance, repeat from step 1, e.g., unless a max number of iterations (e.g., 2-25) has been reached, using current CMY. FIG. 17, 106.

The C,M,Y values determined in 103, 105 or 106 can be used as replacement values for the original CMY values. These replacement values carry the encoded signal at that pixel or group of pixels, resulting in an encoded color image or video.

Differences between this approach and the above CME reflectance target approach include some of the following features:
1. The C,M,Y, directions can be computed in real-time using an ICC profile and using a method which allows arbitrary directions in a*, b* to be chosen.
2. If the change in C,M,Y results in L* changes that exceed a tolerance, a correction step is applied which reduces L* by moving along a C,M,Y direction that changes L* while minimizing changes in a* and b*.
3. The two differences above can be applied iteratively until either a*, b* changes match the target within a tolerance, the gamut boundary is hit (meaning the desired change is not possible), or a maximum number of iterations occurs.

The above iteration reduces visual issues such as color shift. In particular, the iteration, real-time updates of the C,M,Y directions, and corrections of L* overcome the limitations of using linear approximations, e.g., that the linear approximations are typically only accurate for small changes. The L* corrections reduce the most visible errors caused by large changes in C,M,Y. If more iterations are used, the large change has moved the a*,b* much closer to the target, so the required changes are smaller, and the steps are more accurate.

Figure 18:
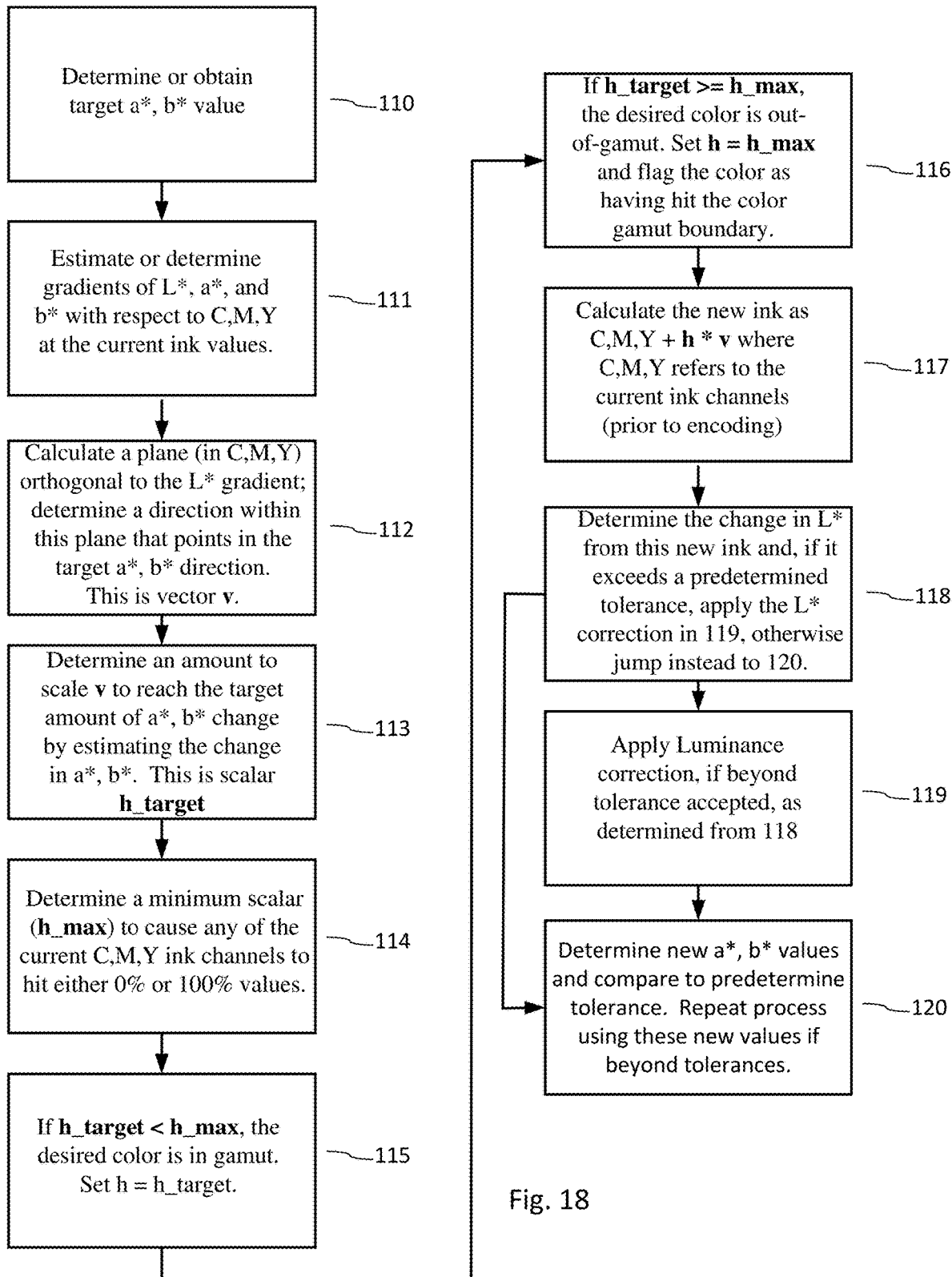

Another embodiment of an a*, b* embedding algorithm follows with reference to FIG. 18.
1. Determine or obtain a target a*, b* value attributable to a CMY ink value including an encoded signal (e.g., the encoded signal being a pixel value from the "signal" patch, or a scaled version "signal" patch, shown in FIG. 10). FIG. 18, 110.
2. Estimate or determine the gradients of L*, a*, and b* with respect to C,M,Y at the current ink values (e.g., prior to encoding). FIG. 18, 111.
3. Calculate the plane (in C,M,Y) orthogonal to the L* gradient, then determine the direction within this plane that points in the target a*, b* direction. Label this direction vector v. This is a vector in C,M,Y space. FIG. 18, 112.
4. Determine an amount to scale v to reach the target amount of a*, b* change by estimating the change in a*, b*. Label this scalar h_target. FIG. 18, 113.
5. Determine a minimum scalar (h_max) to cause any of the current C,M,Y ink channels to hit either 0% or 100% values. These values would be out-of-color gamut. FIG. 18, 114.
6. If h_target<h_max, the desired color is in gamut. Set h=h_target. FIG. 18, 115.
7. If h_target>=h_max, the desired color is out-of-gamut. Set h=h_max and flag the color as having hit the color gamut boundary. FIG. 18, 116.
8. Determine the new ink as C,M,Y+h*v where C,M,Y refers to the current ink channels prior to encoding. FIG. 18, 117.
9. Determine the change in L* from this new ink and, if it exceeds a predetermined tolerance, apply the L* correction in 119, otherwise jump to 120. FIG. 18, 118.
10. Determine the direction (in C,M,Y) orthogonal to both the a* gradient and the b* gradient (e.g., a cross-product). Treat this direction vector the same as v above and apply steps analogous to those in steps 112-117 to correct L* towards the value in the original image (prior to encoding). FIG. 18, 119.
11. Calculate the a*, b* and compute the difference from the target values. If the value of either exceeds a predetermined tolerance, the maximum iterations have not been reached, and the color is still in gamut, repeat from 110 with the new target a*, b* values (instead of the original a*, b* values). FIG. 18, 120.

The new ink in FIG. 18, 117 (if not beyond tolerances) carries the encoded signal at that pixel or group of pixels, and can be used as a replacement for the original ink values. The adjusted values resulting from FIG. 18, 118-120 can carry the encoded signal at that pixel or group of pixels, and can be used as a replacement for the original ink values. Thus, an encoded signal is achieved with this FIG. 18 process.

Several alternatives to the FIG. 18 embodiment are now described.

Rather than applying the L* correction whenever the current iteration exceeds the target (e.g., 118), it could be more efficient to do this as a final step. However, the FIG. 18 approach is expected to be more conservative and accurate.

Another alternative is to combine the change in L*, a*, and b* in a single step, rather than separating out a step to check L* (118) and to check a*, b* (120) and correct. This would be more cohesive (one step for all changes) and might be more efficient.

Yet another alternative is to separate the changing of a* and b* (e.g., have a step to change a* and another step to change b*). This could be, however, less efficient, but may provide more flexibility for adding signal at the gamut boundary (e.g., adding b* when a* can't be changed or vice versa).

Additional details are now provided for some of the FIG. 18 algorithm steps described above. The functions for changing here are L*, a*, and b*. Since ink values C, M, and Y are changing, these are functions of three variables. The gradients of these functions are the vectors of partial derivatives with respect to C, M, and Y. Notation for gradients is typically written as row vectors, for example:

$$\nabla L^*(c,m,y) = [L_c^*(c,m,y)\ L_m^*(c,m,y)\ L_y^*(c,m,y)]$$

$$\nabla a^*(c,m,y) = [a_c^*(c,m,y)\ a_m^*(c,m,y)\ a_y^*(c,m,y)]$$

$$\nabla b^*(c,m,y) = [b_c^*(c,m,y)\ b_m^*(c,m,y)\ b_y^*(c,m,y)]$$

where the subscripts refer to partial derivatives with respect to that variable, for example:

$$L_c^*(c, m, y) = \frac{\partial L^*}{\partial c}(c, m, y).$$

Estimating gradients can be accomplished by estimating derivatives. In an example implementation, a first-order central finite-difference approximation is used. Of course, other approximations can be alternatively used. The equation for this on L* is:

$$\nabla L_c^*(c, m, y) \approx \frac{L^*(c + \Delta, m, y) - L^*(c - \Delta, m, y)}{2\Delta}$$

where $\Delta$ is a step size and $\nabla$ is a gradient notation. The approximations for a* and b* are analogous. This approximation is a slope of a line connecting points of the function a step forward and a step backwards along the variable along which the derivative is being taken.

Implicit in all the equations above is that black ink could be involved. In these examples I am only changing C, M, and Y, so I'm not discussing K, but K can impact the gradients and, thus, can be included in the computation. K will act more as a parameter in this case than variable or coordinate-of-interest. A four ink example is provided below.

The step size used in the example implementation is a set increment of cyan, magenta, and yellow, e.g., a 1 step value. These are typically 8-bit values, so when mapped as [0, . . . , 255], this step size is 1. When converted to proportions, [0, . . . , 255] maps to [0, . . . , 1], and the step size is ⅟255. Of course, we could use other step sizes, e.g., 1.5, 2, 5, 7, 10, 12, etc.

Now consider derivatives at ink boundaries. When C=0, it's not possible to compute C-Delta and likewise when C=1, it's not possible to compute C+Delta. In these cases, we repeat the derivatives used at C=Delta and C=1−Delta. This is justifiable since the rates of change of the rates of change of L*, a*, and b* with respect to C, M, and Y can be observed to change very slowly.

Now consider calculating CMY directions from the gradients for the purposes of:
Moving in a particular a*, b* direction while minimizing changes in L*; and
Moving in a particular L* direction while minimizing changes in a*, b*.

Although the algorithms may use the approximate gradients/derivatives discussed above, the notation below refer to the true derivatives for simplicity.

Moving in Particular a*, b* Direction while Minimizing Changes in L*

The L*, a*, and b* functions parameterize a three-dimensional output space while the C,M,Y values parameterize a three-dimensional input space. A property of gradients on appropriately defined functions is that they are orthogonal to the contours. In our three-dimensional space, this means that $\nabla L^*$ is orthogonal to a plane which locally moves in a* and b* while not changing L*. To find this plane, we start with $\nabla L^*$, then find two vectors orthogonal to this which fill out a basis set of the three-dimensional space. Those two vectors form the basis for the plane orthogonal to L* and parameterize all the directions in C,M,Y-space which locally change a* and b* without changing L*.

A basis for 3D space is as follows:

$$v_1 = \nabla L^*$$

$$v_2 = [L_m^* \; -L_c^* \; 0]$$

$$v_3 = v_1 \times v_2$$

That is, $v_2$ swaps the first two components of $\nabla L^*$, negates the second, and sets the third component to 0 (orthogonality can be confirmed via inspection). The final vector v3 is a cross product of the first two vectors, as the cross-product can produce a vector orthogonal to the two vectors being multiplied.

The components $L_c^*$ and $L_m^*$ parameterize the sensitivity of L* to cyan and L* to magenta, which are higher luminance sensitivity than that for yellow.

As the plane spanned by $v_2$ and $v_3$ is orthogonal to $\nabla L^*$, it is tangent to the contour surface of no change in L*. This means it will generally produce only small changes in L*, with changes becoming larger the more significant a step is taken. Any particular combination of $v_2$ and $v_3$ can be chosen with each distinct combination producing distinct changes in a* and b*. So the remaining task is to find the combination of $v_2$ and $v_3$ that points in the target direction of a*, b* change. The following linear equation can be arranged:

$$\begin{bmatrix} \nabla a^* \\ \nabla b^* \end{bmatrix} \begin{bmatrix} v_2^T & v_3^T \end{bmatrix} \begin{bmatrix} C_2 \\ C_3 \end{bmatrix} = \frac{1}{\max(|\Delta a|, |\Delta b|)} \begin{bmatrix} \Delta a \\ \Delta b \end{bmatrix}$$

I have included transpose symbols here, since we've written every vector so far as a row vector. Here $\nabla a^*$ and $\nabla b^*$ are the gradients of a* and b*, $C_2$ and $C_3$ are scalars that make up the linear combination of the basis vector of the plane, and Aa and Ab are scalars that form a vector in the same direction as the target changes in a* and b*. In the example implementation, $\Delta a$ and $\Delta b$ are scaled by 1 but other scaler could be used. A 1 step scaler helps with detecting when the target change exceeds the gamut boundary.

To see where the linear combination of the basis vectors comes in, note that:

$$\begin{bmatrix} v_2^T & v_3^T \end{bmatrix} \begin{bmatrix} C_2 \\ C_3 \end{bmatrix} = C_2 v_2^T + C_3 v_3^T$$

This is a 3D vector in C,M,Y space. Multiplying on the left by the matrix formed by the gradients of a* and b* means the left-hand side is a vector of the directional derivatives for a* and b* in the direction of the vector:

$$C_2 v_2^T + C_3 v_3^T.$$

We set this to the target change on the right. By solving for $C_2$ and $C_3$, the appropriate vector:
$C_2 v_2^T + C_3 v_3^T$, is found that points in the desired direction of a* and b* change. This is the v direction in FIG. 18, 112.

Given v, we now want to find h_target that scales so the target change in a and b are found. FIG. 18, 113. Due to the scaling used above, this is: $\max(|\Delta a|, |\Delta b|)$. We also find h_max, which is the minimum h possible to use before hitting the boundary. To do this, look at the current C,M,Y values and the signs of the three components of v. The three components correspond to the amount of change to apply to C, M, and Y. If the sign is negative, it means the ink will be decreased and will hit the gamut boundary when it reaches 0. If it is positive, it means the ink will be increased and will hit the gamut boundary when it reaches 1 (or 100% or 255, depending on what units are used). Use these to find the amount of change possible for each of C, M, and Y. Then divide by v to get these in terms of how much scaling can be applied to v before the gamut boundary is reached (or equivalently, before the ink hits 0% or 100%). There will be three of these values corresponding to C, M, and Y. The smallest of these is h_max, as it will be the smallest value of h possible before one of the ink channels hits 0% or 100%. FIG. 18, 114. If h_target<h_max, it means the target ink is in-gamut, so we set h to h_target. FIG. 18, 115. Otherwise, the target change in a* and b* is out-of-gamut, so we use h_max and return a flag to indicate this so iterations can stop. FIG. 18, 116. To implement the final change in ink space, add h*v to the current C,M,Y values as the following equation suggests (FIG. 18, 117):

$$[c_{target}\ m_{target}\ y_{target}] = [c_{current}\ m_{current}\ y_{current}] + hv.$$

If in-gamut, the resulting ink values will be approximately equal to the target a* and b* with little or no change in L*. The approximation will be more accurate when the change is small. Iterations will improve any remaining errors until a tolerance is reached.

Moving in a Particular L* Direction while Minimizing Changes in a*, b*

Changing L* (e.g., as in FIG. 18, 119) involves steps analogous to the steps involved in changing a* and b*, but somewhat simpler. Instead of computing a basis for a tangent plane and solve for $C_2$ and $C_3$ to find v as the combination:

$C_2 v_2^T + C_3 v_3^T$, we can find the target v directly from the gradients: $V = \nabla a^* \times \nabla b^*$, where x is the cross product of the two gradient vectors. The resulting vector is orthogonal to a* and b* so that locally it has no change in either. Since L*, a*, b* as functions of C,M,Y are generally in independent directions, this means the v locally changes only L*.

We can again find the directional derivative in the direction of v to solve for the scaling to correct L* as follows:

$$h = \frac{\Delta L}{\nabla L^* v^T},$$

where again, the transpose is somewhat unconventional due to having written everything as row-vectors instead of the usual column-vector default format. Having solved for h, the remaining steps are analogous as those in described in the section on setting a*, b*.

Visual Illustrations of Embodiments

This section further describes aspects of the above embodiments with reference to FIGS. 14A-14F, 15A and 15B. This description provides an illustration of an algorithm on a 2D example problem. A 2D example lacks one of the details that make the 3D case more involved (in particular, solving for the a*,b* direction in the plane tangent to the contour surface of equal L*), but otherwise the concept is analogous, while easily visualized, for understanding by those skilled in the art.

To begin with, FIGS. 14A-14F shows the contours of the following example functions, $f(x,y)=x^2+y^2$, (a squared distance from the origin) and $g(x,y)=\tan^{-1}(y/x)$, (the angle function from the origin).

The "f" function is analogous to the quantity that we are trying to keep the same (e.g., L*) and the "g" function is analogous to function that we are trying to change (e.g., a*, b*). For example, f is like L* and g is like a*, b* if we are changing a* and b* (or f is like a*, b* and g is like L* if we are changing L*). The "x" and "y" variables are analogous to C,M,Y. The contours (e.g., Contour 1 in FIG. 14A) connect values of x and y, e.g., analogous to different CMY ink values, where f has the same value. So Contour 1 is analogous to a constant L* for different CMY values. In FIGS. 14A-14F, the lines perpendicular to the contours show the direction of the gradient of function f with respect to x and y at certain points and the lines along the contour show the lines orthogonal (i.e., at a 90 degree angle) to the gradient at these points. From these figures, it's clear that the gradient lines point away from the contour and the other lines are tangent to the contour. (For the g function, the gradient lines happen to align with the contour, though this is a coincidence from using a function with linear contours. The orthogonal lines point away from the current contour—orthogonally in this case, but again this is a coincidence from our choice of secondary function.)

Figure 14A:
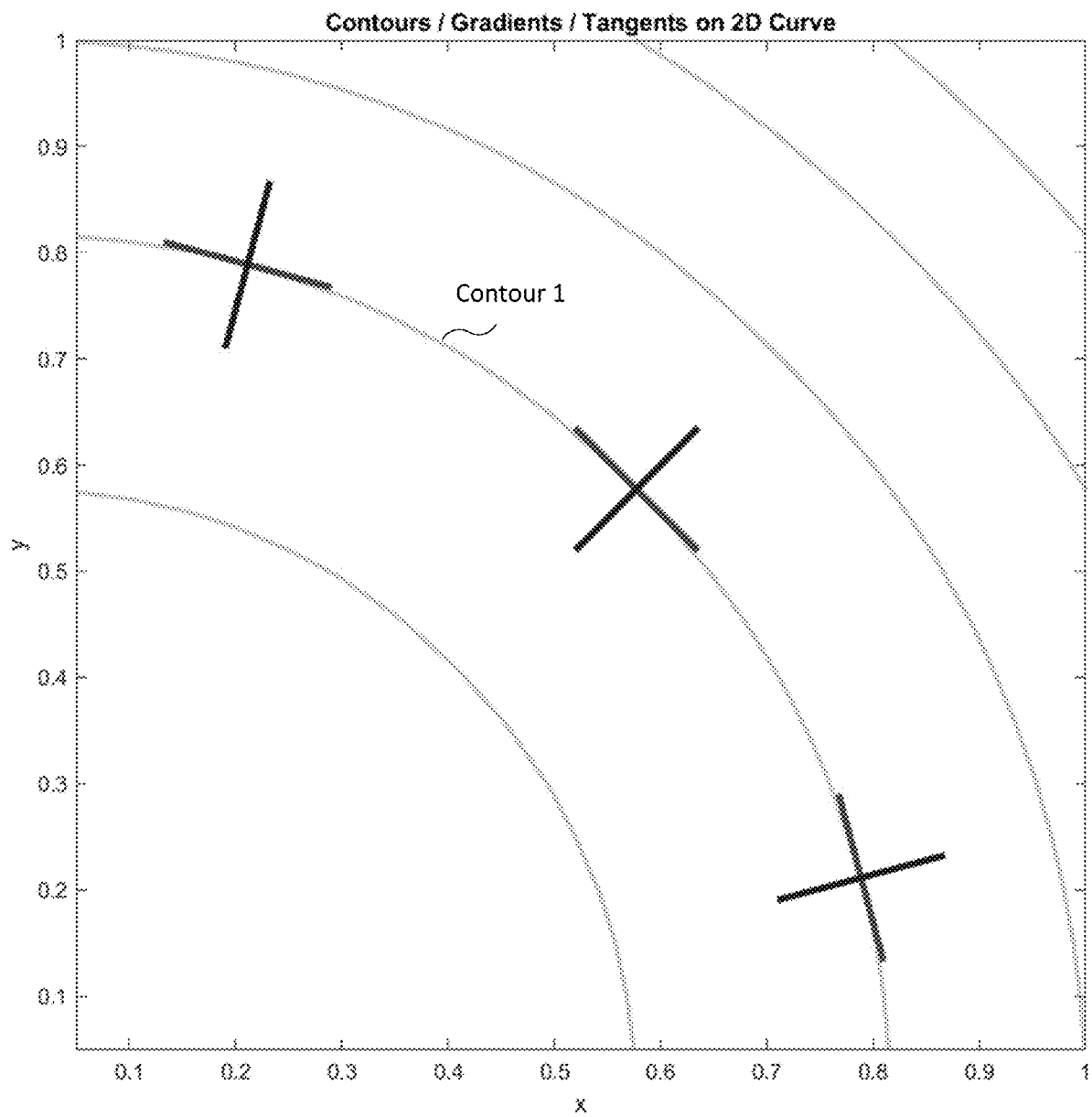
FIGS. 14A-14F are diagrams illustrating various aspects of encoding technology utilizing changes in CIELAB a*, b* space.
Figure 14B:
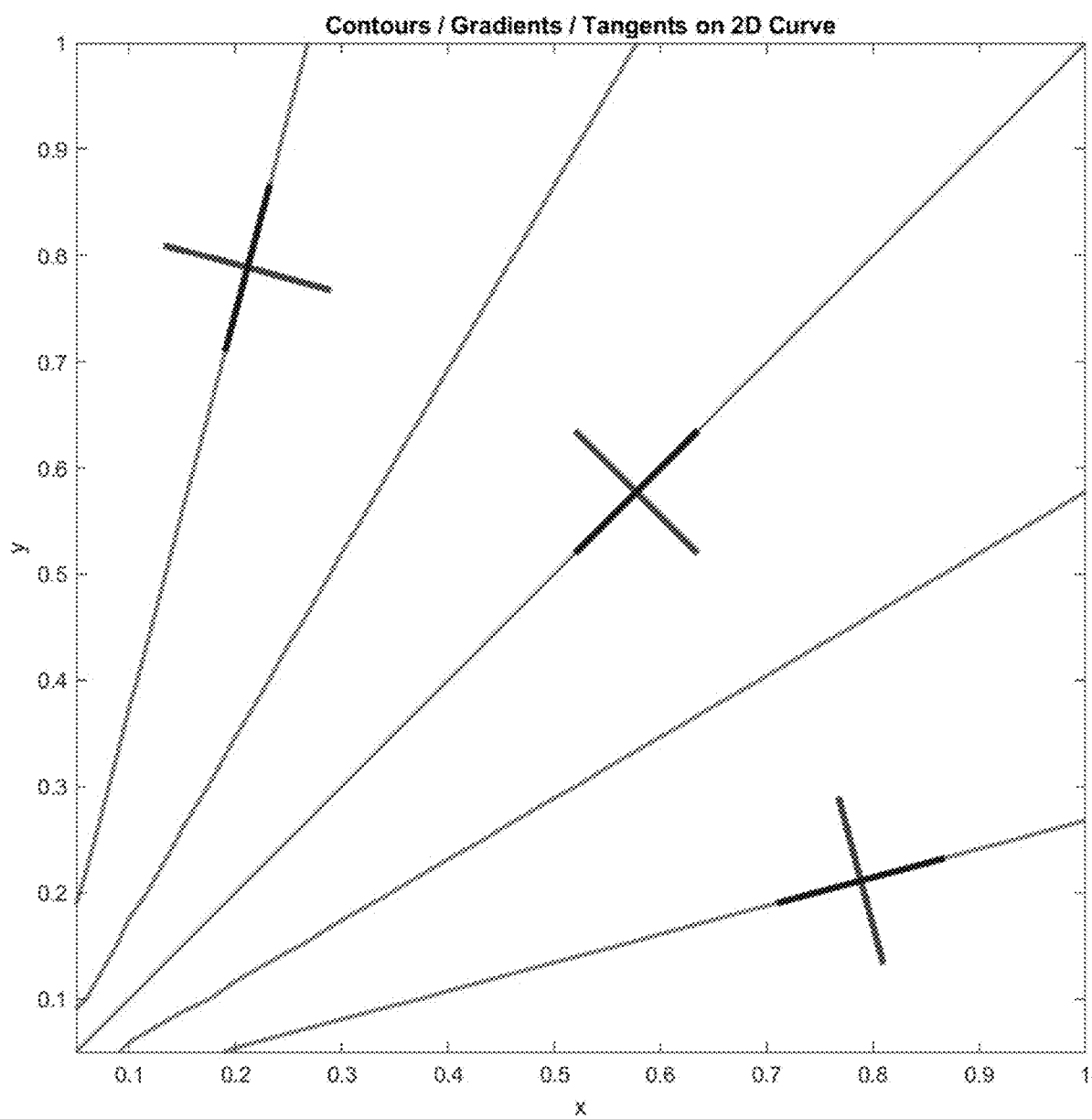

With reference to FIGS. 14A and 14B, the lines approximating the contour are tangent to the f Contour 1 and show that that "locally" (e.g., for small changes to accommodate a target signal), they are a good approximation to it. Moving along the tangent line no further than the extent of the tangent line results in a close approximation to staying on the contour (e.g., analogous to maintaining a constant L* or a L* within a predetermined tolerance). Since the tangent lines stay approximately on the contours of f (FIG. 14A) and point to new contours of g (FIG. 14B), moving in the tangent line direction provides a means of moving from one value of g to a new target value (FIG. 14B). This is analogous to moving from the current a*, b* value to a target a*,b* value (e.g., one with an encoded signal value) while keeping L* approximately the same (e.g., on the same contour). Furthermore, the gradient can be applied to find the amount of change to reach the target values. When that approximation is within a predetermined tolerance of L* change, the answer can be found in a single step. However, the further you go along the tangent, as seen in FIG. 14D, the worse the approximation to the contour is, showing that a larger change in L* could result.

Figure 14C:
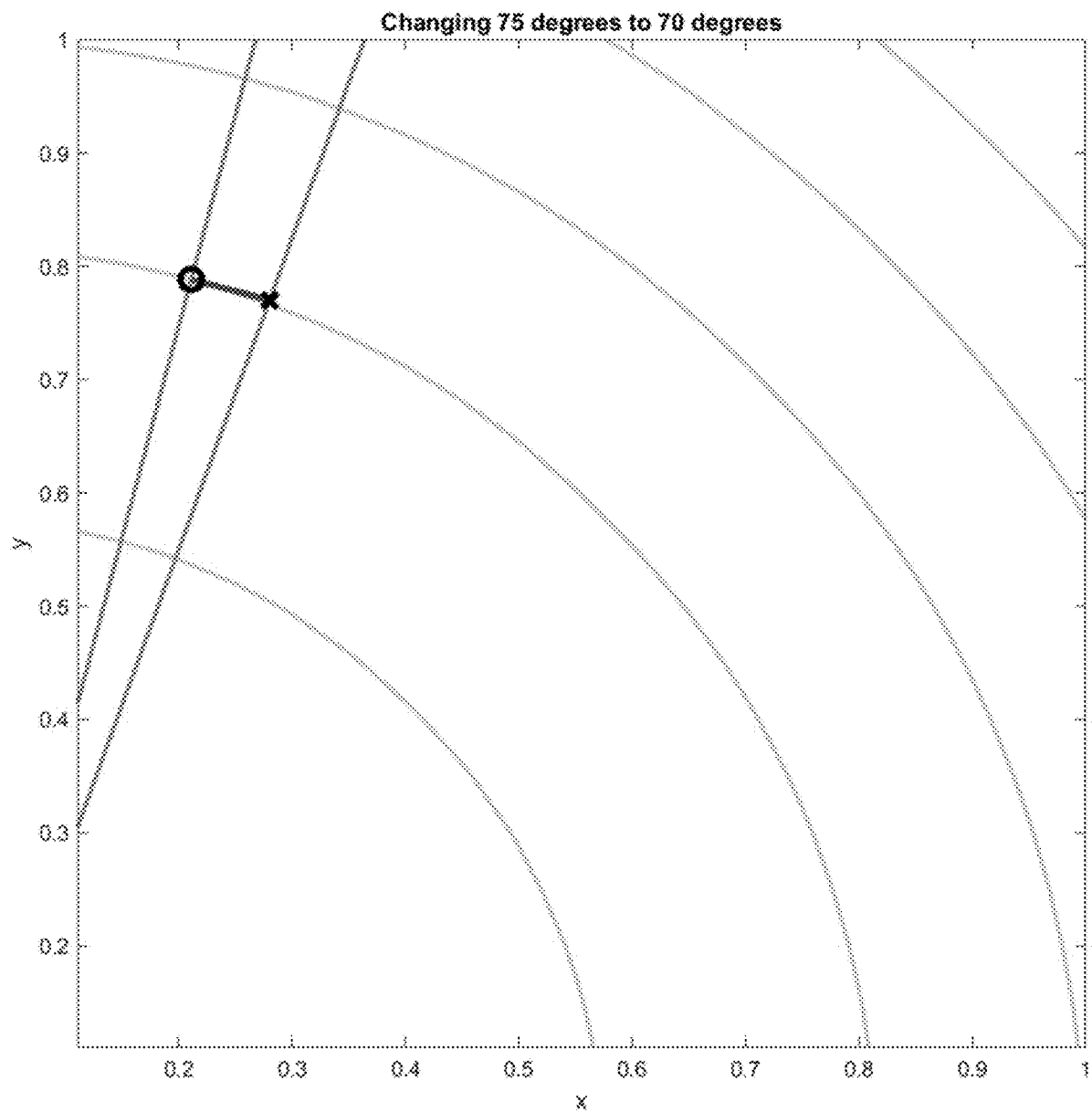

FIG. 14C shows an example of iterating to make a small change to the target function g while keeping f approximately unchanged. The example moves from an angle of 75 degrees to 70 degrees. This would be analogous to making a small change in a*, b* while keeping L* the same. Here the angle is changed from 75 degrees to 70 degrees. The contours of 75 and 70 are shown in more vertical lines, the starting point is marked with an "o" and the end point with an "x". This iteration yields an accurate result, e.g., close to the 70 degree line (70.0126) while remaining close to the contour it was originally on (originally on the contour where f(x,y)=0.667, the new point has f(x,y)=0.672). This result is likely acceptable for reasonable tolerances.

Figure 14D:
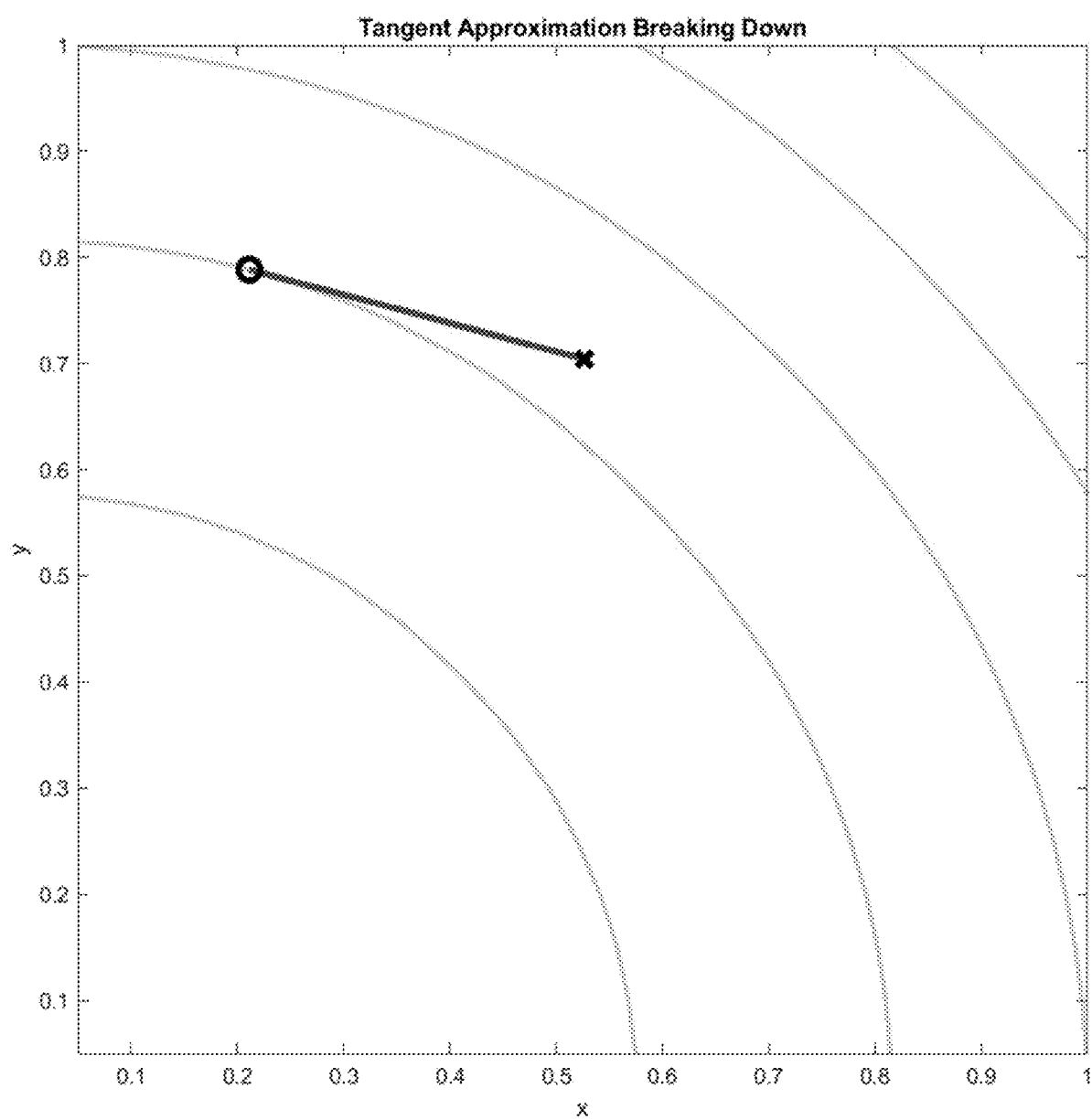
Figure 14E:
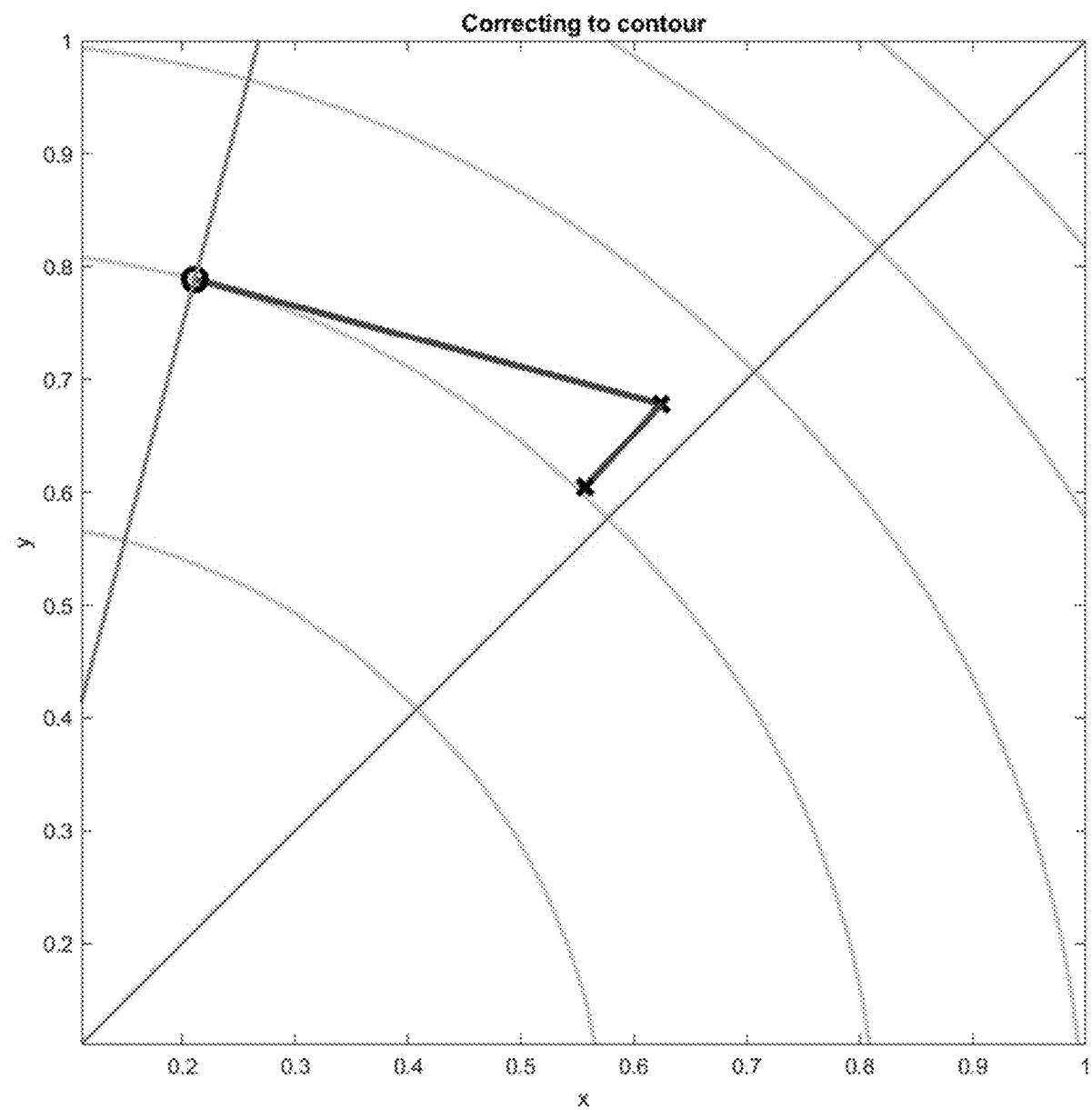
Figure 14F:
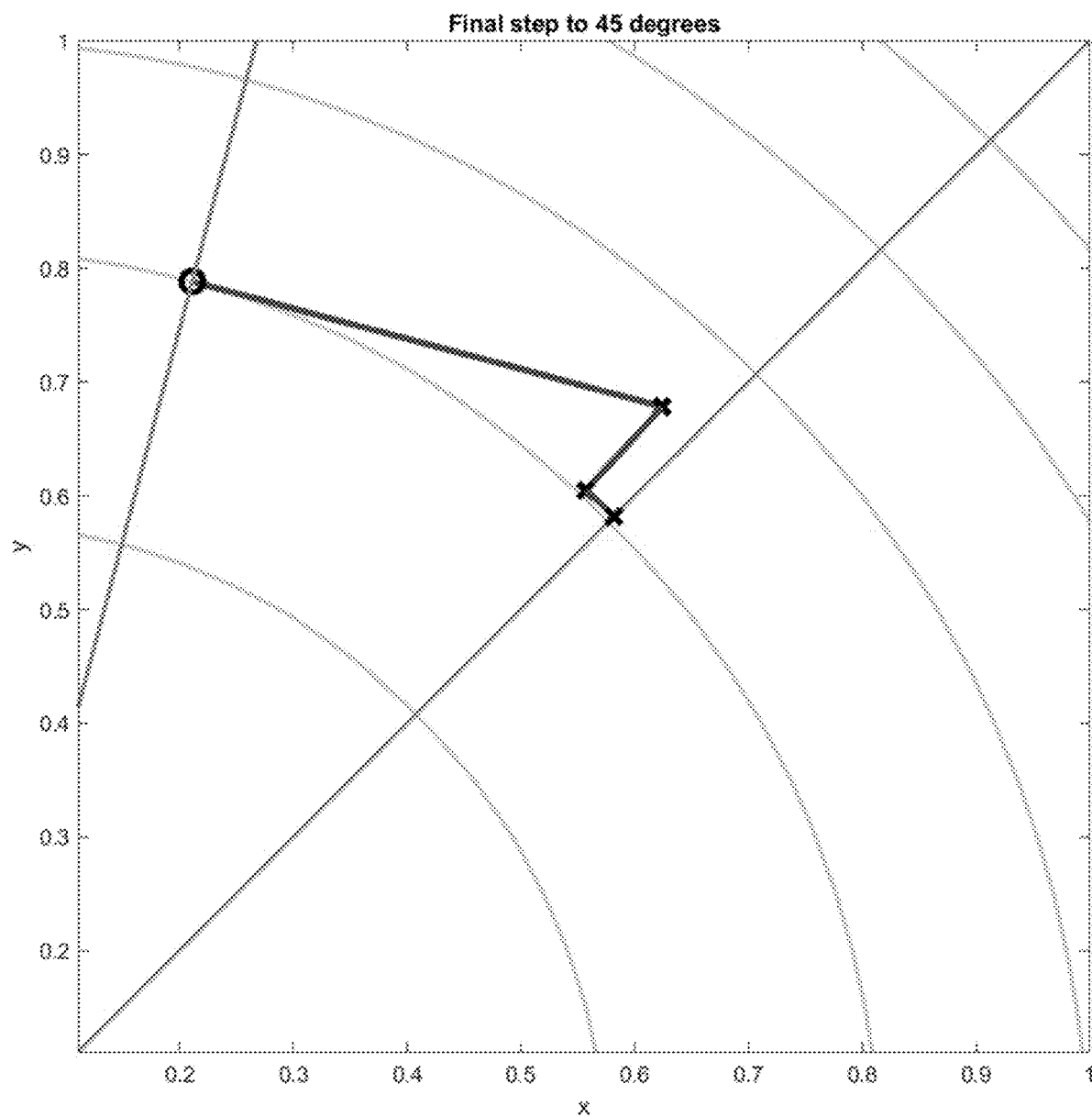

For a larger change, as in FIGS. 14D-14F, a single step from 75 degrees to 45 degrees to accommodate a target a*, b* value representing an encoded signal may not work to preserve a luminance tolerance. That is, a straight move would result in a noticeable visibility change in luminance. FIGS. 14E & 14F show a noticeable error both from the target angle of 45 degrees (in the example, the new point is at 47.36 degrees) and in the contour (moving from the contour where f is 0.667 to 0.8494, top x in FIG. 14E). Although this single iteration did not yield an accurate result, it is now close enough that after correcting to return to the contour, a new step will be very close to the target. A correction in FIG. 14E brings the point back to the contour, which is analogous to the step (FIG. 18, 119) of correcting the L* to keep it close to the original contour. The steps of this are similar to the previous case, only now we compute directions using the g to keep on its contour and the gradients of function f are used to scale that direction. FIG. 14F shows movement to the nearest contour (45 degrees) by repeating the steps of the first iteration from the new angle to reach near the desired point.

As noted above, rather than the final two steps which correct to the contour then reach the target angle, it is possible to combine into a single step that does both. And, as also mentioned above, these functions can be optimized when the functions parameterizing the output coordinates are approximately linear functions of the inputs—e.g., when L*, a*, and b* are approximately linear with respect to C, M, and Y.

Figure 15A:
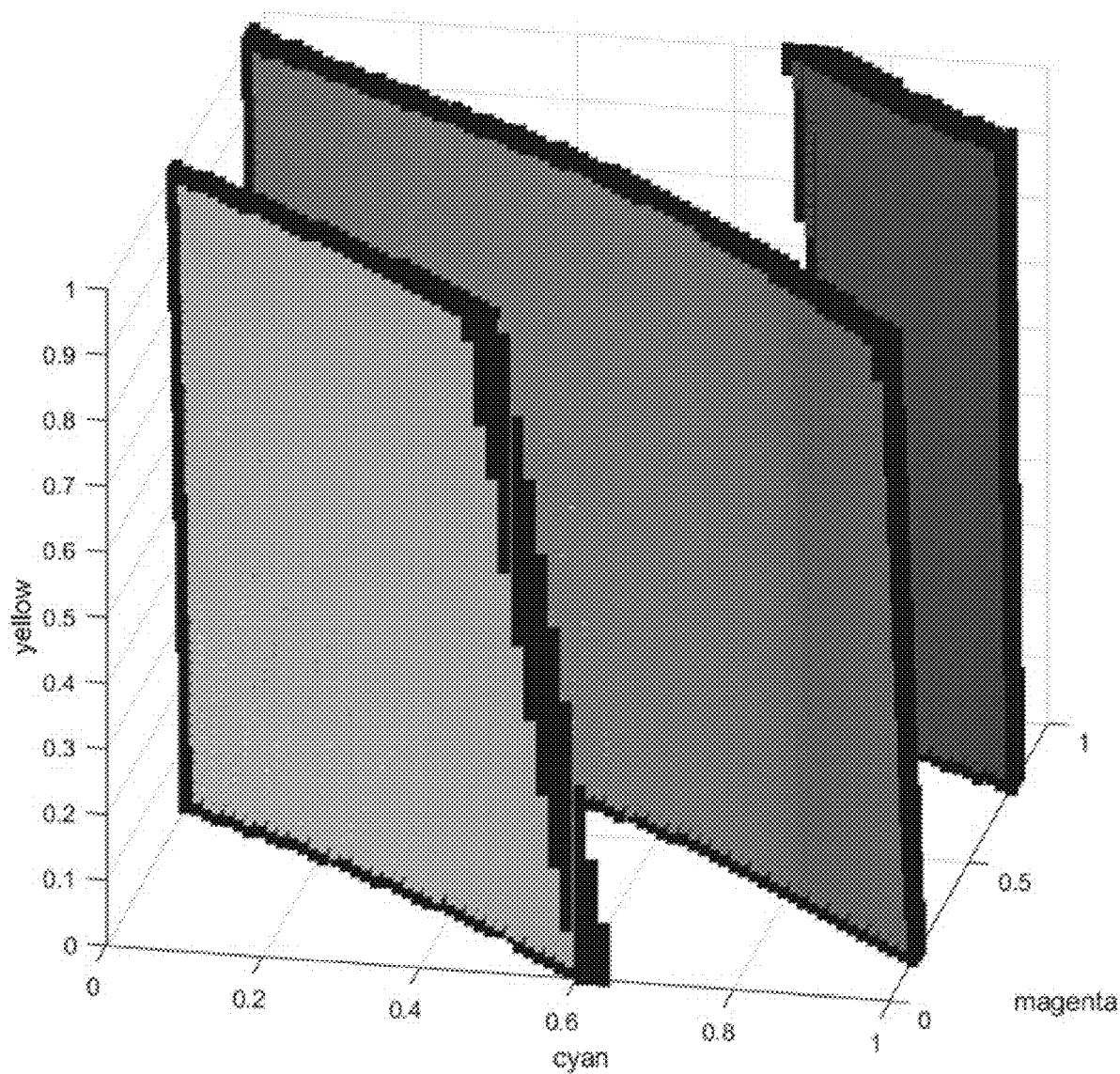
FIGS. 15A and 15B are diagrams showing color contours for cyan, magenta and yellow.

FIG. 15A shows an approximate contour surfaces in L*,a*,b*. Each of the three surfaces is a contour where the colors have L* within a tolerance of either 30, 50, or 70. A black border has also been added to help visualize the curvature. The ideal contours would be flat planes and from these visuals, it appears that is not far off. There is a gentle curvature in these surfaces. So in most cases, the above algorithms should achieve moving to a new a*, b* target while staying on the same (or similar) L* per iteration.

Figure 15B:
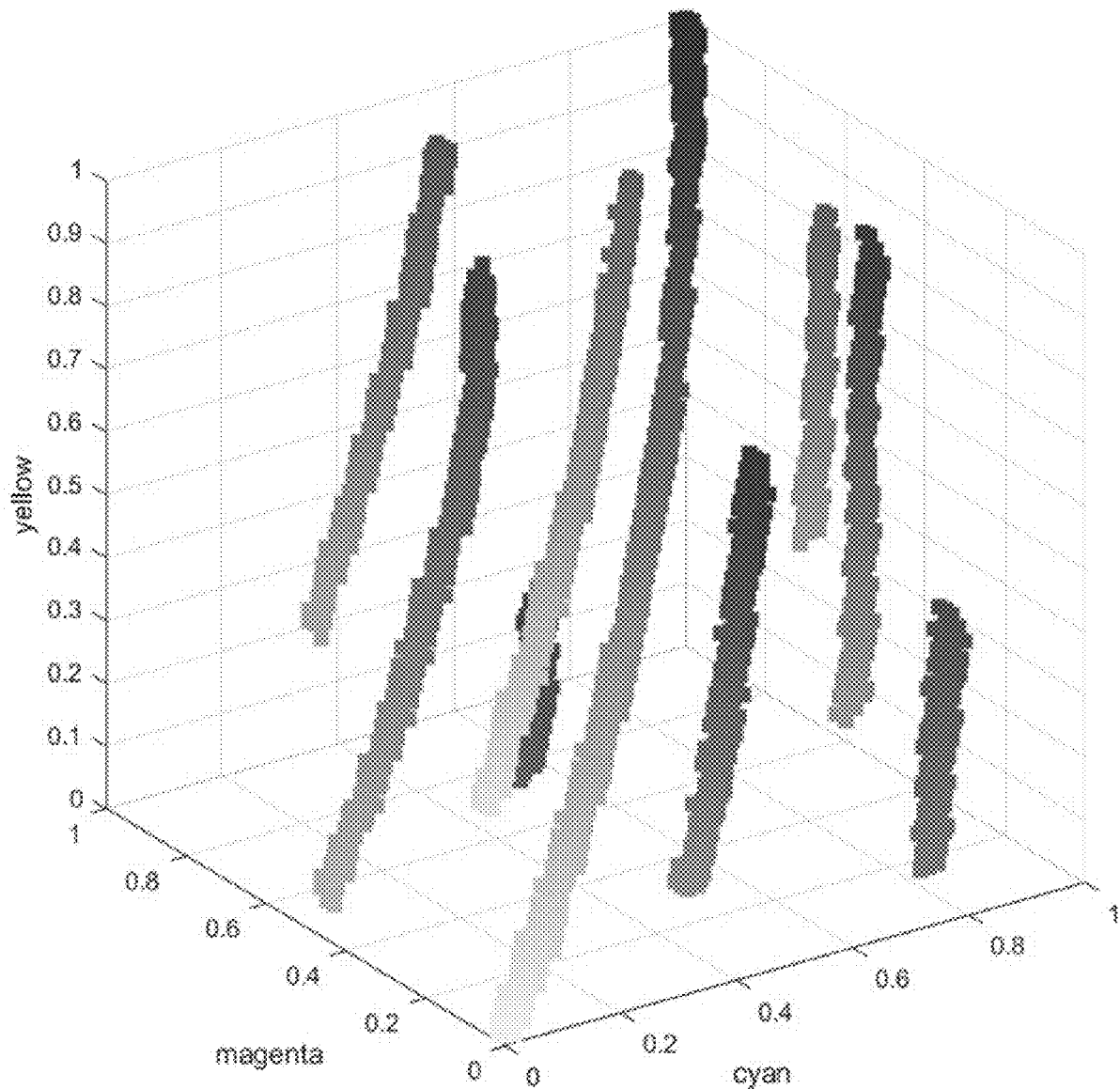

FIG. 15B shows a similar result, only this is showing the contours of various choices of a*,b*. These are curves, not surfaces. Their ideal shape would be a straight line. Curvature is visible, but the curves are reasonable approximates of straight lines. What's more, these curves are only traversed when L* has deviated above a tolerance due to changes in a*,b*. This will generally not result in significant changes in L*, so the changes will generally only be along small distances of these curves, which are even closer to linear than the entire picture seen here.

Figure 19:
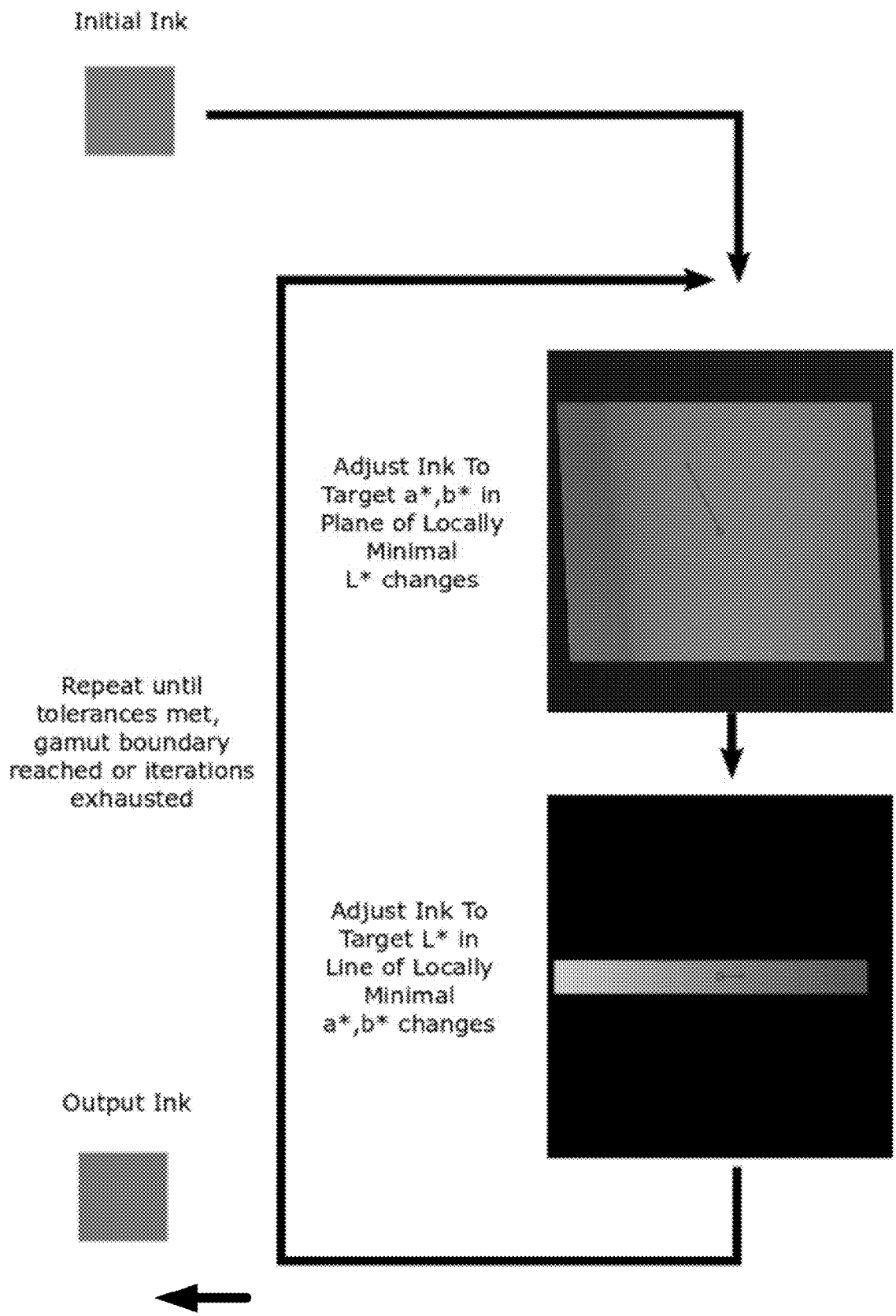
FIG. 19 is a diagram showing ink adjustment in CIELAB a*, b* space.

Now with reference to FIG. 19, an initial ink combination (e.g., CMY or MYK) is changed to accommodate an encoded signal. The plane that is searched when the CMY (or MYK) directions that minimize the L* change while moving in a particular a*b* direction are computed. That is, the initial ink is adjusted to a target a*, b* (one that carries the encoded signal) in a plane of locally minimal L* changes. The red line shows the direction in this space that the initial ink moves to.

Afterwards, a value is searched for when the CMY (or MYK) directions that minimize the a*b* change while moving in a particular L* direction are computed. This is evaluated if the L* change is large enough to warrant an adjustment. Here the adjusted color hue is as close, but the darkness/lightness is corrected to the original value. Thus, the ink is adjusted to a Target L* in line of locally minimal a*, b* changes. The target ink is output, or the process can be repeated until a tolerance is met, a gamut boundary is reach of a predetermined number of iterations is met.

Examples with Four Inks

This section describes an approach for enhancing in the a*-b* plane using four ink or color channels (e.g., CMYK or CMYSpot1), rather than just three channels (e.g., CMY or MYK). This may be useful for encoding stronger signals in images with significant areas where both black and cyan are high. It is also noted that the algorithms described here are specified for embedding in four channels of CMYK, but the same approach would work for any four channels of ink (e.g., four spot colors, 3 process colors +spot color 1, or four channels of extended color gamut inks).

Moving from embedding in CMY to embedding in CMYK means the algorithm now deals with four variables instead of three. This will result in changes to the gradients involved as shown below.

$$\nabla L^*(c,m,y) \rightarrow \nabla L^*(c,m,y,k)$$

$$\nabla a^*(c,m,y) \rightarrow \nabla a^*(c,m,y,k)$$

$$\nabla b^*(c,m,y) \rightarrow \nabla b^*(c,m,y,k)$$

Since they now depend on four variables instead of three, the gradients are now four-dimensional vectors instead of three-dimensional. The numerical estimates used are analogous to what was done before (e.g., finite differences). Of course, if applied to N channels, the gradients become N-dimensional vectors.

Now we calculate CMYK directions from gradients. This involves changing a*, b* in a particular direction while minimizing changes in L*. Here the direction in CMYK that locally changes a*, b* in the desired direction while keeping L* constant (or locally changes L* while keeping a*, b* constant) is calculated. The core steps here are not significantly different as those discussed above. If we write an overview of finding the a*, b* direction in the CMY case, we did this:

1. Calculate the gradients of L*,a*,b* in CMY-space.
2. Find the orthogonal complement to the subspace of CMY-space spanned by the L* gradient. We'll refer to this space as S below.
3. Solve the linear equation to find the linear combination of vectors in S that result in the desired changes in a* and b* after being projected onto the gradients of a* and b*.

Step 1

As mentioned above, step 1 is not significantly different and involves computing a 4-dimensional vector (in CMYK) rather than a 3-dimensional vector (in CMY).

Step 2

In the CMY case, we used some properties particular to three-dimensional space to build this basis. In particular, we constructed one vector that was orthogonal to the gradient of L*, then used the cross-product to find a second vector that was orthogonal to both L* and the first vector we constructed. These two vectors form a basis of the orthogonal complement to the linear subspace spanned by the L* gradient. While it should be possible to construct bases by inspection this way, it is a bit unwieldy. The cross-product can't be used, either, as that is specific to 3-dimensional spaces. So to find the orthogonal complement, we can use algorithms designed for this purpose. One way to frame the problem of finding the orthogonal complement is to find a basis for the null space of the matrix formed by the gradient of L* represented as a row-vector. There are standard approaches for this. For example, in the software program MATLAB, there is a routine called "null" which can be use. It can also be done with QR factorization as well as other methods. Such techniques are acceptable as long as they accurately compute an orthonormal basis for the null space. Different methods may give different basis, but the outcome when this result below is applied should be the same.

Step 3

In the CMY case, we are solving for three variables (C,M,Y or M,Y,K) using three target values (L*,a*,b*). This leads to a well-posed problem with a unique solution. In the CMYK case, we are solving for four variables with the same three target values. This is an underdetermined problem, meaning it can have multiple solutions. So a solution from the many possible solutions will be selected. One way to do this is to choose the minimum-norm solution. A straightforward way to do this is to use the "pseudo-inverse" (also called "Moore-Penrose" inverse) in place of the inverse matrix. It turns out that the pseudo-inverse is the same as the inverse for well-posed problems, so this procedure is the same as that used above if applied directly to only changing CMY or MYK.

Now consider changing L in a particular direction while minimizing changes in a*,b*. This is largely the same as above in the 3 ink case. The only difference is "a*,b*" is swapped with "L*" (so the orthogonal complement is found to the space spanned by the a* gradient and the b* gradient).

Here is a Pseudo-Inverse example to aid the discussion.

We'll illustrate the pseudo-inverse visually in two dimensions. Take the following linear system of equations:

$$-x+y=2$$

This is underdetermined, meaning you have more variables than you have equations to solve for. This leads to an infinite number of solutions. In a simple example like this, you can simply rewrite to solve for y in terms of x:

$$Y=2+x$$

Figure 20A:
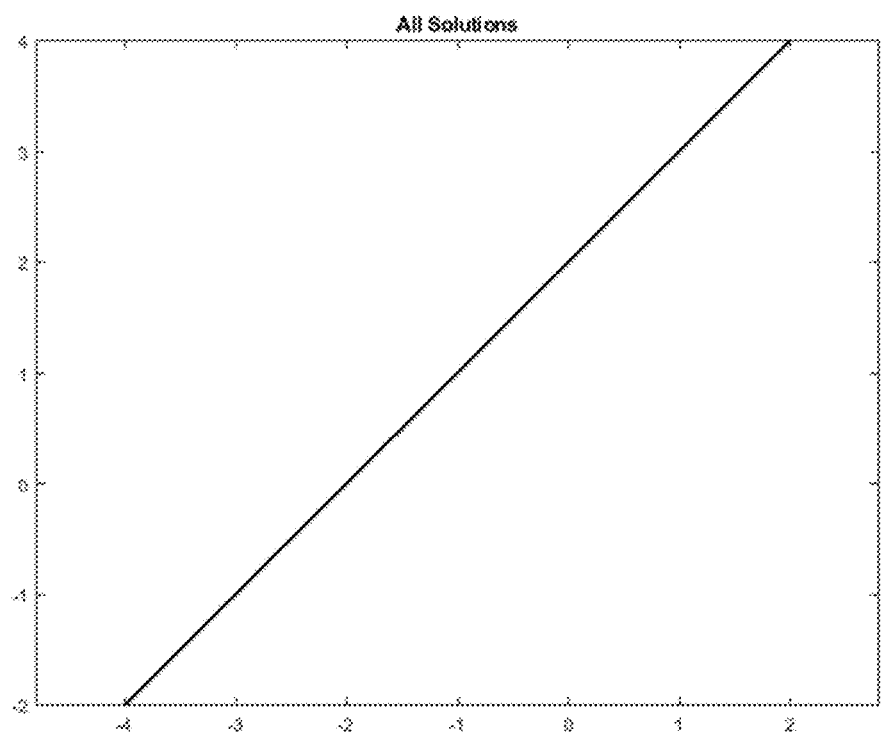
FIGS. 20A and 20B are illustrative plots.

This is the equation of a line. Any point on this line solves the original equation "−x+y=2". The graph in FIG. 20A shows this line of solutions.

Figure 20B:
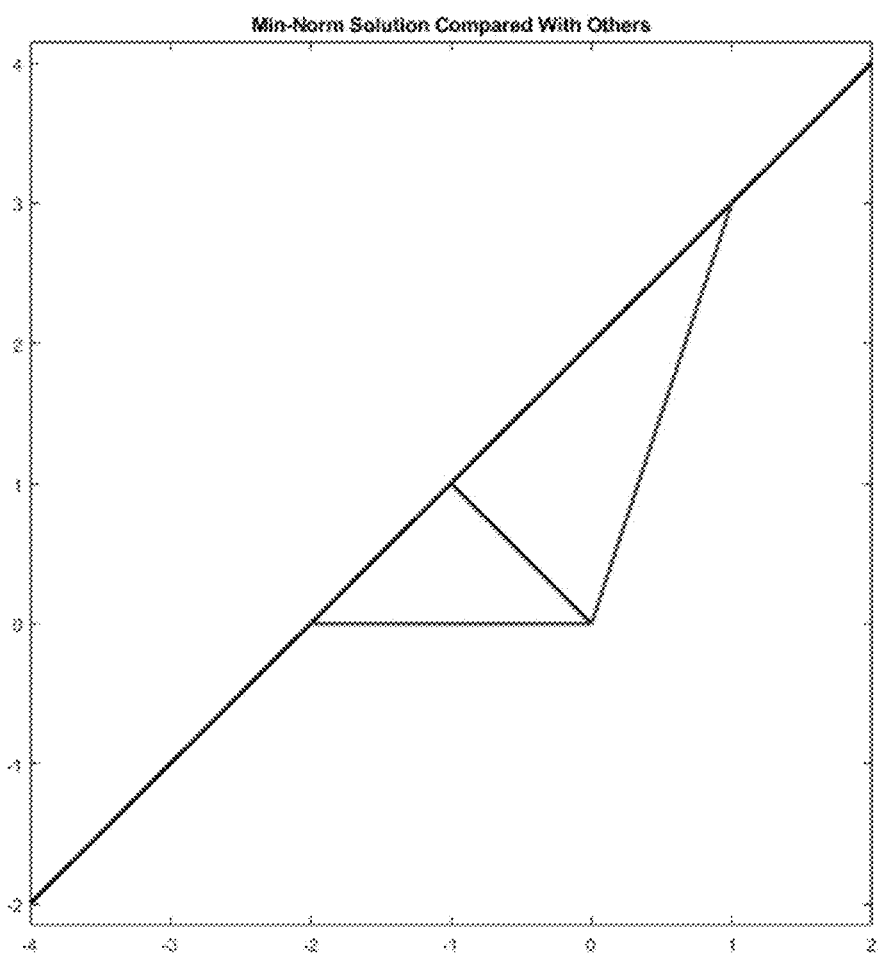

To visualize what the pseudo-inverse does, the plot in FIG. 20B shows two random solutions (plotted in red) compared with the solution obtained from the pseudo-inverse. The solutions are shown as vectors connecting the origin (0,0) to the selected point on the black line of solutions.

In terms of solving the original equation, any of these solutions satisfies "−x+y=2", but it is apparent from the graph that the length of the perpendicular line corresponding to the pseudo-inverse solution is smaller than the length of the other solutions. That is what is meant by "minimum-norm" solution—it is the solution that has the smallest distance from the line of solutions to the origin. It may also be apparent from the graph that the perpendicular line is orthogonal to the black line of solutions. This will be true for minimum norm solutions like this, and in fact, this property is used in deriving the pseudo-inverse.

More on Gradient Based Encoding

This section describes additional methods for image or video encoding, e.g., modulating properties of interest of the image in some desired way. The following methods and technology uses the gradients of the properties of interest with respect to the image channels as linear local approximations of the functions defining those properties. These linear approximations are used to determine directions and amounts to change the image channels by a relatively small amount to approach a target change in the image properties. The small changes keep the accuracy of the linear approximations relatively high. By repeating these steps, the process gradually approaches the target modulation and terminates either when a tolerance is met, a maximum number of iterations is reached, or the boundary of the image channels is reached. The method is general in the sense that many different properties can be controlled and many different parameterizations of the image (e.g., different types of image channels) can be used with no modification to the core algorithms. Examples of useful image properties that may be controlled are the reflectance (R) at various wavelengths and the CIELAB (L*, a*, b*) values of the image. Examples of channels that could be controlled are CMYK images, CMYK and spot color images, or RGB images. The methods are applied the same in all of these cases, with the only change being different functions are used depending on which properties and which types of image channels are employed.

The method can also be made reasonably computationally efficient. The smoothness of the typical properties of interest with respect to the image channels (e.g., reflectance and/or L*a*b* values as a function of CMYK inputs) makes it feasible to use low-order (even first-order) numerical approximations to partial derivatives, which keeps the number of function evaluations for those properties small. Similarly, this smoothness makes it feasible to evaluate the gradients at a subset of the image channel and obtain accurate approximations of the gradients with interpolation. These keep the computational cost of the iterations low.

This section will describe how to formulate image encoding as an optimization problem. The iterative process is similar to that previously described for enhancement of images by specifying a*; b* modulation directly while keeping L* unchanged. It is a generalization of that approach, in that it applies to any target image property, and a simplification, in that the steps involved are the same for each of the image properties with no special handling applied separately for L* and a*; b*.

Linear Approximation of Functions of Image Properties Using Gradients

The image properties are modeled as functions of the image channels. The following notation is used $$f(c_1, \ldots, x_N)=f(c)$$

where $f$ is a function modeling an image property that will be controlled during enhancement, $c_1, \ldots, c_N$ are the N channels of the image, and $c=[c_1, \ldots c_N]^T$ is an equivalent, short-hand vector notation.

Some examples of what these functions might represent include:

$f$ could be any of L*, a*, b* from CIELAB;

$f$ could be the reflectance at a specific wavelength (e.g., at or around 660 nm or at or around 450 nm (e.g., 410 nm-520 nm);

$c_1, c_2, c_3, c_4$ could be the percentage of cyan, magenta, yellow, and black ink $c_1, c_2, c_3, c_4, c_5$ could be the percentage of cyan, magenta, yellow, black, and some additional spot color ink; and $c_1, c_2, c_3$ could be the RGB values of an sRGB or Adobe RGB image.

The gradient of $f$ is defined as $$\nabla f(c_1 \ldots c_N)=[fc_1(c_1 \ldots c_N) \ldots fc_N(c_1 \ldots c_N)]$$

where $fc_i$ is the partial derivative of $f$ with respect to $c_i$.

It will sometimes be convenient to only treat a subset of channels as dependent variables. The dependent variables relate to the channels that are being modulated by the image encoding. The remaining channels will be considered parameters. When this is used and it preferred to emphasize the dependence on a parameter the convention will be to write, for example $f(c_1, c_2, c_3; c_4)$ when $c_1, c_2, c_3$, are treated as the dependent variables and $c_4$ is treated as a parameter. A specific example of where this might be used if when $c_1$, $c_2, c_3, c_4$ are cyan, magenta, yellow, black, and a CMY encoding is to be applied. (E.g., changes in C,M,Y carry the encoded signal.) In this case, encoding treats cyan, magenta, and yellow as dependent variables which are to be modified, and black is simply a fixed parameter that influences the decisions made on the dependent variables. The gradient as defined here takes partial derivatives with respect to all the dependent variables but not parameters, so that in this example:

$$\nabla f(c_1,c_2,c_3;c_4)=[f_{c_1}(c_1,c_2,c_3;c_4) f_{c_2}(c_1,c_2,c_3;c_4) f_{c_3}(c_1,c_2,c_3;c_4)]$$

When the parameters do not need to be discussed, they will often just be omitted, e.g., $f(c_1, c_2, c_3; c_4)$ is written as $f(c_1, c_2, c_3)$.

Smooth functions can be approximated locally by their gradients. The gradient is taken at some specific set of values for the channels and fills in for the function like so (via the Taylor expansion):

$$f(c+h) \approx f(c) + \nabla f(c)h$$

where h is a vector difference from c where the approximation was taken. Note that $\nabla f(c)$ is defined as a row vector and h is a column vector so $\nabla f(c)h$ is a dot product which has a single-valued result. The approximation accuracy improves as h→0 (i.e., the closer the function is being approximated to c, where the gradient was calculated). The accuracy is also better when $f$ is smoother, in the sense that the higher-order derivatives are smaller near $f(c)$ (which loosely speaking leads to f being less "wiggly" around c). The types of image properties modified during image enhancement are generally very smooth functions of the image channels so these types of approximations work well.

It is typically the case that image enhancement is concerned with controlling several image properties at once. For example, consider a CMY and MYK chroma encoding that tries to modulate reflectance at 670 nm while keeping L* and b* unchanged. There are also the direct a*, b* encoding which try to modulate a* and b* while keeping L* unchanged. Each image property can be assigned a function, β, which maps the image channels to the associated image property. It is convenient to model all of the image properties as a single mapping, F: $R^N \to R^M$, mapping the N image channels to the M image properties. The functions, $f_i$, are then the components of F, so that the first component of the output of $F(c_1, \ldots, c_N)$ is $f_1(c_1, \ldots, c_N)$, the second component is $f_2(c_1, \ldots, c_N)$ and so on.

The gradient defined above is for functions mapping several inputs to a single output, so for $f: R^N \to R$. The generalization of the gradient for mappings like F that can have several outputs is often called the "total derivative" and denoted DF. To avoid adding more terminology and notation, we will also call the total derivative of F the "gradient" and use the same notation $\nabla F$. For our purposes here, the gradient of F is written as:

$$\nabla F(c) = \begin{bmatrix} \nabla f_1(c) \\ \vdots \\ \nabla f_M(c) \end{bmatrix} = \begin{bmatrix} f_{1,c_1}(c) & \cdots & f_{1,c_N}(c) \\ \vdots & \vdots & \vdots \\ f_{M,c_1}(c) & \cdots & f_{M,c_N}(c) \end{bmatrix}$$

In other words, $\nabla F(c)$ is a matrix whose entry at the $i^{th}$ row and $j^{th}$ column is the partial derivative of the $i^{th}$ component function of F (i.e., of $f_i$) with respect to the $j^{th}$ image channel $c_j$, evaluated at c.

As is directly analogous to the case of single-valued functions, the gradient of F can be used as a linear approximation to F in a neighborhood of c where $\nabla F$ is evaluated. In notation, this statement is:

$$F(c+h) \approx F(c) + \nabla F(c)h.$$

This can also be shown with a Taylor series. Similar statements apply about the quality of approximation depending on how small h is and how smooth the higher order derivatives of F are.

Numerical Approximation of Gradients

Gradients are calculated in some way to use them in the algorithms below. For example, mounts to approximating the partial derivatives that make up the components of the gradient. Finite difference approximations can be used. A first order, central symmetric finite difference to a partial derivative is $$f_{c_i}(c_1, \ldots, c_N) \approx \frac{f(c_1, \ldots, c_i+h, \ldots, c_N) - f(c_1, \ldots, c_i-h, \ldots, c_N)}{2h}$$

where h is some small increment. In words, to take the partial derivative with respect to $c_i$, add a small value h to $c_i$ and compute the resulting $f$ and then subtract a small value h from $c_i$ and compute the resulting $f$. Subtract the second result (the one where h was subtracted) from the first result (the one where h was added) then divide by 2h.

Assuming some technical conditions on the function, approximations of this sort are known to converge to the true value of the partial derivative as h converges to 0. Image channel values that we deal with are quantized to 8 bits, so there is a natural limit to how small h can be in terms of the smallest quantization step. Finite difference methods are also known to encounter problems in practice due to sensitivity to noise. Small errors in computing $f$ can lead to large discrepancies between the numerical estimate of the $f_{ci}$ and its true value. The image properties we deal with are typically smoothed out in that they are the result of an interpolation process (e.g., interpolation over a sampling of L*, a*, b* values in the ICC profile or the interpolations that make up a blend model when estimating the reflectance at a given wavelength). This reduces the impact of noise and appears to work well enough. If noise becomes an issue in some situations, higher order finite differences and/or additional smoothing techniques could be applied to improve the situation, though this will increase the computational cost.

On the topic of computational cost, a first order approximation as above costs two evaluations of the function $f$: one for the +h step and one for the −h step. This has been reasonable enough to use with experimentation. The image properties we deal for image encoding are typically smooth enough that an approach of calculating the partial derivatives at a subset of the channel space (e.g., steps of 5-20% for CMYK, like 10%) and using interpolation should work well. This will likely be faster and could provide some benefits in terms of better numerical stability/accuracy for the finite difference approximations depending on the approach used. For example, this would make higher order finite-difference approximations feasible when computing the values on the subsets and the interpolation would also help guard against instabilities from measurement noise.

Iterative Gradient Search

As mentioned above, enhancement modifies image properties that are typically well approximated as linear functions using gradients. This suggests the following iterative approach for image enhancement to modify image properties $f_1, \ldots, f_M$:

1. Calculate $\nabla f_1, \ldots, \nabla f_M$ at c;
2. Use the gradients as linear approximations of $f_1, \ldots, f_M$ to estimate the $\Delta c$ required to obtain a set of target values for $f_1, \ldots, f_M$;
3. Use the exact functions $f_1, \ldots, f_M$ to determine the error in the target at c+$\Delta$c;
4. If the error exceeds a tolerance and a maximum number of iterations has not been reached, repeat from the beginning replacing c with c+$\Delta$c.

It may be beneficial to limit the size of the change applied in a single iteration when reaching a target $f_1$. So for instance, if $|f_1(c)-f_1^{target}|$ exceeds $f_1^{max}$, then the target could be set to $f_1(c)+\text{sign}(f_1^{target}-f_1(c))f_1^{max}$. Limiting the size of the change in this way ensures the image property functions are better approximated by their gradients which may improve the stability of the algorithm.

One other point to note is that these iterations can lead to changes that move the image channels to impossible values. For example, if c is a vector of ink percentages and c+$\Delta$c leads to any ink percentages which exceed 100% or fall below 0%, the change is impossible. We will refer to this as crossing the boundary of channel space. The assumption we will make when this happens (which is often true for image properties we deal with) is that the requested target for the modified image properties is impossible. The proposed way to deal with this is to detect when the boundary of channel space is crossed and when it is, scale $\Delta c$ by the largest value which just touches the boundary. As an example, if c=[95 90]$^T$ and the calculated $\Delta c$ is [10 5]$^T$, the resulting c+$\Delta c$ is [105 95]$^T$. If the components of c represent percentages, then this crosses the boundary and scaling to use 0.5$\Delta c$ instead results in c+0.5$\Delta c$=[100 92:5]$^T$, which just touches the boundary. If the target property is impossible to reach, this often leads to result which is as close as possible. What's more, if multiple targets are set and one of the targets is to keep some property unchanged (e.g., keeping L* unchanged to avoid highly visible luminance changes), the unchanged properties will tend to be prioritized. This is valuable since at least in the case of keeping L* unchanged, this is a highly prioritized target.

Calculating $\Delta c$

The $\Delta c$ calculation is the main step in the above outline of the iterative gradient search. It is convenient to describe it using the F notation introduced above which is the map from the image channels to each of the image properties, with the individual functions $f_1, \ldots, f_M$ making up component functions of the output. Approximating F with its gradient, $$F(c+h) \approx F(c)+\nabla F(c)h$$

where c+h is the quantity to be found. The h is equivalent to the $\Delta c$ we are looking for. The targets for the functions can be labeled: $f_i^{target}$
and can also be collected into a vector of desired outputs for F which we will call $F^{target}$. Setting $F(c+h)=F^{target}$ and using the approximation, the equation to be solved is:

$$F^{target}=F(c)+\nabla F(c)h.$$

In this equation, c, F(c); $F^{target}$ and $\nabla F(c)$ are all known, and h is the quantity to be solved for. Rearranging, this becomes:

$$\nabla F(c)h=F^{target}-F(c)=\Delta F(c).$$

The right-hand side of this equation is the target change from the current value of F, for which we have added a short-hand $\Delta F(c)$. This is a linear system of equations, as the left-hand side $\nabla F(c)$ is a M×N matrix, h is a N×1 vector and $\Delta F(c)$ is a M×1 vector. In general, we will want N to be greater than or equal to M, which in terms of the enhancement means we will want to be modifying at least as many image channels as there are image properties we are controlling. We will also assume for now that a solution exists and comment below on this.

If M=N, the solution can be represented with a matrix inverse $$h=[\nabla F(c)]^{-1}\Delta F(c).$$

When M<N then there are generally multiple solutions which requires some regularization technique to select an appropriate one. One solution is the minimum-norm solution, which selects the h which has the smallest Euclidean norm (or equivalently, vector length) of all the possible solutions. This can be represented with the "Moore-Penrose" pseudo-inverse $$h=[\nabla F(c)]^{\dagger}\Delta F(c).$$

The solutions above can all be obtained with linear algebra numerical algorithms (e.g., in Matlab inv can compute the inverse, pinv can compute the pseudo-inverse, and there are other approaches, as well, for solving the systems without explicitly calculating any inverse matrices).

The size of these systems is generally small, with M usually being no more than 3 or 4 properties (e.g., L*, b* and reflectance at 670 nm) and N usually being less four or less (e.g., enhancement modulating CMY, MYK, CMYK, CMY+spot color, K+spot color, spot color alone, K alone, or C alone—remember that even if more ink channels are present in the image, only the channels being modulated count towards N). This means these have a fairly low computational cost, which makes this approach feasible since each individual pixel involves a potentially separate system of equations to solve.

Once h is known, it is used as the $\Delta c$ in the outline of the iteration described above.

Considerations for Solvability

For the above iteration to work, the linear systems involved preferably have solutions. As already noted, this will generally be best if there are no fewer modulated channels than modulated image properties. It also requires some sensible choice of image properties. For example, modulating 670 nm and 660 nm independently is likely not feasible for any normal set of inks.

Avoiding Crossing the Channel Space Boundary

Here is one approach to clamping an increment $\Delta c$ so it does not exceed the channel space boundary. The maximum change for a given c can be computed component-wise. Assuming each component of c can range from 0 to 100, the maximum positive change is 100−$c_i$ and the maximum negative change is $c_i$, where $c_i$ denotes a component of $c_i$. The tweak $\Delta c$ will have a direction for each component, either positive or negative depending on whether that component is to be increased or decreased. For each component $\Delta c_i$ of $\Delta c$, the scaling required to ensure boundary is just reached is $$\frac{100-c_i}{|\Delta c_i|}$$

if $\Delta c_i$ is positive and $$\frac{c_i}{|\Delta c_i|}$$

if $\Delta c_i$ is negative. If for all components, each of these ratios is above 1, the channel space boundary is not crossed and there is no need to apply scaling. Otherwise, if any of the ratios is below 1, the smallest value should be multiplied by $\Delta c$ to obtain the new change in channels.

The above assumes all $\Delta c_i$ are non-zero. If any are non-zero, the ratio can be considered infinite and will have no impact on the determination of the scaling to apply.

Examples

In all the cases considered below, a CMYK image is considered. Images with spot colors could be encoded in all of these examples, the only difference being the spot colors would be added as additional parameters. Images with spot colors could also be encoded with the spot color being modulated. The algorithm is indifferent to what the nature of the underlying channels are so there is no significant difference in the implementation with different types of image channels.

The first example includes a two-dimensional case to ease visualization. More details will be provided on the steps involved in modulating a single pixel in order to make the structure of the main algorithm clearer. However, the same could be applied to all pixels have the same values or values within a predetermined tolerance. The other examples will simply describe how the configuration of the iterations changes and show some results.

1. L*, 670 nm reflectance modulation with cyan, magenta

Here a CMYK image is encoded with the watermark signal added by modulating reflectance at 670 nm while keeping L* unchanged. In this case, the functions are $$f_1(c_1, c_2, c_3, c_4) = L^*(c_1, c_2, c_3, c_4)$$

$$f_2(c_1, c_2, c_3, c_4) = R_{670}(c_1, c_2, c_3, c_4)$$

where $c_1$, $c_2$ are the percentages of cyan and magenta, respectively, and $c_3$, $c_4$ are the percentages of yellow and black, respectively.

Figure 21:
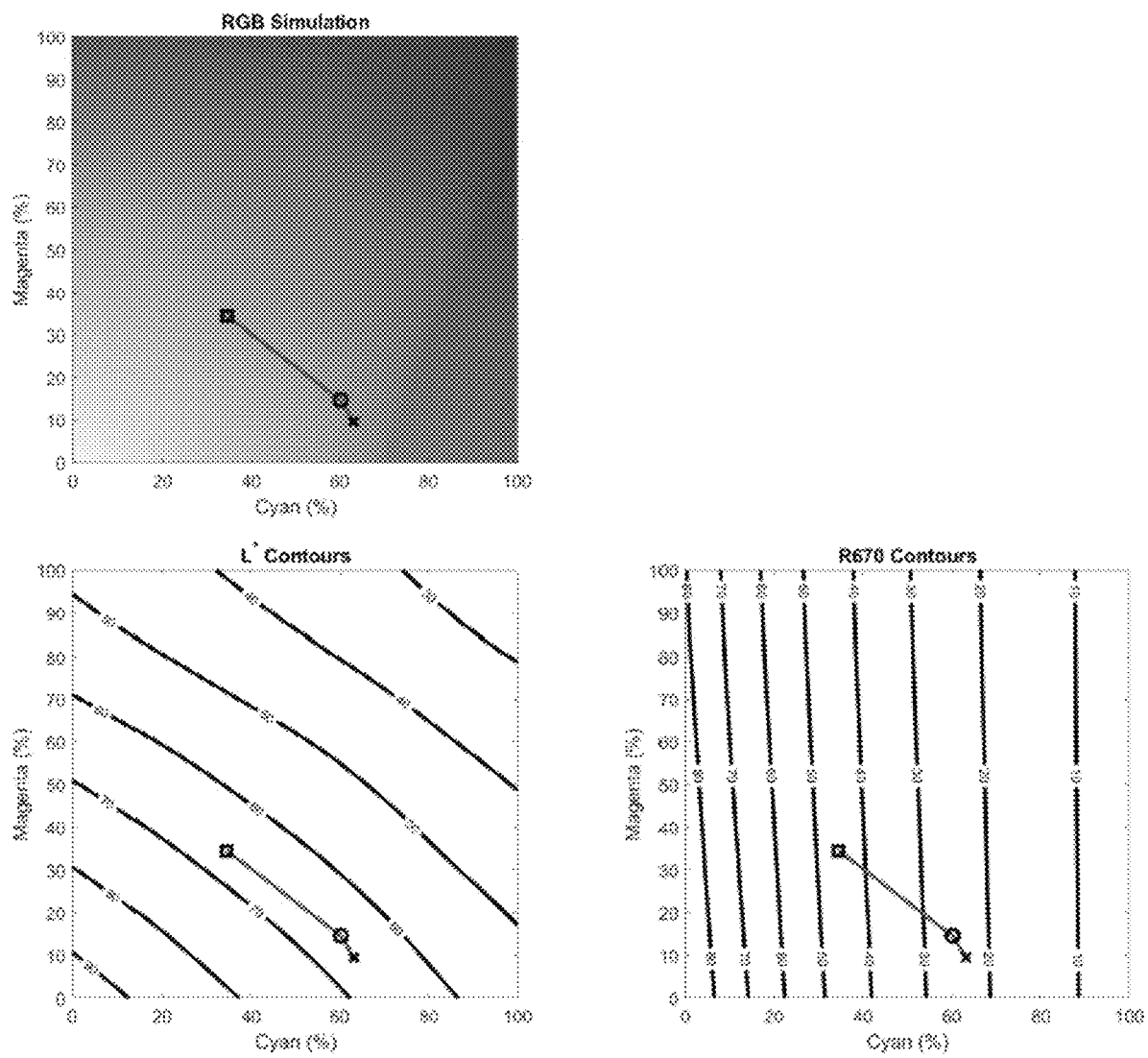
FIG. 21 includes diagraming illustrating an iterative approach to encoding.

The iterations involve calculating $\nabla F$. The function for the matrix in this case is $$\nabla F(c_1, c_2) = \begin{bmatrix} \frac{\partial L^*(c_1, c_2)}{\partial c_1} & \frac{\partial L^*(c_1, c_2)}{\partial c_2} \\ \frac{\partial R_{670}(c_1, c_2)}{\partial c_1} & \frac{\partial R_{670}(c_1, c_2)}{\partial c_2} \end{bmatrix}$$

where we've used the $\partial f / \partial c_1$ notation for the partial derivative with respect to c1. Assume the initial color of cyan and magenta are both about 35%, and 0% for both yellow and black. The target reflectance value at 670 nm is set to 22% less than the starting reflectance. The images in FIG. 21 show the iterations of the algorithm as they converge to the target value. A tolerance of ±0.25% for the target L* and ±0.25% for the target reflectance at 670 nm was set. The figure shows the algorithm converges in two iterations. The final step has an L* that has changed by only −0.08 and a 670 nm reflectance that is off from the target by just 0.03%. (In FIG. 21, iterations are shown in a range of all possible cyan/magenta values (top box). Also shown are corresponding contours of L* (lower left box), and corresponding contours of reflectance(R) at 670 nm (lower right box). The iteration path starts at the square, takes a step to the circle, then ends at the Note that with each iteration, the image property functions, L* and $R_{670}$ are evaluated three times each: twice for the partial derivative approximation and once when checking the image property after incrementing cyan and magenta to check the tolerance is met for matching the target. With two iterations, this leads to six function evaluations each. Worth noting is that a change of reflectance of 22% is much larger than normal (e.g., typically in the range of 5-14%) and was applied to help the visualization. It is possible and maybe likely that most pixels could be successfully modulated in a single iteration, which would further improve computational speed. Furthermore, two of the function evaluations used for computing the gradient could be done away with by interpolating over a table of partial derivative values. While this would still count as a "function evaluation", it can likely be implemented as a faster computation than the direct function evaluations, which would speed up the computation.

We will go into the details of a single iteration for this example to make the algorithm clearer.

Step 1: Initialization

The CMYK image is initialized to about 35% cyan and magenta, and 0% yellow and black. When represented in 8-bit values, which map 0, . . . , 255 to 0%, . . . , 100%, cyan and magenta are 100·89/255=89/2.55, which is roughly 34.5%, and yellow and black are both 0.

Using a blend model, the initial reflectance at 670 nm (which will call $R_{670}$) is calculated to be 45.4% and with the ICC profile, the L* value is calculated to be 66.4. The targets are set so L* remains unchanged and $R_{670}$ will decrease by 22% to 23.4%.

The functions involved are $f_1(c) = L^*(c)$, which is L* as a function of the ink percentages computed from the ICC profile, and $f_2(c) = R_{670}(c)$, the reflectance at 670 nm as a function of the ink percentages computed by the blend model. The combined function F(c) maps from the ink percentages to these two values with the first component being $f_1$ and the second component being $f_2$, i.e., $$F(c) = \begin{bmatrix} f_1(c) \\ f_2(c) \end{bmatrix} = \begin{bmatrix} L^*(c) \\ R_{670}(c) \end{bmatrix}.$$

While all four ink values (cyan, magenta, yellow, and black) are used to evaluate L* and $R_{670}$, only cyan and magenta are being modulated so only $c_1$ and $c_2$ are treated as dependent variables with $c_3$ and $c_4$ being treated as parameters.

The vector $\Delta F$, the target change in these values, is $$\Delta F(c) = \begin{bmatrix} \Delta f_1(c) \\ \Delta f_2(c) \end{bmatrix} = \begin{bmatrix} 0 \\ -22 \end{bmatrix}.$$

Step 2: Gradient Calculation

To calculate the change in c, the gradient of F is approximated. This involves approximating the partial derivatives as described above. The dependent variables, $c_1$, $c_2$ corresponding to cyan and magenta, are the only channels being changed so these are the variables the partial derivatives approximated for. As mentioned above, the image channels are 8-bit so the increment for calculating the finite-difference approximation to the gradient is h=100/255=1/2.55. This makes the estimate for the partial derivative of L* with respect to $c_1$ (cyan):

$$\frac{\partial L^*}{\partial c_1}\left(\frac{89}{2.55}, \frac{89}{2.55}\right) \approx L^*\left(\frac{89}{2.55} + h, \frac{89}{2.55}\right) - L^*\left(\frac{89}{2.55} - h, \frac{89}{2.55}\right)$$

-continued $$= L^*\left(\frac{90}{2.55}, \frac{89}{2.55}\right) - L^*\left(\frac{88}{2.55}, \frac{89}{2.55}\right)$$
$$= -0.3327,$$

where the final number was computed from a GRACoL ICC profile. Computing the partial derivative with respect to $c_2$ is similar, with the right-argument to the function being varied instead. Computing the partial derivatives for $R_{670}$ are also similar, with $R_{670}$ replacing L* in the above equations and being computed with a blend model. The final numbers for these give the gradient computation:

$$\nabla F\left(\frac{89}{2.55}, \frac{89}{2.55}\right) = \begin{bmatrix} \frac{\partial L^*\left(\frac{89}{2.55}, \frac{89}{2.55}\right)}{\partial c_1} & \frac{\partial L^*\left(\frac{89}{2.55}, \frac{89}{2.55}\right)}{\partial c_2} \\ \frac{\partial R_{670}\left(\frac{89}{2.55}, \frac{89}{2.55}\right)}{\partial c_1} & \frac{\partial R_{670}\left(\frac{89}{2.55}, \frac{89}{2.55}\right)}{\partial c_2} \end{bmatrix},$$
$$\approx \begin{bmatrix} -0.3327 & -0.4280 \\ -0.9085 & -0.0446 \end{bmatrix}$$

where the units for $R_{670}$ are in percentages so they range from 0% to 100% (as opposed to 0 to 1). Note that these values are all reasonable at a glance. The top rows are the changes in L* as a function of cyan and magenta. Since they are both negative, the interpretation is that L* decreases as either cyan or magenta increase, which is reasonable. The magnitudes of the changes are reasonable in that cyan and magenta influence L* by a fairly similar amount and the magnitudes are not dramatically different. Likewise, the bottom row shows the changes in $R_{670}$ as cyan and magenta increase which are also both expected to decrease. The magnitude of the cyan change is significantly larger than magenta, which is also expected. As a reminder, in all of the above calculations both yellow and black are also provided to the functions L* and $R_{670}$ as parameters. They are omitted in the notation above to emphasize that only cyan and magenta are being varied.

Step 3: Solving for $\Delta c$ The final step is to solve the equation that relates $\Delta c$ to the desired $\Delta F(c)$. Inserting the values from above yields:

$$\nabla F(c)\Delta c = \Delta F(c)$$
$$\Rightarrow \begin{bmatrix} -0.3327 & -0.4280 \\ -0.9085 & -0.0446 \end{bmatrix}\begin{bmatrix} \Delta c_1 \\ \Delta c_2 \end{bmatrix} = \begin{bmatrix} 0 \\ -22 \end{bmatrix}$$
$$\Rightarrow \begin{bmatrix} \Delta c_1 \\ \Delta c_2 \end{bmatrix} = \begin{bmatrix} -0.3327 & -0.4280 \\ -0.9085 & -0.0446 \end{bmatrix}^{-1}\begin{bmatrix} 0 \\ -22 \end{bmatrix},$$
$$\Rightarrow \begin{bmatrix} \Delta c_1 \\ \Delta c_2 \end{bmatrix} = \begin{bmatrix} 25.18 \\ -19.57 \end{bmatrix}$$

So $c_1$ (cyan) has 25.18% ink added and $c_2$ has 19.57% ink subtracted leading to $c_1$=89/2.55+25.18=60:08% and $c_2$=89/2.55−19:57=15:33%. Visually, these values line up closely with the black "O" in FIG. 21 that indicates where the ink moves after the first step.

Step 4: Checking Error from Target

As discussed above, the iterations all involve approximations. The gradient approximates the actual function of the image properties and using this to solve for the new inks leads to small errors. The final step is to use the actual function values to determine if the image properties are within tolerance of the targets and either compute additional iterations or end the process depending on the result.

The values are L*(60.08; 15:33)=65:32 and $R_{670}$ (60.08; 15:33)=25:41%. The targets were 66.4 for L* and 23.4% for $R_{670}$ leading to errors of 1.06 for L* and −2.01% for $R_{670}$. The tolerances set in the example iteration were ±0.25 for L* and ±0.25% for $R_{670}$. These are not met, so a new iteration is initiated with an updated target change set to the new errors so that:

$$\Delta F(c) = \begin{bmatrix} 1.06 \\ -2.01 \end{bmatrix}.$$

The new target changes are significantly smaller than in the first iteration, so the approximations will be more accurate and result in smaller errors. As the example showed, repeating the iteration led to a result that met the tolerance and ended the iterations.

Notes on a General Case

While the example above covered the specific case of controlling L* and $R_{670}$ by modulating cyan and magenta, the overall procedure is very similar for other types of enhancement. Here are examples of what can change in other steps:

A different number of image properties may be modulated. In this case it was two, L* and R670, but any number of image properties can potentially be modified if they are less than or equal to the number of channels being modulated.

A different number of channels can be modulated.

When there are more inks modulated than image properties being controlled, the matrix equation cannot use an inverse but must use some solution method that incorporates regularization, like the pseudo-inverse mentioned above used for obtaining a minimum-norm solution.

III. Operating Environments

The components and operations of the various described embodiments and implementations shown in figures and/or discussed in text above, can be implemented in modules. Notwithstanding any specific discussion of the embodiments set forth herein, the term "module" may refer to software, firmware and/or circuitry configured to perform any of the methods, processes, algorithms, functions or operations described herein. Software may be embodied as a software package, code, instructions, instruction sets, or data recorded on non-transitory computer readable storage mediums. Software instructions for implementing the detailed functionality can be authored by artisans without undue experimentation from the descriptions provided herein, e.g., written in C, C++, Objective-C, and C#, Ruby, MatLab, Visual Basic, Java, Python, Tcl, Perl, Scheme, and assembled in executable binary files, etc., in conjunction with associated data. Firmware may be embodied as code, instructions or instruction sets or data that are hard-coded (e.g., nonvolatile) in memory devices. As used herein, the term "circuitry" may include, for example, singly or in any combination, hard-wired circuitry, programmable circuitry such as one or more computer processors comprising one or more individual instruction processing cores, multi-core processors, parallel processors, state machine circuitry, or firmware that stores instructions executed by programmable circuitry.

Applicant's work also includes taking the scientific principles and natural laws on which the present technology rests and tying them down in particularly defined implementations. For example, the technology, systems and methods described with reference to FIGS. 7-14F and 16-21. One such realization of such implementations is electronic circuitry that has been custom-designed and manufactured to perform some or all of the component acts, as an application specific integrated circuit (ASIC).

To realize such implementations, some or all of the technology is first implemented using a general purpose computer, using software such as MatLab (from MathWorks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Another specific implementation of the present disclosure includes color managed embedding operating on a specifically configured smartphone (e.g., iPhone 11 or Android device) or other mobile device, such phone or device. The smartphone or mobile device may be configured and controlled by software (e.g., an App or operating system) resident on the smartphone device. Still another specific implementation of the present disclosure includes color managed embedding operating in a cloud environment, e.g., Amazon Cloud or Microsoft Azure environments. Multiple processors can be used to reduce overall enhancement processing time.

The methods, processes, components, technology, apparatus and systems described above may be implemented in hardware, software or a combination of hardware and software. For example, the color managed embedding and optimizations may be implemented in software, firmware, hardware, combinations of software, firmware and hardware, a programmable computer, electronic processing circuitry, digital signal processors (DSP), FPGAs, graphic processing units (GPUs), a programmable computer, electronic processing circuitry, and/or by executing software or instructions with a one or more processors including parallel processors, multi-core processor(s) and/or other multi-processor configurations.

CONCLUDING REMARKS

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

The particular combinations of elements and features in the above-detailed embodiments are exemplary only; the interchanging and substitution of these teachings with other teachings in this and the incorporated-by-reference patents and documents are also contemplated.

What is claimed is:

1. A non-transitory computer readable medium comprising instructions stored therein that, when executed by one or more processors of a computer system, cause said computer system to perform operations comprising:

accessing a color image comprising original Cyan (C), original Magenta (M), and original Yellow (Y), collectively, original CMY;

obtaining information represent a contour representing a constant $L^*$ for different values of the original CMY;

at a starting location on the contour represented by an original CIELAB $a^*$, $b^*$ that is associated with the original CMY, determining $L^*$ gradient information to find a direction in CMY-space which moves towards a target CIELAB $a^*$, $b^*$, the target CIELAB $a^*$, $b^*$ residing on the contour;

determining a scalar representing the distance between the original CIELAB $a^*$, $b^*$ and the target CIELAB $a^*$, $b^*$; and applying the determined scalar to the original CMY to yield a scaled CMY, the scaled CMY carrying the encoded signal, thereby encoding a signal in the color image by making changes in CIELAB $a^*$ and $b^*$ while maintaining $L^*$ within a predetermined tolerance.

2. The non-transitory computer readable medium of claim 1 further comprising instructions that, when executed by one or more processors of a computer system, cause said computer system to perform an operation comprising: correcting the scaled CMY values when $L^*$ is located off the contour.

3. An apparatus comprising:

an input to obtain a reflectance value representing an image pixel or group of image pixels within a wavelength range, the image pixel representing artwork including a cyan value, a magenta value, and a yellow value;

means for altering the reflectance value according to an information carrying signal, said means for altering yielding a target reflectance value within the wavelength range;

means for changing, in a first direction, the cyan value to achieve the target reflectance value, said means for changing yielding changed pixel color values;

means for evaluating a luminance ($L^*$) value of the changed pixel color values relative to a luminance ($L^*$) value of the image pixel or group of image pixels;

means for changing, in a second direction opposite of the first direction, a magenta value of the changed pixel color values to minimize a change in luminance ($^*L$) between the luminance ($L^*$) value of the changed pixel color values relative to the luminance ($L^*$) value of the image pixel or group of image pixels while maintaining the target reflectance value within 0-5%.

4. A non-transitory computer readable medium storing instructions that, when executed by one or more processors of a computer system, cause said computer system to perform operations comprising:

obtaining original CIELAB $L^*$, $a^*$, $b^*$ values representing a color image comprising Cyan (C), Magenta (M) and Yellow (Y) channels;

generating a $L^*$ contour;

determining a direction along the $L^*$ contour to introduce a change to carry a signal in the color image, said determining a direction yielding a determined direction;

determining an amount of change in the determined direction, said determining an amount yielding a determined amount;

applying the determined amount to achieve new CIELAB $L^*$, $a^*$, $b^*$ values, the new CIELAB $L^*$, $a^*$, $b^*$ values carrying the signal.

5. The non-transitory computer readable medium of claim 4 in which said determining an amount of change utilizes a rate of change in the determined direction.

6. The non-transitory computer readable medium of claim 4 in which said generating generates a local approximation of the L* contour.

7. The non-transitory computer readable medium of claim 4 further comprising instructions that, when executed by one or more processors of a computer system, cause said computer system to perform an operation comprising: substituting the new CIELAB L*, a*, b* values for the original CIELAB L*, a*, b* values in the color image to carry the signal.

8. The apparatus of claim 3 in which the wavelength range includes wavelengths at or around 660 nm.

9. The apparatus of claim 3 in which the image pixel representing artwork includes a cyan value, a magenta value, and a yellow value and a black value.

10. An apparatus comprising:
   memory for storing original CIELAB L*, a*, b* values representing a color image comprising Cyan (C), Magenta (M) and Yellow (Y) channels;
   means for producing a L* contour;
   means for determining a direction along the L* contour to introduce a change to carry a signal in the color image, said means for determining a direction yielding a determined direction;
   means for establishing an amount of change in the determined direction, said means for establishing an amount yielding an established amount;
   means for producing new CIELAB L*, a*, b* values by utilizing the established amount, the new CIELAB L*, a*, b* values carrying the signal.

11. The apparatus of claim 10 in which said means for establishing an amount of change utilizes a rate of change in the determined direction.

12. The apparatus of claim 10 in which said means for producing produces a local approximation of the L* contour.

13. The apparatus of claim 10 further comprising:
   means for utilizing the new CIELAB L*, a*, b* values instead of the original CIELAB L*, a*, b* values in the color image to carry the signal.

* * * * *